(12) United States Patent
Tanaka et al.

(10) Patent No.: US 7,051,079 B2
(45) Date of Patent: May 23, 2006

(54) INFORMATION INTERMEDIARY APPARATUS, INFORMATION MANAGEMENT APPARATUS, AND INFORMATION COMMUNICATION SYSTEM

(75) Inventors: Hiroshi Tanaka, Saitama (JP); Asa Namiki, Tokyo (JP); Akira Yoda, Kanagawa (JP); Yasuhiro Shinkai, Tokyo (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 875 days.

(21) Appl. No.: 09/854,935

(22) Filed: May 15, 2001

(65) Prior Publication Data

US 2002/0059406 A1    May 16, 2002

(30) Foreign Application Priority Data

| May 16, 2000 | (JP) | ............................. 2000-142641 |
| May 29, 2000 | (JP) | ............................. 2000-157707 |
| Jun. 5, 2000 | (JP) | ............................. 2000-166950 |
| Jun. 21, 2000 | (JP) | ............................. 2000-186892 |

(51) Int. Cl.
    G06F 15/16    (2006.01)
    G06F 17/30    (2006.01)

(52) U.S. Cl. ............................. 709/217; 707/10; 707/3

(58) Field of Classification Search ................ 709/220, 709/226, 217; 705/27; 455/456.6; 707/10, 707/3

See application file for complete search history.

(56) References Cited

U.S. PATENT DOCUMENTS 5,774,663 A * 6/1998 Randle et al. .............. 709/204
6,023,688 A * 2/2000 Ramachandran et al. ...... 705/44
6,513,015 B1 * 1/2003 Ogasawara .................. 705/26
6,560,651 B1 * 5/2003 Katz et al. .................. 709/229
6,636,873 B1 * 10/2003 Carini et al. ................ 707/201
6,722,473 B1 * 4/2004 Ramachandran et al. ..... 186/36
6,804,718 B1 * 10/2004 Pang et al. ................. 709/226
6,868,451 B1 * 3/2005 Peacock ..................... 709/231

FOREIGN PATENT DOCUMENTS

JP    HEI 10-232893    9/1998

* cited by examiner

*Primary Examiner*—David Wiley
*Assistant Examiner*—Michael Delgado
(74) *Attorney, Agent, or Firm*—Sughrue Mion, PLLC

(57) ABSTRACT

An information intermediary apparatus for communicating through a communication network with an information management apparatus having user information stored therein, the information intermediary apparatus, which includes: a first communication section for establishing communication through the communication network with the information management apparatus; a second communication section for communicating with a portable communication apparatus having identification information for identifying a user; an identification information-obtaining section, connected with said second communication section, for obtaining said identification information from said portable communication apparatus through said second communication section; a user information input unit, connected with said first communication section, for inputting user information for the user of the portable communication apparatus; and a data-identifying section, connected with said identification information-obtaining section and said user information input unit, for associating said identification information with the user information.

26 Claims, 59 Drawing Sheets

| ID NO. | PHONE NO. | FLAG | POSITION | IMAGE | PROFILE | VOICE MESSAGE |
|---|---|---|---|---|---|---|
| 0001 | 09012345678 | O | — | 0001.jpg | 09012345678.txt | 09012345678.wav |
| 0002 | 09023456789 | — | R | 0002.jpg | 09023456789.txt | — |
| 0002 | 09034567890 | — | L | 0002.jpg | 09034567890.txt | — |
| 0003 | 09045678901 | — | M | 0003.jpg | 09045678901.txt | 09045678901.wav |
| 0003 | 09056789012 | — | L | 0003.jpg | 09056789012.txt | — |
| 0003 | 09067890123 | — | R | 0003.jpg | 09067890123.txt | — |

*FIG. 6*

| PHONE NO. | SEX | BIRTHDAY | ADDRESS | CHARACTER | INTEREST | FAVORITE FOOD | FAVORITE MUSIC | MESSAGE |
|---|---|---|---|---|---|---|---|---|
| 0901234 5678 | M ◯ | 1980. 01.01. ◯ | HOKKAIDO⋯ ◯ | MODERATE | DANCING ◯ | HAMBURGER ◯ | COUNTRY | — |
| 0902345 6789 | F ◯ | 1980. 01.01. ◯ | TOKYO⋯ | ACTIVE | TRAVEL ◯ | BEER | ROCK | LOOKING FOR A FRIEND. ◯ |
| 0903456 7890 | F ◯ | 1980. 04.24. ◯ | KANAGAWA⋯ | ACTIVE | KARAOKE ◯ | SAKE ◯ | ROCK | LOOKING FOR A FRIEND. ◯ |
| 0904567 8901 | F ◯ | 1990. 08.20. ◯ | TOKYO⋯ ◯ | MODERATE | SHOPPING ◯ | HAMBURGER ◯ | POPS | — |
| 0905678 9012 | F ◯ | 1990. 12.23. ◯ | TOKYO⋯ ◯ | ACTIVE ◯ | DRIVING | CAKE ◯ | FOREIGN ◯ | — |
| 0906789 0123 | F ◯ | 1990. 01.30. ◯ | TOKYO⋯ | QUIET | SKIING | SUSHI ◯ | | — |

HAS ESTABLISHED COMMUNICATION
WITH 090-4567-8901.
PLEASE STAND AT THE POSITION(1).

HAS ESTABLISHED COMMUNICATION
WITH 090-5678-9012.
PLEASE STAND AT THE POSITION(2).

HAS ESTABLISHED COMMUNICATION
WITH 090-5678-9012.
PLEASE STAND AT THE POSITION(3).

*FIG. 12*

```
PROFILE OF 090-1234-5678
    NAME :
    SEX :
☐ BIRTHDAY :
☐ ADDRESS :
☐ TEL : 090-1234-5678
☐ INTEREST :
☐ FAVORITE FOOD :
☐ FAVORITE MUSIC :
☐ VOICE MESSAGE : RECORDABLE FOR 30 SEC
```

*FIG. 14A*

```
PROFILE OF 090-1234-5678
    NAME : MISS MOMO
    SEX : ♀
☒ BIRTHDAY : 1984. 02. 29
☐ ADDRESS : 2-26-30 MINAMI-AZABU, TOKYO
☐ TEL : 090-1234-5678
☒ INTEREST : DANCING/KARAOKE
☒ FAVORITE FOOD : HAMBURGER
☒ FAVORITE MUSIC : COUNTRY
☒ VOICE MESSAGE : RECORDABLE FOR 30 SEC
```

*FIG. 14B*

| ADVERTISEMENT ID | ADVERTISER INFORMATION | ADVERTISEMENT CONTENTS | | | DISTRIBUTION CONDITIONS | MINIMUM VALUE OF CONCORDANCE DEGREE | NUMBER OF DISTRIBUTION | SUM OF ADVERTISEMENT FEES |
|---|---|---|---|---|---|---|---|---|
| | | TITLE | DETAILS | IMAGE DATA | | | | |
| . . | | | | | | | | |
| 011 | ......<br>MINATO-KU, TOKYO | A STYLISH COMPACT CAR AIMED FOR YOUNG FEMALES | ○○AUTO IS NOW SELLING ......<br>PLEASE CONTACT TO ...... | | SEX:FEMALE<br>AGE:18-30<br>ADDRESS:TOKYO+KANAGAWA<br>INTEREST:DRIVING+OUTDOORS | 0.5 | 10 | 500 |
| 012 | ......<br>NERIMA-KU, TOKYO | A TOUR FOR SHOPPING BRAND-NAMED GOODS | 7 DAYS & 8 NIGHTS IN PARIS & MILAN......<br>PLEASE CONTACT TO ...... | | SEX:FEMALE<br>AGE:20-25<br>ADDRESS:TOKYO<br>INTEREST:TRAVEL | 1.0 | 6 | 600 |
| 013 | ......<br>SHINJUKU-KU, TOKYO | A QUIET COZY BAR | HAVE A PEACEFUL TIME WITH JAZZ PIANO AS A BGM ......<br>PLEASE CONTACT TO ...... | | FAVORITE FOOD:WINE<br>FAVORITE MUSIC:JAZZ | 0.5 | 6 | 300 |
| . . | | | | | | | | |

| PHONE NO. | SEX | | BIRTHDAY | | ADDRESS | | INTEREST | | FAVORITE MUSIC | | MESSAGE | | VOICE DATA | IMAGE DATA |
|---|---|---|---|---|---|---|---|---|---|---|---|---|---|---|
| 09012345678 | M | ○ | 1980.01.01. | ○ | HOKKAIDO… | | DANCING | ○ | COUNTRY | ○ | — | | | |
| 09023456789 | F | ○ | 1980.01.01. | ○ | KANAGAWA… | | KARAOKE | ○ | ROCKS | | I AM LOOKING FOR A NICE FRIEND. | ○ | | |
| 09034567890 | F | ○ | 1980.04.24. | ○ | KANAGAWA… | | KARAOKE | ○ | ROCKS | | I AM LOOKING FOR A NICE FRIEND. | ○ | | |
| 09045678901 | F | ○ | 1990.08.20. | ○ | TOKYO… | ○ | SHOPPING | | JAPANESE POPS | | — | | | |
| 09056789012 | F | ○ | 1990.12.23. | ○ | TOKYO… | ○ | DRIVING | | POPS | ○ | — | | | |
| 09067890123 | F | ○ | 1990.01.30. | ○ | TOKYO… | | SKIING | | | | — | | | |

| INFORMATION INTERMEDIAY APPARATUS IDENTIFICATION NUMBER | ADDRESS | NEAREST PUBLIC TRANSPORT | LANDMARK | MAP |
|---|---|---|---|---|
| — | ... | ... | ... | ... |
| AB12 | ... | ... | ... | ... |
| CD34 | ... | ... | ... | ... |
| — | ... | ... | ... | ... |
| — | ... | ... | ... | ... |

*FIG. 30*

ADVERTISEMENT INFORMATION 1

| IDENTIFICATION INFORMATION OF ADVERTISER | |
|---|---|
| ADVERTISEMENT CONTENTS | |
| TARGET PERSONS FOR DISTRIBUTION | |
| SEX | MALE |
| AGE | 20-40 |
| ADDRESS | TOKYO, KANAGAWA |
| INTEREST | DRIVING |

*FIG. 35A*

ADVERTISEMENT INFORMATION 2

| IDENTIFICATION INFORMATION OF ADVERTISER | |
|---|---|
| ADVERTISEMENT CONTENTS | |
| TARGET PERSONS FOR DISTRIBUTION | |
| SEX | MALE, FEMALE |
| AGE | 20-30 |

*FIG. 35B*

USER STATISTICAL INFORMATION

| AGE | M | F | ADDRESS | M | F | INTEREST | M | F |
|---|---|---|---|---|---|---|---|---|
| ~ 9 | 5 | 8 | TOKYO | 410 | 507 | KARAOKE | 103 | 209 |
| 10~19 | 24 | 36 | CHIBA | 398 | 613 | DRIVING | 513 | 83 |
| 20~29 | 102 | 92 | SAITAMA | 80 | 73 | ⋮ | ⋮ | ⋮ |
| 30~39 | 89 | 203 | ⋮ | ⋮ | ⋮ | | | |
| ⋮ | ⋮ | ⋮ | | | | | | |

*FIG. 37*

ADVERTISEMENT DATABASE

| REFERENCE NO. | IDENTIFICATION INFORMATION OF ADVERTISER | ADVERTISEMENT CONTENTS | TARGET PERSONS FOR DISTRIBUTION |
|---|---|---|---|
| ⋮ | | | |
| 1525 | — | — | — |
| 1526 | — | — | — |
| ⋮ | | | |

*FIG. 38*

DISTRIBUTION USER STATISTICAL INFORMATION 1

| REFERENCE NO. =1525 | | |
|---|---|---|
| | | M |
| AGE | 20-29 | 10 |
| | 30-40 | 25 |
| ADDRESS | TOKYO | 29 |
| | KANAGAWA | 15 |
| INTEREST | DRIVING | 35 |

*FIG. 39A*

DISTRIBUTION USER STATISTICAL INFORMATION 2

| REFERENCE NO. =1526 | | | |
|---|---|---|---|
| | | M | F |
| AGE | 20-30 | 94 | 57 |

*FIG. 39B*

| PHONE NO. | MAX CHARGEABLE AMOUNT | SUM OF CONSIDERATION | SUM OF CHARGES | PRESENT CHARGEABLE AMOUNT |
|---|---|---|---|---|
| 090-AAAA-AAAA | 20,000 | 1,000 | 3,000 | 16,000 |
| 090-BBBB-BBBB | 20,000 | 0 | 0 | 0 |
| 090-CCCC-CCCC | 10,000 | 3,000 | 5,000 | 2,000 |

PLEASE SELECT A SERVICE.

1. MAKE WALLPAPER FOR THE CELLULAR PHONE

2. MAKE A SEAL

3. MAKE BOTH WALLPAPER AND A SEAL

4. SEARCH USER INFORMATION

*FIG. 46A*

090-4567-8901
PLEASE STAND AT THE POSITION
"LEFT"

090-5678-9012
PLEASE STAND AT THE POSITION
"MIDDLE"

090-6789-0123
PLEASE STAND AT THE POSITION
"RIGHT"

*FIG. 46B*

INFORMATION INTERMEDIARY APPARATUS, INFORMATION MANAGEMENT APPARATUS, AND INFORMATION COMMUNICATION SYSTEM

This patent application claims priority from Japanese patent application Nos. 2000-142641 filed on May 16, 2000, 2000-157707 filed on May 29, 2000, 2000-166950 filed on Jun. 5, 2000, and 2000-186892 filed on Jun. 21, 2000, the contents of which are incorporated herein by reference.

BACKGROUND OF THE INVENTION

1. Field of the Invention

The present invention relates to an information intermediary apparatus, an information management apparatus, and an information communication system. In particular, the present invention relates to an information intermediary apparatus for registering and searching user information, an information management apparatus for storing and managing the registered user information as well as distributing advertisements based on the user information to appropriate browsers, including a charge system that does not require cash, and an information communication system comprising the information intermediary apparatus and the information management apparatus.

2. Description of the Related Art

Conventionally, an information exchange and intermediary apparatus for electronically intermediating information exchanges among users is known. For example, Japanese Patent Application Laying-Open No. H10-232893 discloses apparatus for intermediating information exchanges among users, as a World Wide Web server on the Internet.

Also, cellular phones have recently become widely used recently and are used by a wide variety of users as business tools and communication tools.

Moreover, there is a system, for example, for distributing advertisements relating to specific keywords to those who search information based on the keywords on the Internet, as this type of a server. Another example is a system for previously collecting a plurality of pieces of personal information and distributing advertisements relating to the personal information by e-mail. Either server compares information showing the attributes of browsers for distributing advertisements and distribution conditions of the advertisements, and distributes advertisements when the attribute information and the conditions coincide.

However, it is important to provide information that matches users' needs and is necessary to provide information that meets users' requirements more when exchanging information. Also, the release of personal information made by information disclosures has become a problem.

Further, there are advertisements where distribution conditions can be clearly defined by the contents of the advertisements, as well as those cannot. On this account, there has been a problem that effective distribution of advertisements is not necessarily made by a mere accordance of information showing the attributes of browsers for distributing advertisements and distribution conditions of advertisements.

Furthermore, according to conventional information exchange and intermediary apparatuses, fees for the services have to be paid to the apparatuses by cash. On this account, there has been a problem that a user has to prepare cash such as coins. There has also been a problem that it is not preferred in the interests of crime prevention since the paid fees are stored in the apparatuses for a certain period of time.

SUMMARY OF THE INVENTION

Therefore, it is an object of the present invention to provide an information intermediary apparatus, an information management apparatus, and an information communication system, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, an information intermediary apparatus for communicating through a communication network with an information management apparatus having user information stored therein, which the information intermediary apparatus includes: a first communication section for establishing communication through the communication network with the information management apparatus; a second communication section for communicating with a portable communication apparatus having identification information for identifying a user; an identification information-obtaining section, connected with the second communication section, for obtaining the identification information from the portable communication apparatus through the second communication section; a user information input unit, connected with the first communication section, for inputting user information for the user of the portable communication apparatus; and a data-identifying section, connected with the identification information-obtaining section and the user information input unit, for associating the identification information with the user information.

The user information input unit may include at least one of: an operations unit for inputting a profile of the user; a microphone for inputting voice data of the user; and an image-capturing unit for inputting an image of the user, and the data-identifying section may associate the profile with the identification information for the user.

The first communication section may send at least one of the image, the voice data, and the profile to the information management apparatus as the user information, with a recognizable association with the identification information for the user.

The information intermediary apparatus may further include: an open contents-designating section for designating among the identification information, the image, the voice data, and the profile contents that are to be disclosed.

The second communication section may send the image of the user to the portable communication apparatus of the user, the image being used as wallpaper for the portable communication apparatus.

The information intermediary apparatus may further include: a voice data-identifying section for associating the voice data of the user with the identification information.

The image-capturing unit may input an image of a group user including a plurality of users, the operations unit may input a profile of the group user, and the data-identifying section may associate the image of the group user with the profile of the group user.

The voice data-identifying section may associate the voice data with the profile of the group user.

The second communication section may communicate with a plurality of the portable communication apparatus of the group user, the identification information-obtaining section may obtain the identification information from each user of the group user, and the data-identifying section may associate the image with the identification information of each user.

The information intermediary apparatus may further include: an instruction section for instructing each user of the group user to lineup in an order corresponding to an order of the identification information of each user of the group user.

The information intermediary apparatus may further include: a portable communication apparatus receiving section for receiving and connecting with at least one of the portable communication apparatus, wherein: the second communication section may communicate with the at least one portable communication apparatus through the portable communication apparatus receiving section, and the instruction section may instruct the user to lineup in an order corresponding to a position of the at least one portable communication apparatus.

The data-identifying section may associate a profile of each user of the group user with the identification information corresponding to the each user.

The operations unit may accept a designation of user information of registered users to obtain from the information management apparatus, and may further include: a user information-obtaining section for obtaining the designated user information for a registered user from the information management apparatus; and a printer for printing the profile and the image, included in the designated user information obtained by the user information-obtaining section.

The information intermediary apparatus may further include: a transmission section for notifying, through the information management apparatus, the portable communication apparatus of the registered user that the designated user information of the registered user has been printed, when the printer has printed the profile and the image.

The operations unit may accept from a browsing user input of return information, which is to be sent to the portable communication apparatus of the registered user, and the transmission section may send to the information management apparatus information showing that the return information is to be sent from the browsing user to the portable communication apparatus of the registered user.

The information intermediary apparatus may further include: a paying capacity information-obtaining section for obtaining information relating to a paying capacity of a browsing user from the information management apparatus, using the identification information of the browsing user; and a judgment section for judging whether or not to provide a service to the browsing user, based on the information relating to the paying capacity, wherein the printer may print the image when the judgment section judges to provide the service.

The information intermediary apparatus may further include: a rate-storing section for storing a rate of the service; a charge amount-deciding section for deciding an amount to charge for the service based on a number of browsing users and the rate stored in the rate-storing section, wherein the first communication section may send to the information management apparatus the charge amount, decided by the charge amount-deciding section with corresponding identification information, as charge information.

The information intermediary apparatus may further include: a redecision instruction section for instructing the charge amount-deciding section to recalculate the charge amount, based on a number of browsing users the judgment section has judged to provide the service, when there is the at least one browsing user the judgment section has judged not to provide the service.

The charge amount-deciding section may obtain a share burden ratio for the rate of the service for each of the browsing users and may decide the amount to charge for the service for each of the browsing users, based on the share burden ratio and the rate stored in the rate-storing section.

The information intermediary apparatus may further include: a user information output section for outputting the user information obtained by the user information-obtaining section when the judgment section judges to provides the service.

The identification information may include a phone number of the portable communication apparatus.

According to the second aspect of the present invention, an information management apparatus for receiving from an information intermediary apparatus, through a communication network, information relating to a registered user who is registered at the information intermediary apparatus and storing the received user information, which the information management apparatus includes: a receiving section for receiving information relating to: user identification information obtained from a portable communication apparatus connected to the information intermediary apparatus; and user information relating to the registered user registered at the information intermediary apparatus, by communicating with the information intermediary apparatus; a storing section for storing the user identification information and the user information associated with the user identification information; a search condition-accepting section connected with the information intermediary apparatus through the receiving section, the search condition-accepting section accepts from a browsing user a search condition for searching the user information of the registered user stored in the storing section; a retrieving section connected with the storing section and the search condition-accepting section for retrieving from the storing section user information that satisfies the search condition; and a transmission section connected with the receiving section and the retrieving section for sending the user information retrieved by the retrieving section to the information intermediary apparatus through the receiving section.

The information management apparatus may further include: an open contents-retrieving section for retrieving contents that are designated open contents to be disclosed among the information retrieved by the retrieving section, wherein the transmission section may send to the information intermediary apparatus the open contents retrieved by the open contents-retrieving section.

The transmission section may send the information stored in the storing section to one or more users through the communication network.

The receiving section may receive designation of open contents that are to be disclosed among the information stored in the storing section.

The storing section may store data of the browsing user, and may further include: a portable communication apparatus communication section for sending to the portable communication apparatus of the registered user the data of the browsing user, when the search condition-accepting section accepts from the browsing user the search condition and the retrieving section retrieves the user information of the registered user.

The storing section may store an image of a group user including a plurality of users and a profile of the group user, by associating the image with the profile of the group user, when at least one of the receiving section and the portable communication apparatus communication section may receive the image of the group user and the profile of the group user.

The storing section may store the image of the group user and identification information of each user of the group user, by associating the image with the identification information of each user of the group user, when at least one of the receiving section and the portable communication apparatus communication section receives the identification information of each user of the group user.

The at least one of the receiving section and the portable communication apparatus communication section may receive position information showing a position of each user in the image of the group user, and the storing section may store the position information.

The information management apparatus may further include: a monitoring section for deleting at least one of the image and the profile stored in the storing section associated with identification information of the user, when at least one of the receiving section and the portable communication apparatus communication section receives another one of the at least one of the image and the profile already stored in the storing section.

The information management apparatus may further include: an advertisement-storing section for storing a distribution condition defined as a condition to be satisfied by an advertisement and a target audience for a distribution of the advertisement; a concordance degree-calculating section for obtaining from the storing section user information of the browsing user and calculating a concordance degree for each advertisement stored in the advertisement-storing section; and a setting value-storing section for storing a setting value, which is a smallest value possible for the concordance degree when the advertisement is distributed, wherein at least one of the transmission section and the portable communication apparatus communication section may retrieve from the advertisement-storing section each advertisement having a value of the concordance degree not less than the setting value, and may distribute to the browsing user the retrieved advertisement with the user information retrieved by the retrieving section.

At least one of the transmission section and the portable communication apparatus communication section may distribute an advertisement with a smaller number of distribution records, when there is at least one advertisement having a value of the concordance degree not less than the setting value.

At least one of the transmission section and the portable communication apparatus communication section may distribute an advertisement with a smaller number of distribution records as well as having a greater setting value, when there is at least one advertisement having a value of the concordance degree not less than the setting value.

The information management apparatus may further include: an advertisement fee-calculating section for calculating an advertisement fee based on a basic fee and the setting value.

The portable communication apparatus communication section may retrieve a predetermined item from an advertisement stored in the advertisement-storing section and distributes the retrieved item to a first communication apparatus of the target audience for distributing the advertisement, and the transmission section may obtain the advertisement from the advertisement-storing section and distributes the obtained advertisement to a second communication apparatus, different from the first communication apparatus.

The information management apparatus may further include: a non-advertisement information-storing section for storing one or more pieces of non-advertisement information; and a simple information-creating section for retrieving a predetermined item from each of the one or more pieces of non-advertisement information and creating one or more pieces of simple information.

The portable communication apparatus communication section may distribute to the first communication apparatus the retrieved predetermined item of the advertisement with one or more pieces of the simple information.

The transmission section may distribute to the second communication apparatus all items of the advertisement with one or more pieces of the non-advertisement information.

The first communication apparatus may include a portable communication apparatus.

The second communication apparatus may include a communication apparatus operable to print the advertisement.

The simple information-creating section may create area information showing an area to which the user belongs, as the simple information.

The simple information-creating section may create information showing a place where the registered user registered the user information, as the area information.

The information management apparatus may further include: a position information-obtaining section for obtaining position information for the portable communication apparatus showing in which area the portable communication apparatus is positioned, when the portable communication apparatus communication section communicates with the portable communication apparatus; and an information intermediary apparatus search section for searching for an information intermediary apparatus located at a nearest area to the area shown by the position information for the portable communication apparatus, based on the position information obtained by the position information-obtaining section, wherein the portable communication apparatus communication section may send to the portable communication apparatus information relating to a position of the information intermediary apparatus searched by the information intermediary apparatus search section.

The user information may include a phone number of the portable communication apparatus of the registered user, and the transmission section may notify the portable communication apparatus of the registered user, corresponding to the retrieved user information, that the user information has been sent, when the user information of the registered user is sent to the information intermediary apparatus.

The portable communication apparatus communication section may send user information of the browsing user to the portable communication apparatus of the registered user, only when the storing section previously stores the user information of the browsing user that corresponds to the identification information.

The information management apparatus may further include: a statistical information-creating section for creating user statistical information relating to the registered user, based on the user information; and an advertiser communication section for sending the user statistical information to an advertiser who distributes advertisement to the registered user.

The information management apparatus may further include: a distribution statistics-creating section for creating distribution user statistical information relating to the user to whom advertisement is sent, the user statistical information being associated with the advertisement, when at least one of the portable communication apparatus communication section and the transmission section sends the advertisement to the user, wherein the advertiser communication section may send the distribution user statistical information to the advertiser.

The information management apparatus may further include: an identification information-obtaining section for simultaneously obtaining from the information intermediary apparatus more than two pieces of identification information for identifying a browsing user who tries to use a service; a charge amount database for storing a charge amount to charge the browsing user, by associating with the identification information for the browsing user; a rate-storing section for storing a rate of the service; a charge amount-deciding section for deciding the charge amount for each of the identification information, based on the quantity of the identification information obtained by the identification information-obtaining section and the rate stored in the rate-storing section; and a charge amount-storing section for storing the charge amount decided by the charge amount-deciding section in the charge amount database by associating with the corresponding identification information.

The information management apparatus may further include: a paying capacity information-obtaining section for obtaining information relating to a paying capacity of the browsing user by using the identification information; a judgment section for judging whether to provide the service based on information relating to the paying capacity; and a redecision instruction section for making the charge amount-deciding section recalculate the charge amount based on the number of the identification information to which the judgment section has judged to provide a service, when there is at least one piece of the identification information to which the judgment section has refused to provide the service.

The charge amount-deciding section may obtain a share burden ratio for the rate of the service for each of the identification information obtained by the identification information-obtaining section and may decide the charge amount for the service with respect to each of the identification information, based on the share burden ratio and the rate stored in the rate-storing section.

The redecision instruction section may make the charge amount-deciding section reobtain the share burden ratio and recalculate the charge amount, when there is at least one piece of the identification information to which the judgment section has refused to provide the service.

The information management apparatus may further include: a consideration amount-storing section for storing a consideration amount to pay a registered user of the user information when the user information is used for providing a service; a sum of considerations database for storing a sum of the consideration amount, the sum of the consideration amount being associated with the identification information; and a consideration amount-deciding section for deciding the amount of consideration to be distributed to the browsed registered user identified by the identification information, based on the number of the identification information associated with the browsed user information and the consideration amount stored in the consideration amount-storing section, when the user information is used for providing the service; wherein the sum of considerations database may store the consideration amount decided by the consideration amount-deciding section, and the consideration amount being associated with the identification information.

The information management apparatus may further include: an item-storing section for storing an item to be used for the service among items included in the user information, wherein the consideration amount-deciding section may decide the consideration amount to be distributed to each registered user identified by the identification information based on the quantity of the items stored in the item-storing section.

The identification information may include a phone number of the portable communication apparatus.

According to the third aspect of the present invention, an information communication system for communicating user information through a communication network, which includes: (a) an information intermediary apparatus for sending the user information, including: a first communication section for establishing communication with an information management apparatus through the communication network; a second communication section for communicating with a portable communication apparatus having identification information for identifying a user stored therein; an identification information-obtaining section connected with the second communication section for obtaining the identification information from the portable communication apparatus through the second communication section; a user information input unit connected with the first communication section for inputting user information; and a data-identifying section connected with the identification information-obtaining section and the user information input unit for associating the identification information with the user information; and (b) an information management apparatus for receiving and storing the user information, including: a receiving section for receiving information relating to user identification information obtained from a portable communication apparatus connected to the information intermediary apparatus and user information for a registered user registered at the information intermediary apparatus, by communicating with the information intermediary apparatus; a storing section for storing the user identification information and the user information associated with the user identification information; a search condition-accepting section connected with the information intermediary apparatus, through the receiving section, for accepting from a browsing user a search condition for searching the user information of the registered user stored in the storing section; a retrieving section connected with the storing section and the search condition-accepting section for retrieving from the storing section user information that satisfies the search condition; and a transmission section connected with the receiving section and the retrieving section for sending the user information retrieved by the retrieving section to the information intermediary apparatus through the receiving section.

According to the fourth aspect of the present invention, a method for intermediating information with an information management apparatus, which stores user information, through a communication network, which the method includes: (a) establishing communication with the information management apparatus through the communication network; (b) communicating with a portable communication apparatus, which stores identification information for identifying a user; (c) obtaining the identification information from the portable communication apparatus through the communicating step; (d) inputting user information; and (e) associating the identification information with the user information.

The method for intermediating information may further include: obtaining information relating to a paying capacity of a browsing user from the information management apparatus, using the identification information; and judging whether or not to provide the browsing user a service, based on the information relating to the paying capacity relating to the browsing user, where in the printer prints the image only when the judgment section judges to provide the service.

The method for intermediating information may further include: storing a rate of the service; deciding an amount to charge for the service to each of the identification information, based on the number of the identification information obtained by the identification information-obtaining section and the rate stored in the rate-storing section.

The method for intermediating information may further include: recalculating the charge amount, based on the quantity of the identification information to which the judgment section has judged to provide the service, when there is the at least one identification information to which the judging has refused to provide the service.

The step of deciding may include: obtaining a share burden ratio for the rate of the service with respect to each of the obtained identification information and deciding the amount to charge for the service to each of the identification information, based on the share burden ratio and the stored rate.

According to the fifth aspect of the present invention, a method for managing information relating to a registered user who is registered at an information intermediary apparatus, received from the information intermediary apparatus through a communication network, and storing the received user information, which the method includes: (a) receiving information relating to user identification information obtained from a portable communication apparatus connected to the information intermediary apparatus and user information relating to the registered user registered at the information intermediary apparatus, by communicating with the information intermediary apparatus; (b) storing the user identification information and the user information associated with the user identification information; (c) accepting from a browsing user a search condition for searching the stored user information of the registered user; (d) retrieving from the stored user information that satisfies the search condition; and (e) sending the retrieved user information to the information intermediary apparatus.

The method for managing information may further include: storing a distribution condition, defined as a condition to be satisfied by an advertisement and a target audience for a distribution of the advertisement; obtaining user information of the browsing user and calculating a concordance degree for each the advertisement; and storing a setting value, which is a smallest value possible for the concordance degree when the advertisement is distributed, wherein at least one of the steps of sending and communicating may retrieve the advertisement having a greater value of the concordance degree than the setting value and distributes to the browsing user the retrieved advertisement with the retrieved user information.

The method for managing information may further include: simultaneously obtaining from the information intermediary apparatus more than two pieces of identification information for identifying a browsing user who tries to use a service; storing a charge amount to charge the browsing user, by associating with the identification information; storing a rate of the service; deciding the charge amount for each of the identification information, based on the quantity of the identification information obtained by the obtaining and the rate stored in the storing; and storing the charge amount decided by the deciding by associating with the corresponding identification information.

The method for managing information may further include: obtaining information relating to a paying capacity of the browsing user by using the identification information; judging whether or not to provide the service based on the information relating to the paying capacity; and making the charge amount-deciding section recalculate the charge amount based on the quantity of the identification information judged to be provided the service, when there is at least one piece of the identification information judged not to be provided the service.

The method for managing information may further include: obtaining a share burden ratio for the rate of the service for each of the identification information obtained by the step of obtaining; and deciding the amount to charge for the service for each of the identification information, based on the share burden ratio and the stored rate.

The method for managing information may further include: recalculating the share burden ratio and the charge amount, when there is at least one piece of the identification information judged not to be provided the service.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 6 is a table showing the data structure of a user information database.

FIG. 7 is a table showing the data structure of a profile database.

FIG. 12 illustrates an exemplary display screen displayed on an LCD monitor when indicating the order of users to be lined up at S142 in FIG. 11.

FIGS. 14A and 14B illustrate exemplary display screens displayed on the LCD monitor when entering a profile at S106 in FIG. 8.

FIG. 21 is a table showing the data structure of an advertisement database.

FIG. 29 is a table showing the data structure of the profile database according to the third embodiment of the present invention.

FIG. 30 is a table showing the data structure of a position database.

FIG. 35A and 35B are tables showing exemplary data structures of advertisement information sent from an advertiser.

FIG. 37 is a table showing an exemplary data-structure of user statistical information.

FIG. 38 is a table showing the data structure of the advertisement database.

FIG. 39A and 39B are tables showing exemplary data structures of distribution user statistical information.

FIG. 44 is a table showing the data structure of a charge information database.

FIGS. 46A and 46B illustrate exemplary display screens displayed on the monitor of the information intermediary apparatus.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

(A First Embodiment)

An information intermediary apparatus, an information management apparatus, and an information communication system according to a first embodiment of the present invention are described in the following.

Figure 1:
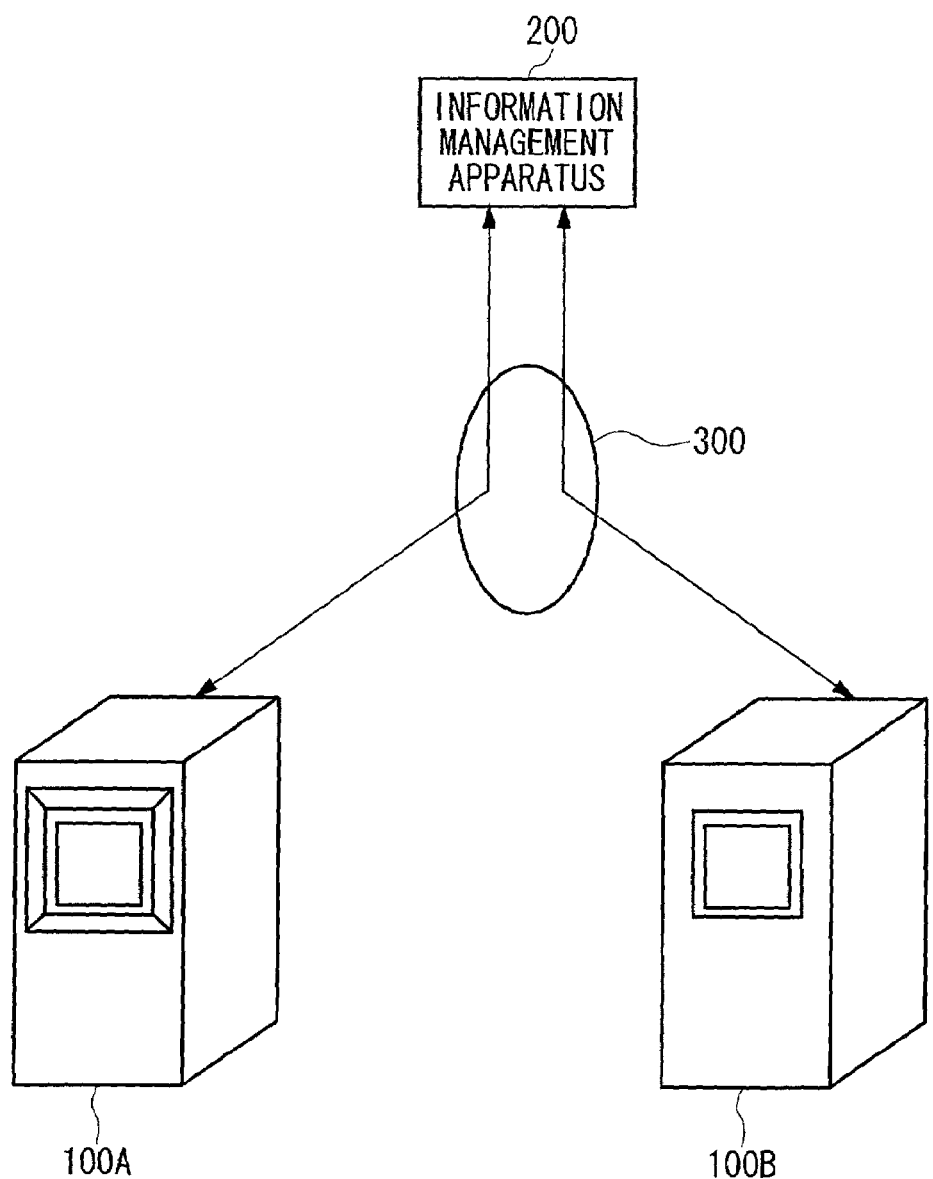
FIG. 1 is a diagram showing the entire view of an information communication system according to a first embodiment of the present invention.

FIG. 1 is a diagram showing the entire view of an information communication system. The information communication system includes information intermediary apparatuses 100A, 100B, and an information management apparatus 200. The information intermediary apparatuses 100A and 100B and the information management apparatus 200 communicate through a communication network 300. The communication network 300 is, for example, a line network that connects a plurality of terminals, such as the Internet or a telephone line. The information intermediary apparatuses 100A and 100B photograph images of users and inputs profiles of users. The information intermediary apparatuses 100A and 100B send user information such as images and profiles of users to the information management apparatus 200. The information management apparatus 200 receives the user information from the information intermediary apparatuses 100A and 100B and stores the received user information.

The information intermediary apparatuses 100A and 100B (referred to as the information intermediary apparatus 100 hereafter) also provide users user information stored in the information management apparatus 200. The information intermediary apparatus 100 accepts search conditions from users and sends the search conditions to the information management apparatus 200. The information management apparatus 200 sends the information intermediary apparatus 100 user information that matches the search conditions. The information intermediary apparatus 100 provides users user information received from the information management apparatus 200. The detailed operations of the information intermediary apparatus 100 and the information management apparatus 200 in registering and searching user information are described in the following after FIG. 2.

The information communication system according to the present embodiment includes a plurality of the information intermediary apparatuses 100. These information intermediary apparatuses 100 communicate with the information management apparatus 200 through the communication network 300. Since a plurality of the information intermediary apparatuses 100 are placed, the apparatuses may be diversified in wide areas. Therefore, users can use the information intermediary apparatus 100 without being limited to a particular place. Moreover, since all of the information intermediary apparatuses 100 communicate with the communication network 300, each information intermediary apparatus 100 can select user information to be provided to users from all of the user information input from each information intermediary apparatus 100.

Figure 2:
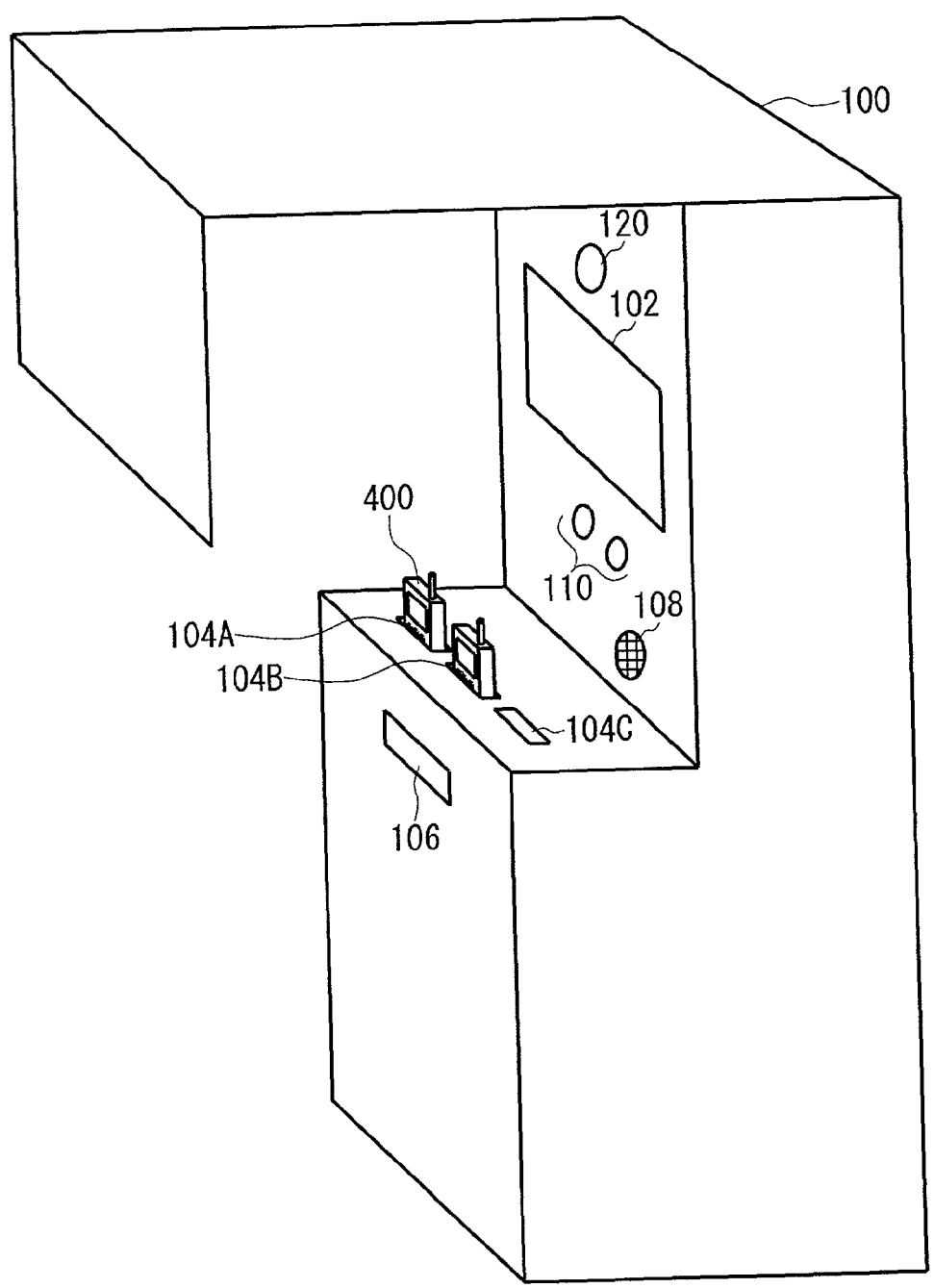
FIG. 2 is a diagram showing the exterior of an information intermediary apparatus according to the first embodiment of the present invention.

FIG. 2 is a diagram showing the exterior of an information intermediary apparatus 100. The information intermediary apparatus 100 includes cellular phone entries 104A, 104B, and 104C, a printer 106, a microphone 108, an operations unit 110, an LCD Monitor 102, and an image-capturing unit 120. The cellular phone entries 104A, 104B, and 104C connect with a cellular phone 400. Here, the cellular phone 400 is an example of the "portable communication apparatus" described in the claims. When a user places the cellular phone 400 on the cellular phone entry 104A, 104B, or 104C, the information intermediary apparatus 100 establishes a communication with the cellular phone 400. Since three cellular phone entries 104A, 104B, and 104C are placed, the information intermediary apparatus 100 may simultaneously communicate with three users.

When the information intermediary apparatus 100 establishes communication with the cellular phone 400, the apparatus 100 photographs an image of the user. The printer 106 outputs the photographed user image. The operations unit 110 accepts entries such as instructions from users and profiles. The microphone 108 inputs voices. The user can input his/her profiles and voice messages by using the operations unit 110 and the microphone 108. The information intermediary apparatus 100 registers this data as user information. The functions of the LCD monitor 102 and the image-capturing unit 120 are described in the following after FIG. 3.

Figure 3:
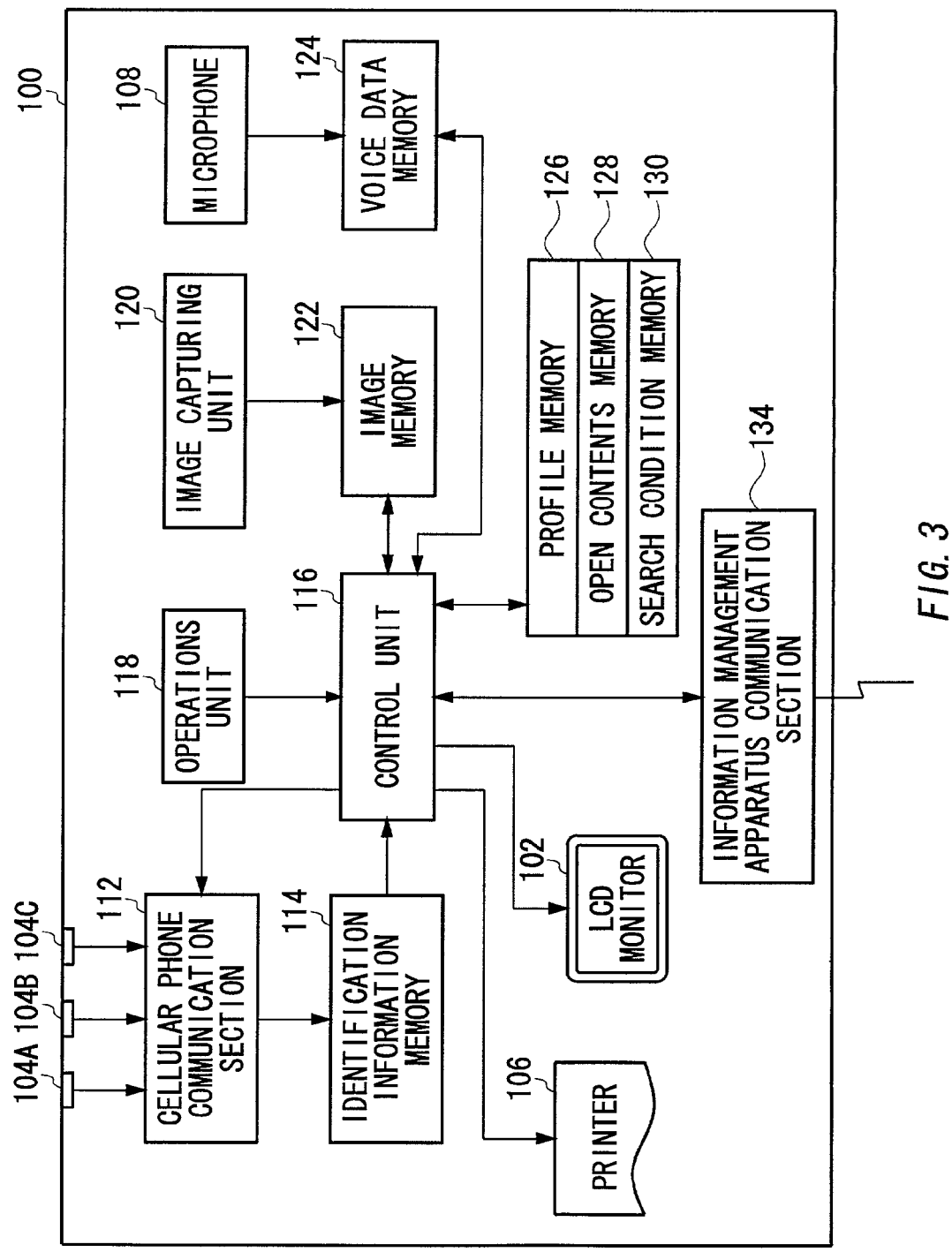
FIG. 3 is a functional block diagram of the information intermediary apparatus according to the first embodiment of the present invention.
Figure 54:
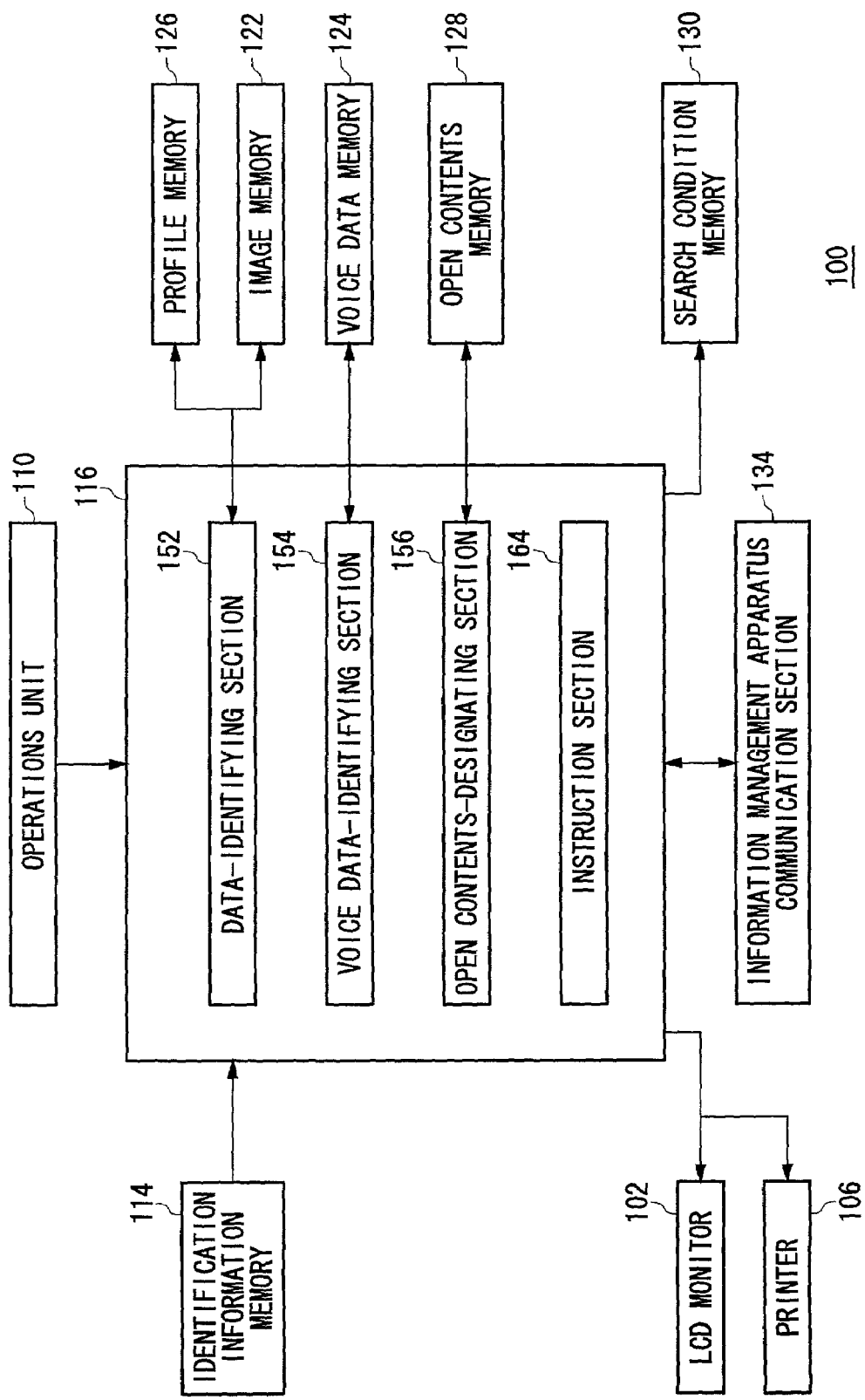
FIG. 54 is a functional block diagram of the control unit 116 according to the first embodiment.

FIG. 3 is a functional block diagram of the information intermediary apparatus 100. The information intermediary apparatus 100 includes the cellular phone entries 104A, 104B, and 104C, the microphone 108, the operations unit 110, a cellular phone communication section 112, an identification information memory 114, a control unit 116, the image-capturing unit 120, an image memory 122, a voice data memory 124, a profile memory 126, an open contents memory 128, a search condition memory 130, an information management apparatus communication section 134, the LCD monitor 102, and the printer 106. FIG. 54 is a functional block diagram of the control unit 116 according to the present embodiment. The control unit 116 includes a data-identifying section 152, a voice data-identifying section 154, an open contents-designating section 156, and an instruction section 164. The functions of the each section of the control unit 116 described above may be provided by software stored in a CPU as well as a ROM disk and a RAM disk and be executed by the CPU. The functions of the control unit 116 are described by referring to both FIG. 3 and FIG. 54.

The cellular phone entries 104A, 104B, and 104C connect with users' cellular phones 400. The cellular phone communication section 112 communicates with the cellular phone 400 through the cellular phone entries 104A, 104B, or 104C. According to the present embodiment, the cellular phone communication section 112 can simultaneously connect with two or three cellular phones 400 by the cellular phone entries 104A, 104B, and 104C. Thus, since the information intermediary apparatus 100 has a plurality of cellular phone entries 104A, 104B, and 104C, the apparatus 100 can simultaneously communicate with a plurality of cellular phones 400.

When the cellular phone communication section 112 establishes communication, the section 112 obtains from the cellular phone 400 identification information that identifies users and sends the obtained identification information to the identification information memory 114. According to the present embodiment, the identification information is a cellular phone number. The cellular phone communication section 112 further creates position information that shows which entry among the cellular phone entries 104A, 104B, and 104C the cellular phone 400 connects. The cellular phone communication section 112 then sends the position information to the identification information memory 114. The identification information memory 114 receives a cellular phone number and position information from the cellular phone communication section 112 and stores the received number and position information by associating each other. Thus, since the identification information memory 114 stores cellular phone numbers by associating with position information showing the place of the cellular phone 400 of either one of the cellular phone entries 104A, 104B, or 104C, the phone number and the connected place of each cellular phone 400 may be identified even if a plurality of cellular phones 400 are connected to the information intermediary apparatus 100.

The image-capturing unit 120 photographs users' images and sends the photographed images to the image memory 122. The image memory 122 stores the users' images. The operations unit 110 accepts instructions of users and sends the input contents to the control unit 116. The microphone 108 inputs voices and sends the input voice messages to the voice data memory 124. The voice data memory 124 stores the voice messages received from the microphone 108.

The control unit 116 creates users' profiles based on the input contents from the operations unit 110 and sends the created profiles to the profile memory 126. The profile memory 126 stores the received profiles.

The data-identifying section 152 of the control unit 116 retrieves cellular phone numbers stored in the identification information memory 114, images stored in the image memory 122, and profiles stored in the profile memory 126. The voice data-identifying section 154 of the control unit 116 retrieves voice messages stored in the voice data memory 124. The open contents-designating section 156 of the control unit 116 designates open contents to be disclosed from this data through the communication network 300. The open contents-designating section 156 then creates information of designated contents to be disclosed. The open contents-designating section 156 sends the sent information of designated contents to be disclosed to the open contents memory 128. The open contents memory 128 stores the information of designated contents to be disclosed.

When the cellular phone 400 on the cellular phone entry 104A, 104B, or 104C is ejected, the control unit 116 sends the information management apparatus communication section 134 identification information stored in the identification information memory 114, images stored in the image memory 122, voice messages stored in the voice data memory 124, profiles stored in the profile memory 126, and information of designated contents to be disclosed stored in the open contents memory 128. Thus, identification information, profiles, images, and voice messages are sent in series. Therefore, the control unit 116 can send user information corresponding to one user in a state that can be recognized to which user the user information corresponds.

The control unit 116 also sends the images received by the image memory 122 to the cellular phone communication section 112. The cellular phone communication section 112 sends the images received from the control unit 116 to the users' cellular phones 400 so that the users may use the images as wallpapers of the cellular phones 400.

When the information intermediary apparatus 100 is used for a search, the control unit 116 accepts search conditions based on the input contents from the operations unit 110. The control unit 116 sends the search conditions to the search condition memory 130. The search condition memory 130 stores the search conditions. When the control unit 116 receives the search conditions from the information management apparatus communication section 134, the instruction section 164 of the control unit 116 instructs the LCD monitor 102 or the printer 106 to display or print out the search results.

The information management apparatus communication section 134 sends the data received from the control unit 116 to the information management apparatus 200, such as phone numbers, images, profiles, voice messages, information of designated contents to be disclosed, and information of designated search conditions. The information management apparatus communication section 134 also sends the data received from the information management apparatus 200 to the control unit 116. The LCD monitor 102 and the printer 106 output data received from the control unit 116, by instruction of the instruction section 164.

Figure 4:
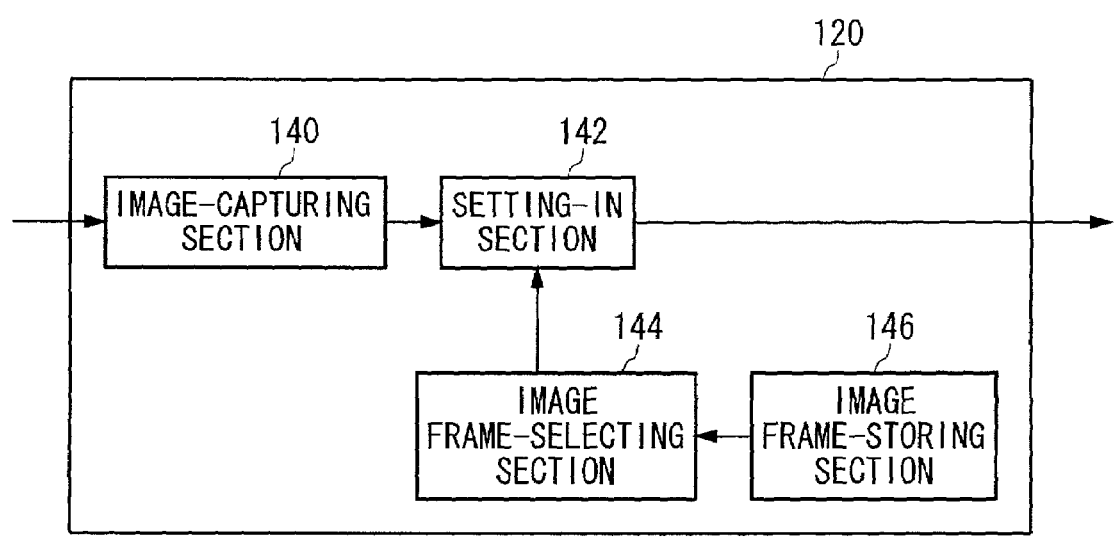
FIG. 4 is a functional block diagram of an image-capturing unit of the information intermediary apparatus according to the first embodiment of the present invention.

FIG. 4 is a functional block diagram of an image-capturing unit 120 of the information intermediary apparatus 100. The image-capturing unit 120 includes an image-capturing section 140, a setting-in section 142, an image frame-selecting section 144, and an image frame-storing section 146.

The image-capturing section 140 photographs images and sends the photographed images to the setting-in section 142. The image frame-storing section 146 stores a plurality of image frames. The image frame-selecting section 144 selects an image frame from image frames stored in the image frame-storing section 146 based on the input contents from the operations unit 110. The image frame-selecting section 144 sends the selected image frame to the setting-in section 142. The setting-in section 142 creates image data by setting in the image received from the image-capturing section 140 on the image frame received from the image frame-selecting section 144.

Figure 5:
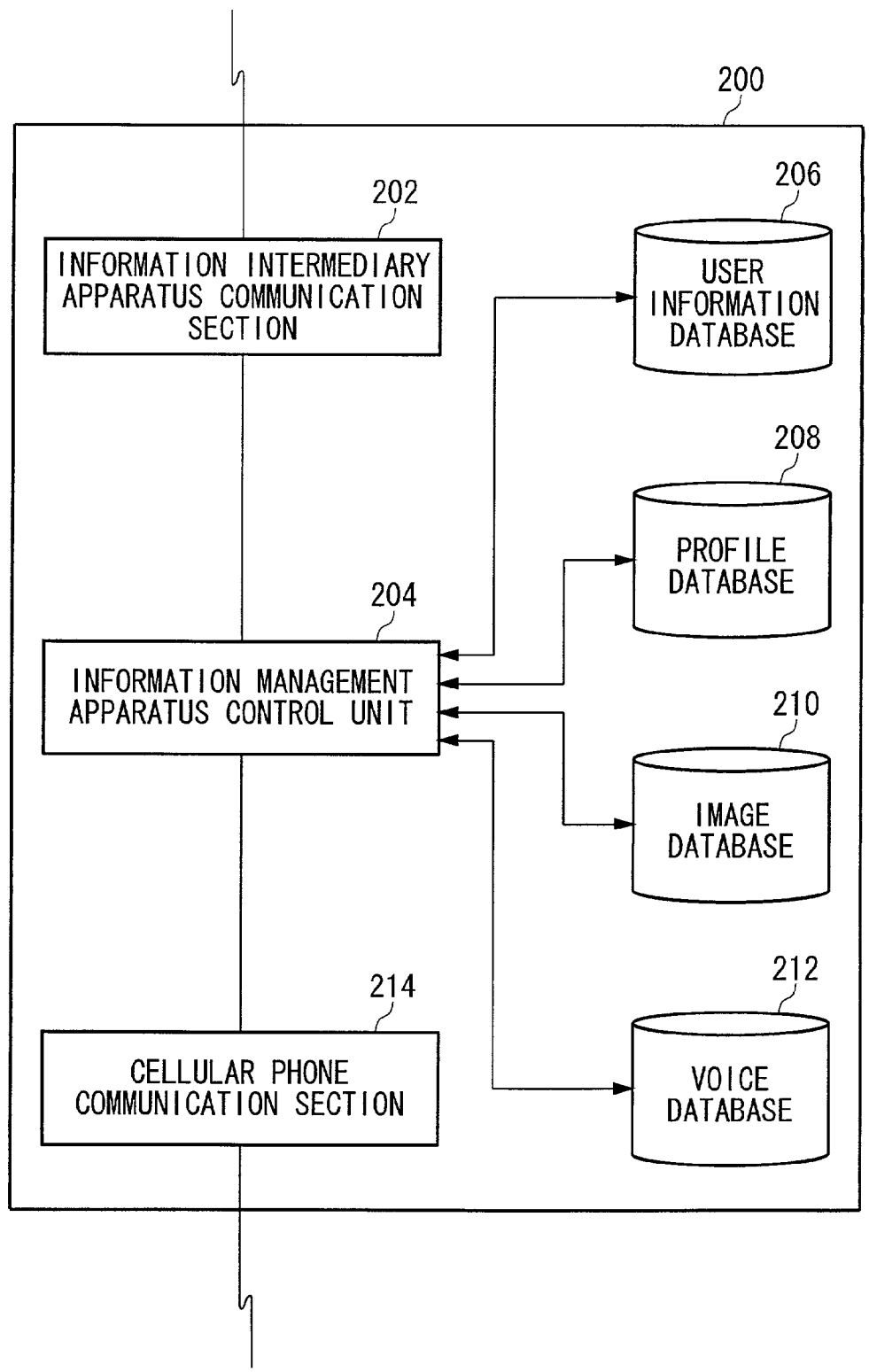
FIG. 5 is a functional block diagram of an information management apparatus according to the first embodiment of the present invention.
Figure 55:
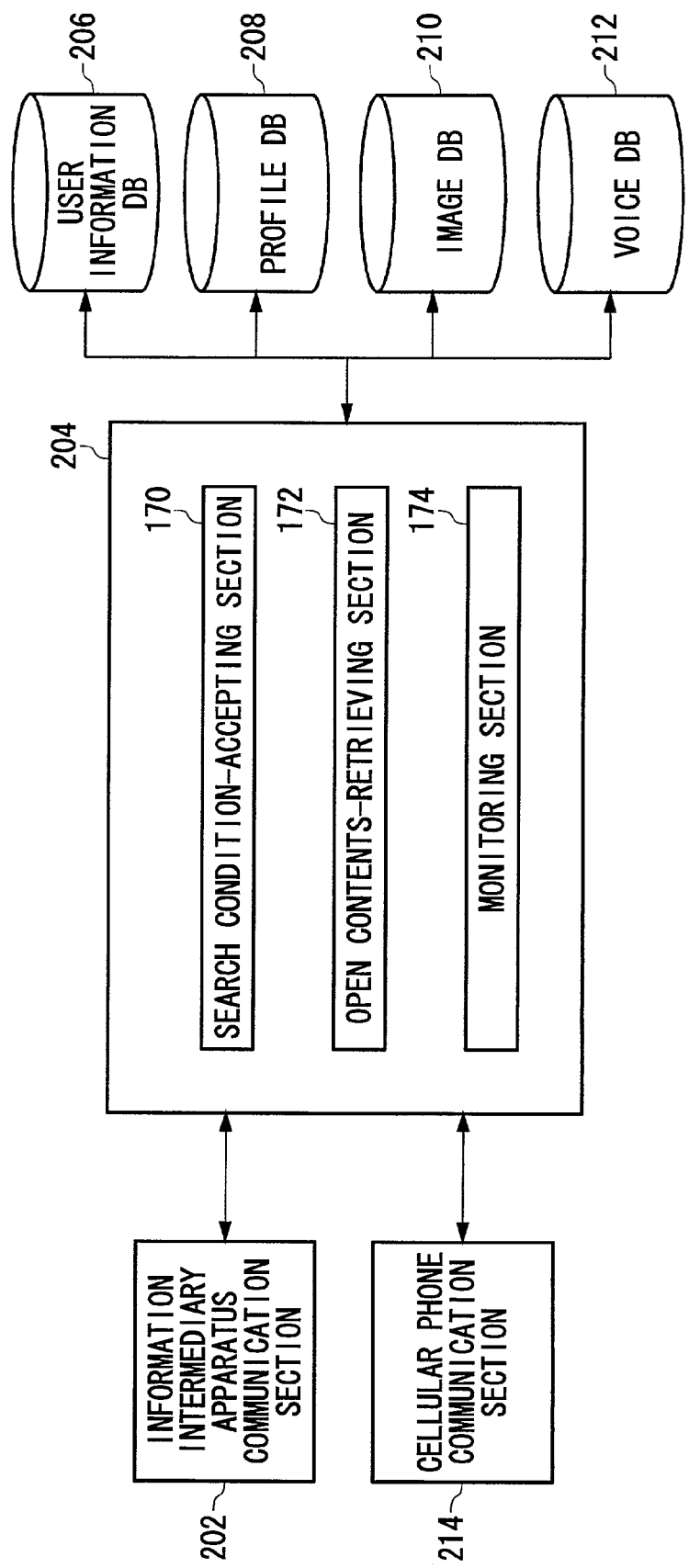
FIG. 55 is a functional block diagram of the information management apparatus control unit 204 according to the first embodiment.

FIG. 5 is a functional block diagram of an information management apparatus 200. The information management apparatus 200 includes an information intermediary apparatus communication section 202, an information management apparatus control unit 204, a user information database 206, a profile database 208, an image database 210, a voice database 212, and a cellular phone communication section 214. FIG. 55 is a functional block diagram of the information management apparatus control unit 204 according to the present embodiment. The information management apparatus control unit 204 includes a search condition-accepting section 170, an open contents-retrieving section 172, and a monitoring section 174. The functions of each section of the information management apparatus control unit 204 described above may be provided by software stored in a CPU as well as a ROM disk and a RAM disk and be executed by the CPU. The functions of the information management apparatus control unit 204 are described by referring to both FIG. 5 and FIG. 55.

The information intermediary apparatus communication section 202 communicates with the information intermediary apparatus 100. The information intermediary apparatus communication section 202 receives at least one of the data among identification information, images, and profiles from the information intermediary apparatus 100. The information intermediary apparatus communication section 202 further receives information of designated contents to be disclosed and position information showing the position where the cellular phone 400 is placed.

The user information database 206 stores file names of data included in user information by associating with cellular phone numbers. The profile database 208, the image database 210, and the voice database 212 respectively stores profiles, images, and voice messages by associating with cellular phone numbers.

The information management apparatus control unit 204 receives user information from the information intermediary apparatus communication section 202 and gives an ID number for identifying user information. The information management apparatus control unit 204 sends the user information with given ID numbers to the user information database 206, the profile database 208, the image database 210, and the voice database 212.

The information management apparatus control unit 204 also retrieves user information including data that hits the search conditions from the open contents and the non-open contents, which are stored in the user information database 206, the profile database 208, the image database 210, and the voice database 212, based on the search conditions received by the search condition-accepting section 170 through the information intermediary apparatus communication section 202 or the cellular phone communication section 214. The open contents-retrieving section 172 of the information management apparatus control unit 204 retrieves open contents from the retrieved user information. The open contents-retrieving section 172 sends the retrieved open contents to the information intermediary apparatus 100 through the information intermediary apparatus communication section 202.

The cellular phone communication section 214 sends the data received from the information management apparatus control unit 204 to a certain cellular phone. The monitoring section 174 constantly monitors input profiles and images and checks if there is the same profile or image as stored in the user information database 206, the profile database 208, or the image database 210.

FIG. 6 is a table showing the data structure of the user information database 206. The user information database 206 stores cellular phone numbers included in user information, position information, images, profiles, and voice messages, by associating with ID numbers of user information. The image of a group user including a plurality of users is stored by associating with user information of each user included in the group user. For registering a group user, one ID number is given to the image of the group user. That is, the same ID number is given to user information of each user, which is included in group user information. Thus, user information of each user included in a group user can be stored by associating with the same ID number. Moreover, since the user information database 206 stores the file names of images, profiles, and voice messages by associating with ID numbers, the correspondence relationship of this data can be recognized.

When the user information database 206 stores a plurality of user information having the same ID number included in the group user information, the user information database 206 compares cellular phone numbers of a plurality of user information. The user information including a smaller number of phone numbers is sequentially stored when a phone number is considered as an 11-digit number. Thus, since user information is stored regularly, users can make an effective search when searching data stored in the user information database 206.

Further, among the data stored in the user information database 206, a flag is given to open contents. Thus, the information management apparatus control unit 204 can judge whether the contents should be disclosed.

FIG. 7 is a table showing the data structure of the profile database 208. The profile database 208 stores profiles of each user including phone number, sex, birthday, address, character, interest, favorite food, favorite music, text message, and voice message. This data is stored by associating with phone numbers of users' cellular phones. Thus, profile data is stored by associating with cellular phone numbers. So, when one user registers himself/herself to a plurality of groups, user information of the same user that is redundantly stored may be avoided. Therefore, memory can be effectively used.

Also, as shown in FIG. 7, flags are given to the contents to be disclosed so that open contents may be easily retrieved from the stored contents.

The data structures of the image data and the voice data stored in the image database 210 and the voice database 212, respectively, are similar to the structure of the profile database 208 described using FIG. 7. That is, the image database 210 and the voice database 212 store images and voice messages, respectively, by associating with cellular phone numbers.

Figure 8:
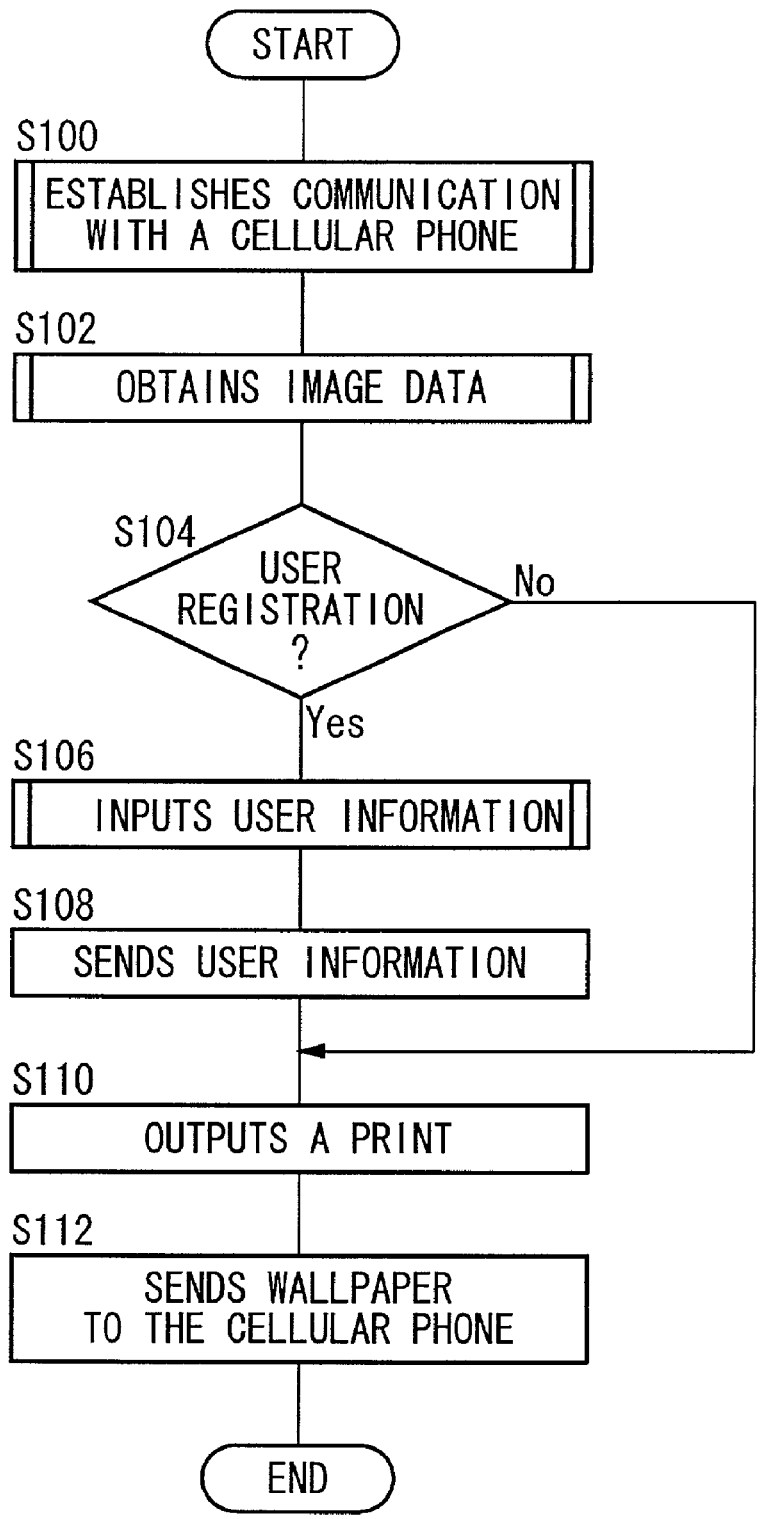
FIG. 8 is a flowchart showing the operations of the information intermediary apparatus when photographing an image.

FIG. 8 is a flowchart showing the operations of the information intermediary apparatus 100 when photographing an image to make a user registration. If the cellular phone 400 is placed on the cellular phone entry 104A, 104B, or 104C, the operations of the information intermediary apparatus 100 starts. The cellular phone communication section 112 establishes communication with the cellular phone 400 placed on the cellular phone entry 104A, 104B, or 104C, at S100.

The image-capturing unit 120 then photographs an image of a user who gets lined up in front of the information intermediary apparatus 100, at S102. When making a user registration, at S104, the user inputs user information by using the operations unit 110, at S106. At S104, when making no user registration, the operation jumps to S110.

When inputting of user information is completed, the information management apparatus communication section 134 sends the input user information to the information management apparatus 200 through the communication network 300, at S108. The control unit 116 then receives the image stored in the image memory 122 and sends the received image to the printer 106. The printer 106 prints out the received image, at S110. The control unit 116 then sends the image stored in the image memory 122 to the cellular phone 400 through the cellular phone communication section 112 to be used as wallpaper of the cellular phone 400, at S112. The operations of the information intermediary apparatus 100 for registering user information ends with the operations described above. Thus, since the registration of user information is undertaken while printing the photographed image and sending the image to the cellular phone 400 of the user, the waiting time can be effectively used.

Figure 9A:
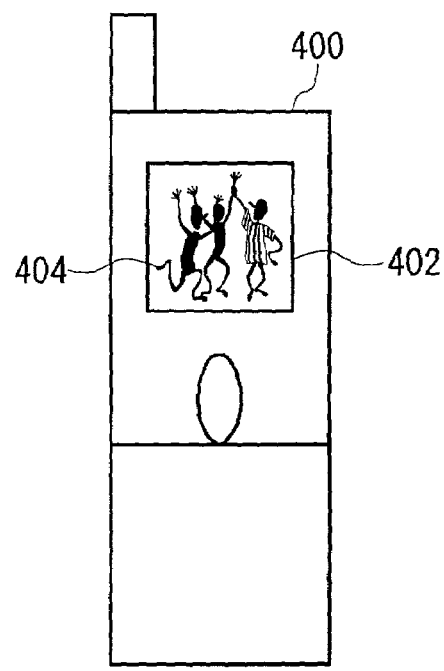
FIGS. 9A and 9B illustrate exemplary diagrams of a seal output from a printer and wallpaper displayed on a cellular phone.
Figure 9B:
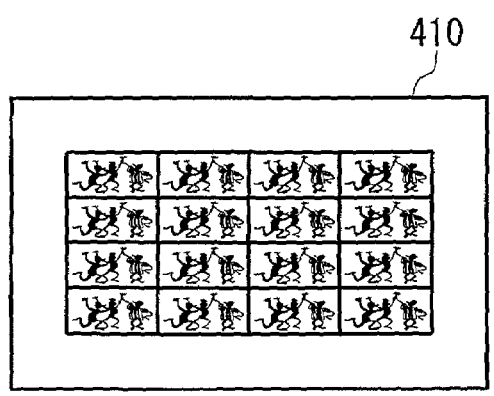

FIG. 9A illustrates an exemplary diagram of wallpaper displayed on a cellular phone 400. FIG. 9B illustrates an exemplary diagram of a seal 410 output from a printer 106. As shown in FIG. 9A, users may obtain images photographed by the image-capturing unit 120 as wallpaper 404 to be displayed on a cellular phone display 402. The image seal 410 is a print of a user image output from the printer 106.

Figure 10:
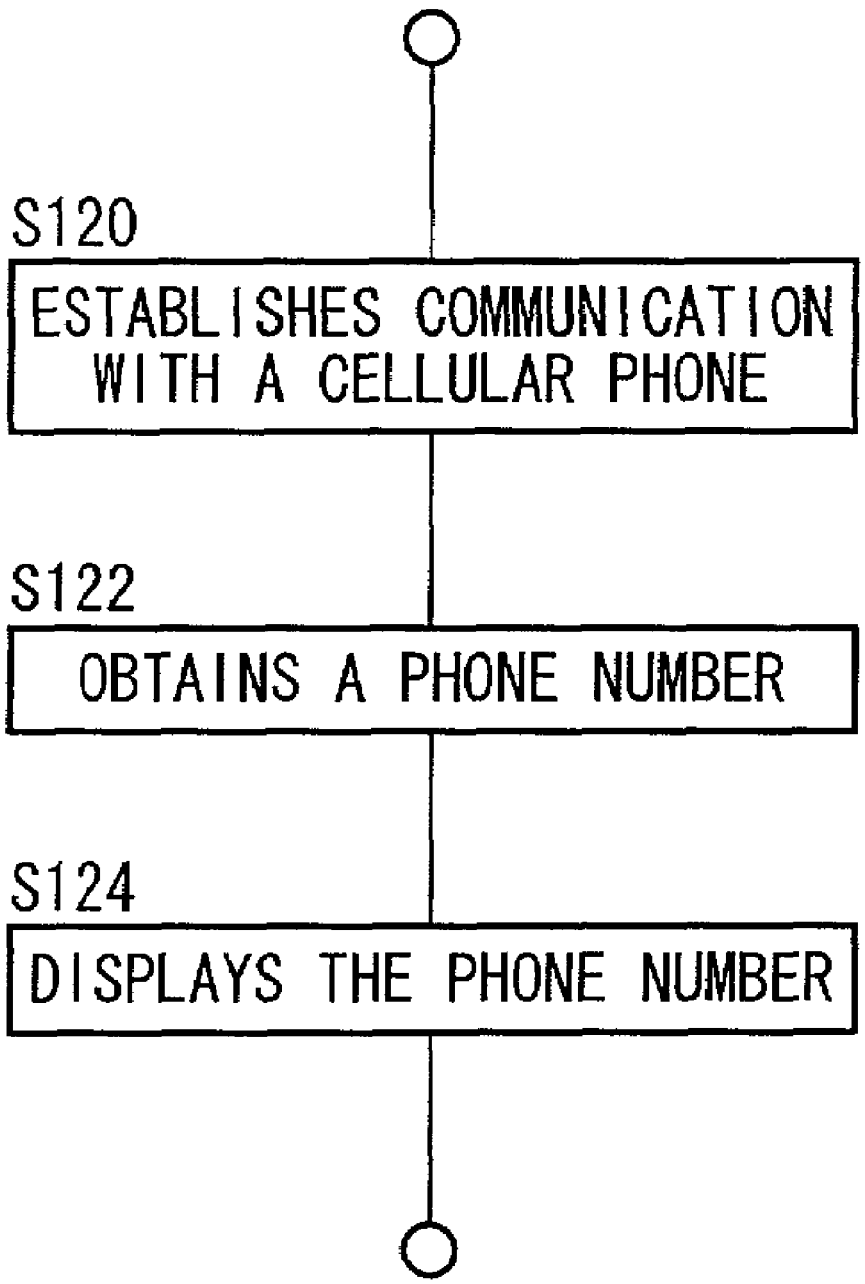
FIG. 10 is a flowchart showing the detailed operations of the information intermediary apparatus when establishing communication at S100 in FIG. 8.

FIG. 10 is a flowchart showing the detailed operations of the information intermediary apparatus 100 when establishing communication at S100 in FIG. 8. If the cellular phone 400 is placed on the cellular phone entry 104A, 104B, or 104C, communication between the cellular phone communication section 112 and the cellular phone 400 is established, at S120. The cellular phone communication section 112 then obtains a phone number of the cellular phone 400 connected to the cellular phone entry 104A, 104B, or 104C. If a plurality of cellular phones 400 are connected, a phone number of each cellular phone is obtained. The cellular phone communication section 112 also creates position information showing to which entry of the cellular phone entries 104A, 104B, and 104C the cellular phone 400 is connected. The created position information is sent to the identification information memory 114 by associating with the phone number of the cellular phone 400, at S122.

When the phone number is stored in the identification information memory 114, the control unit 116 sends the phone number stored in the identification information memory 114 to the LCD monitor 102. The LCD monitor 102 displays the received phone number, at S124. Thus, the information intermediary apparatus 100 can identify the user by the phone number of the cellular phone 400. Moreover, the user can recognize the establishment of communication with the cellular phone 400 by the contents displayed on the LCD monitor 102.

Figure 11:
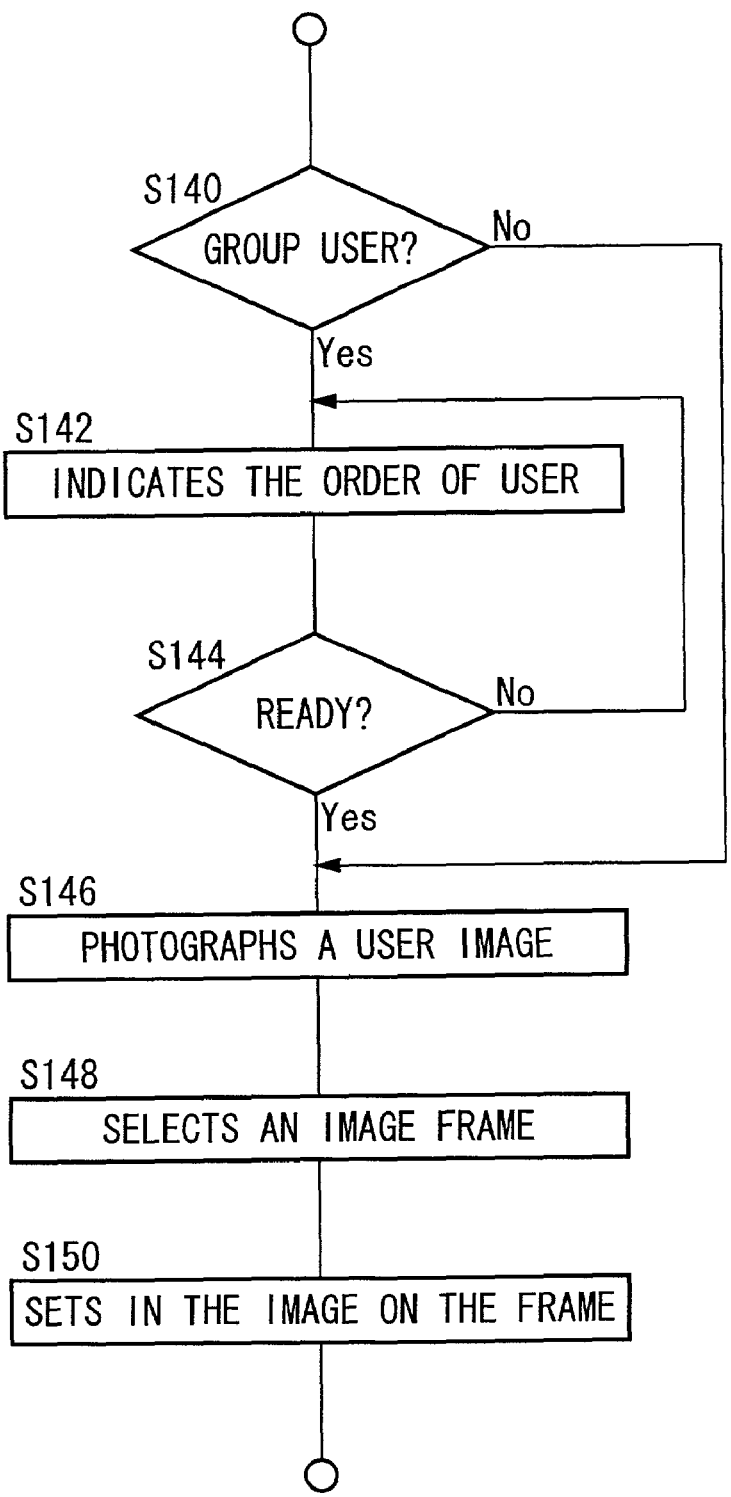
FIG. 11 is a flowchart showing the detailed operations of the information intermediary apparatus when obtaining an image at S102 in FIG. 8.

FIG. 11 is a flowchart showing the detailed operations of the information intermediary apparatus 100 when obtaining an image at S102 in FIG. 8. When a plurality of cellular phones 400 have established communications, that is, when photographing an image of a group user, at S140, the control unit 116 sends to the LCD monitor 102 order information showing the order of users to be lined up, by the order corresponding to the phone numbers and position information stored in the identification information memory 114. The LCD monitor 102 displays the order information and indicates the order the users are to be lined up. In other words, the LCD monitor 102 indicates each user to line up in the order corresponding to the phone number of each user of the group user, at S142.

When the users are ready, the users notify the information intermediary apparatus 100 that they have become ready, by using the operations unit 110, at S144. The image-capturing section 140 then photographs an image of the users, at S146. At S140, when photographing an image of one user, the operation jumps to S146. The users then select a desired image frame from image frames stored in the image frame-storing section 146, at S148. The setting-in section 142 creates an image for outputting by setting in the image received from the image-capturing section 140 on the image frame selected by the users, at S150. Moreover, the selection of an image frame may be undertaken before photographing the image or before indicating the order of users to be lined up.

FIG. 12 illustrates an exemplary display screen displayed on an LCD monitor 102 when indicating the order of users to be lined up at S142 in FIG. 11. The LCD monitor 102 in FIG. 12 displays order information. As shown in FIG. 12, when photographing an image of a group user including a plurality of users, the LCD monitor 102 indicates users to line up in the order corresponding to the order to be placed on the cellular phone entries 104A, 104B, and 104C. Thus, a plurality of users in the image and the cellular phone number of each user can be easily associated with each other.

Figure 13:
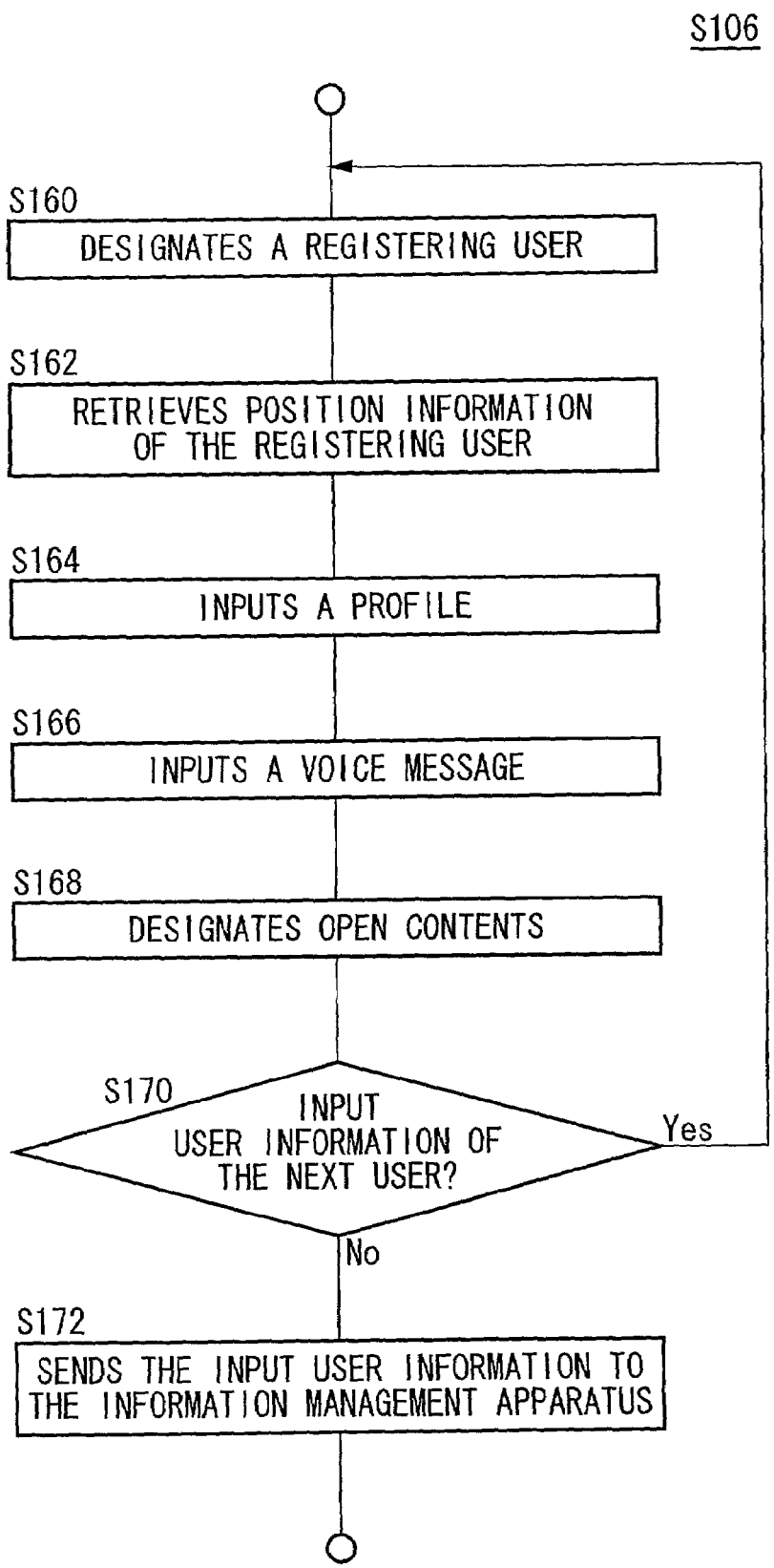
FIG. 13 is a flowchart showing the detailed operations of the information intermediary apparatus when entering a profile at S106 in FIG. 8.

FIG. 13 is a flowchart showing the detailed operations of the information intermediary apparatus when entering a profile at S106 in FIG. 8. The control unit 116 retrieves cellular phone numbers stored in the identification information memory 114. For a group user, the phone number of one of the users in the group user is retrieved. The control unit 116 instructs the LCD monitor 102 to display the contents for letting the user, who owns the cellular phone with the retrieved number, input user information, at S160.

The control unit 116 then retrieves position information showing the position that corresponds to the retrieved number, and sends the position information to the voice data memory 124 and the profile memory 126, at S162. The LCD monitor 102 displays a screen for inputting a profile. The operations unit 110 then accepts instructions from the user. The control unit 116 creates a profile and sends the created profile to the profile memory 126. The profile memory 126 stores the received profile by associating with the position information received from the control unit 116, at S164.

The microphone 108 then accepts voice messages that are input from the user. The voice data memory 124 receives the voice messages and stores the messages by associating with the position information received from the control unit 116, at S166.

The control unit 116 then creates information of designated contents to be disclosed on the communication network 300, which are selected from among the cellular phone numbers, the images, the profiles, and the voice messages, based on input contents from the operations unit 110. The control unit 116 stores the created information of designated contents to be disclosed in the open contents memory 128, at S168.

When inputting user information of the next user, at S170, the operations jump back to S160 and repeat the inputting process of user information. Finally, the cellular phone numbers and the position information stored in the identification information memory 114, the images stored in the image memory 122, the voice messages stored in the voice data memory 124, and the profiles stored in the profile memory 126 are sent to the information management apparatus communication section 134, at S172. Thus, since user information that corresponds to one image is sent to the information management apparatus communication section 134 all at the same time, user information corresponding to one image may be recognized.

Moreover, profiles and voice messages are stored by associating with position information, and the position information is associated with cellular phone numbers stored in the identification information memory 114. Therefore, the profiles and the voice messages stored respectively in the profile memory 126 and the voice data memory 124 maybe recognized depending on which cellular phone number the profiles and the voice messages correspond.

FIG. 14A illustrates an exemplary display screen displayed on the LCD monitor 102 when entering a profile at S106 in FIG. 8. As shown in FIG. 14A, the cellular phone number of the user to be registered is displayed. The entry items of the profile are previously determined so that a user enters user information into each item. On the left side of each item, a check box is placed. To designate contents to be disclosed, the check box of the corresponding item is checked. In this way, the user may input his/her profile according to the display of the LCD monitor 102. When these items are completed, the control unit 116 stores the input information in the profile memory 126. The control unit 116 then instructs the LCD monitor 102 to display a message for letting the user input a voice message. The microphone 108 catches the voice message, and the caught voice message is stored in the voice data memory 124.

FIG. 14B illustrates an exemplary display screen showing the profile items being completed and the required check boxes being checked. In the example shown in FIG. 14B, the user has checked the check boxes of birthday, interest, favorite food, favorite music, and voice message. That is, the user permits to disclose such information to a third party. When the designation of the open contents is completed, the control unit 116 stores the names of the checked items as information of designated contents to be disclosed, in the open contents memory 128.

Figure 15:
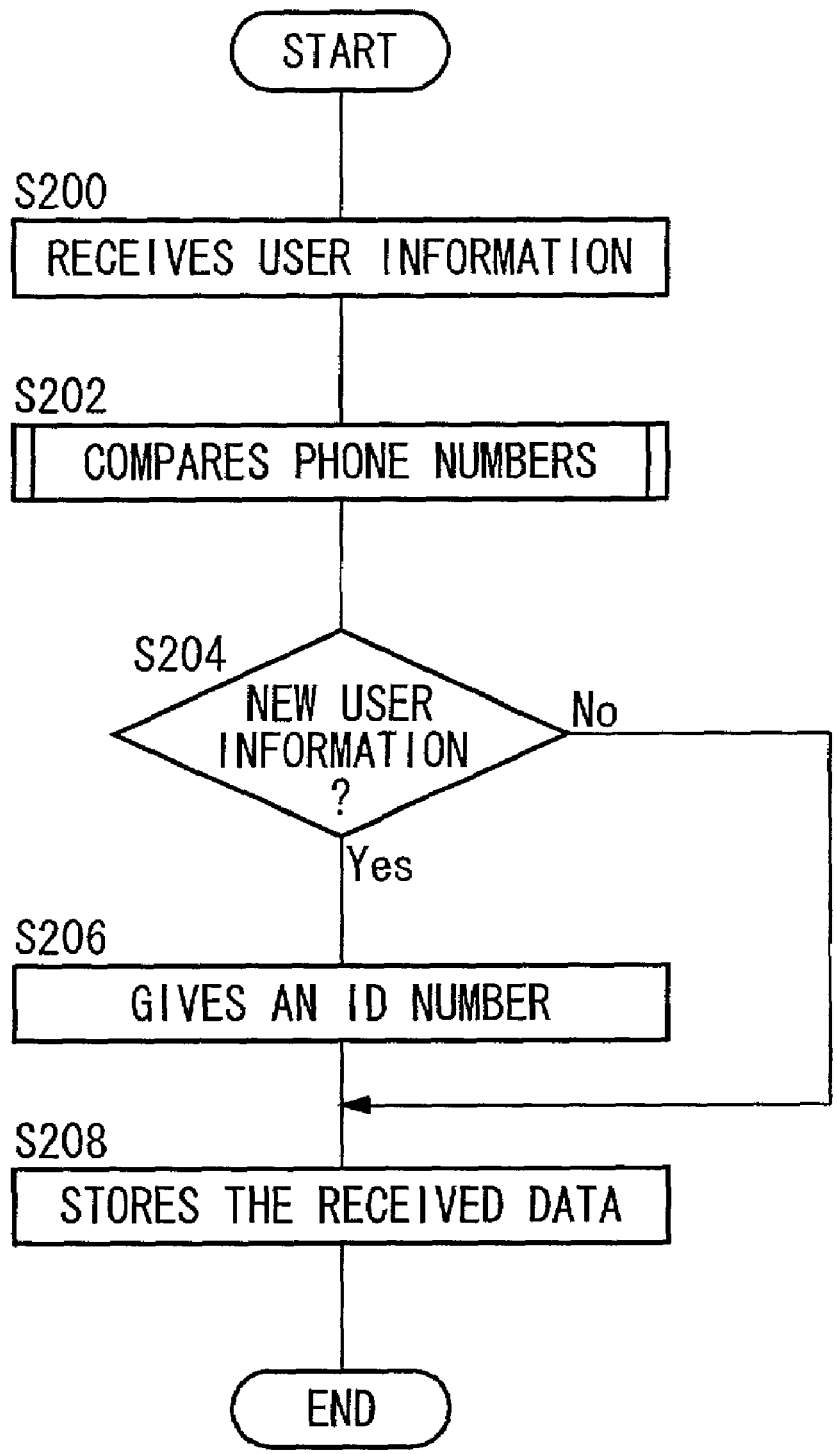
FIG. 15 is a flowchart showing the operations of the information management apparatus when registering user information.

FIG. 15 is a flowchart showing the operations of the information management apparatus 200 when registering user information. The information management apparatus 200 receives cellular phone numbers, position information, images, profiles, and voice messages through the information intermediary apparatus communication section 202, at S200. The information intermediary apparatus communication section 202 then sends the received user information to the information management apparatus control unit 204. The information management apparatus control unit 204 associates the received image with the cellular phone numbers, position information, profiles, and voice messages. The information management apparatus control unit 204 compares the phone number stored in the user information database 206 with the phone number included in the user information received from the information intermediary apparatus communication section 202, at S202.

If the phone number stored in the user information database 206 and the phone number included in the user information received from the information intermediary apparatus communication section 202 is different, at S204, the information management apparatus control unit 204 recognizes the received phone number as the user information of a new user and gives an ID number to the user information, at S206. The information management apparatus control unit 204 stores the user information with the given ID number in the user information database 206, the profile database 208, the image database 210, and the voice database 212, at S208.

At S204, if the phone number included in the user information received from the information intermediary apparatus communication section 202 coincides with the phone number already stored in the user information database 206, the information management apparatus control unit 204 deletes the image, the profiles, and/or voice messages, corresponding to the phone numbers, which are stored in the user information database 206, and rewrites them into the image data, profile data, and/or voice messages received from the information intermediary apparatus communication section 202.

Figure 16:
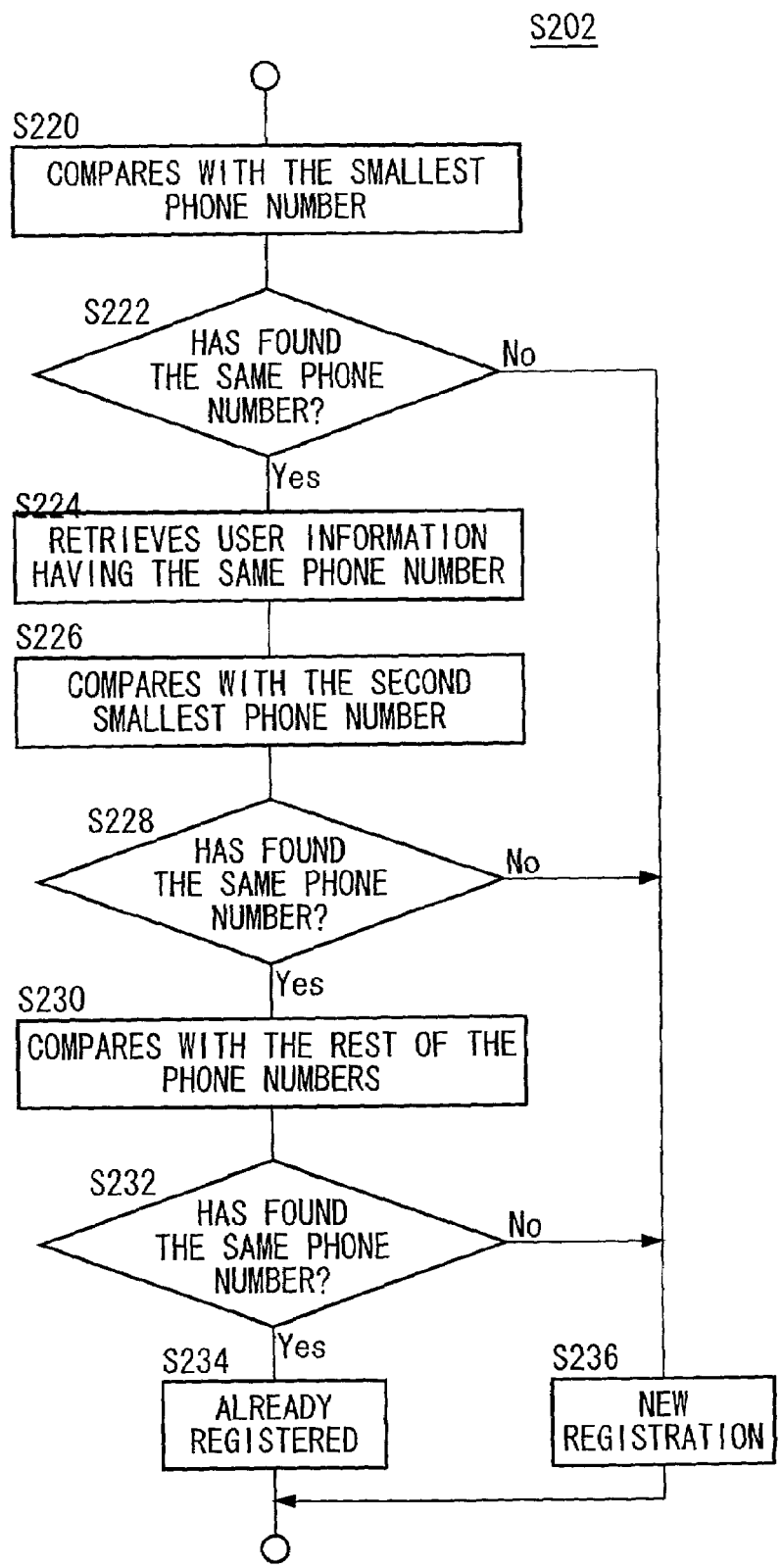
FIG. 16 is a flowchart showing the detailed operations of the information management apparatus when comparing phone numbers at S202 in FIG. 15 if an information intermediary apparatus communication section receives user information of a group user.

FIG. 16 is a flowchart showing the detailed operations of the information management apparatus 200 when comparing phone numbers at S202 in FIG. 15 if an information intermediary apparatus communication section 202 receives user information of a group user comprising three users. The information management apparatus control unit 204 retrieves the smallest number among the phone numbers included in the received user information, considering the phone numbers as 11-digit numbers. The information management apparatus control unit 204 then compares the smallest phone number with the phone numbers stored in the user information database 206, at S220. Since, for a group user, the user information stored in the user information database 206 is stored in ascending order of phone numbers, the top of the listed numbers should be used for comparing if there is a plurality of phone numbers having the same ID number.

When the user information database 206 stores the same phone number as the phone number retrieved by the information management apparatus control unit 204, at S222, the information management apparatus control unit 204 retrieves user information including the same phone number from the user information database 206, at S224. The information management apparatus control unit 204 retrieves the second smallest phone number included in the user information received from the information intermediary apparatus communication section 202. The information management apparatus control unit 204 then compares the retrieved second smallest phone number with the phone number stored in the second place in each user information retrieved from the user information database 206, at S226. If both phone numbers coincide, at S228, the information management apparatus control unit 204 compares the third phone number included in the user information having the coincided phone number with the rest of the phone numbers included in the user information received from the information intermediary apparatus communication section 202, at S230. If both phone numbers coincide, at S232, the group user of the user information received by the information intermediary apparatus communication section 202 is judged as already being stored in the user information database 206, at S224.

If both phone numbers do not coincide at S222, S228, and S232, the group user of the user information received from the information intermediary apparatus communication section 202 is judged as a new group user, at S236. Thus, for group users, it may be avoided to redundantly register group users with the same combination.

Figure 17:
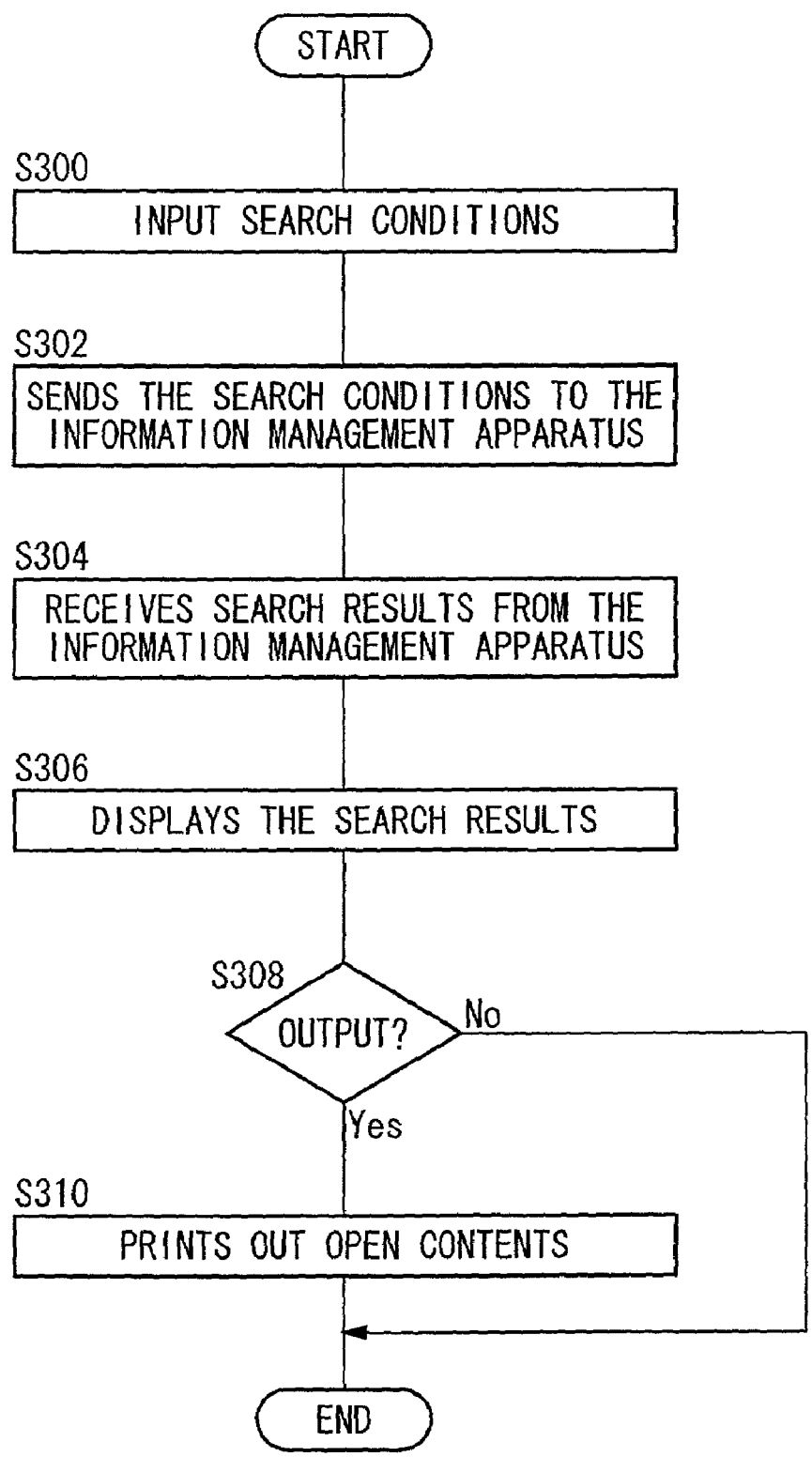
FIG. 17 is a flowchart showing the operations of the information intermediary apparatus when searching user information.

FIG. 17 is a flowchart showing the operations of the information intermediary apparatus 100 when searching user information. Here, users who have registered user information to the information management apparatus 200 are referred to as "registered users," and users who make a search are referred to as "browsing users." A browsing user inputs search conditions, at S300. The search conditions are, for example, sex, address, age, and character. The information management apparatus communication section 134 sends the search conditions to the information management apparatus 200, at S302. The information management apparatus communication section 134 receives user information that coincides with the search conditions from the information management apparatus 200, at S304. The LCD monitor 102 displays the received user information, at S306. If the user wants to print out the received user information, at S308, the control unit 116 instructs the printer 106 to print out the search results, at S310. At S308, if the user does not want to print out the search results, the operations skip S310. The operations of the information intermediary apparatus 100 when searching user information, is then completed.

Figure 18:
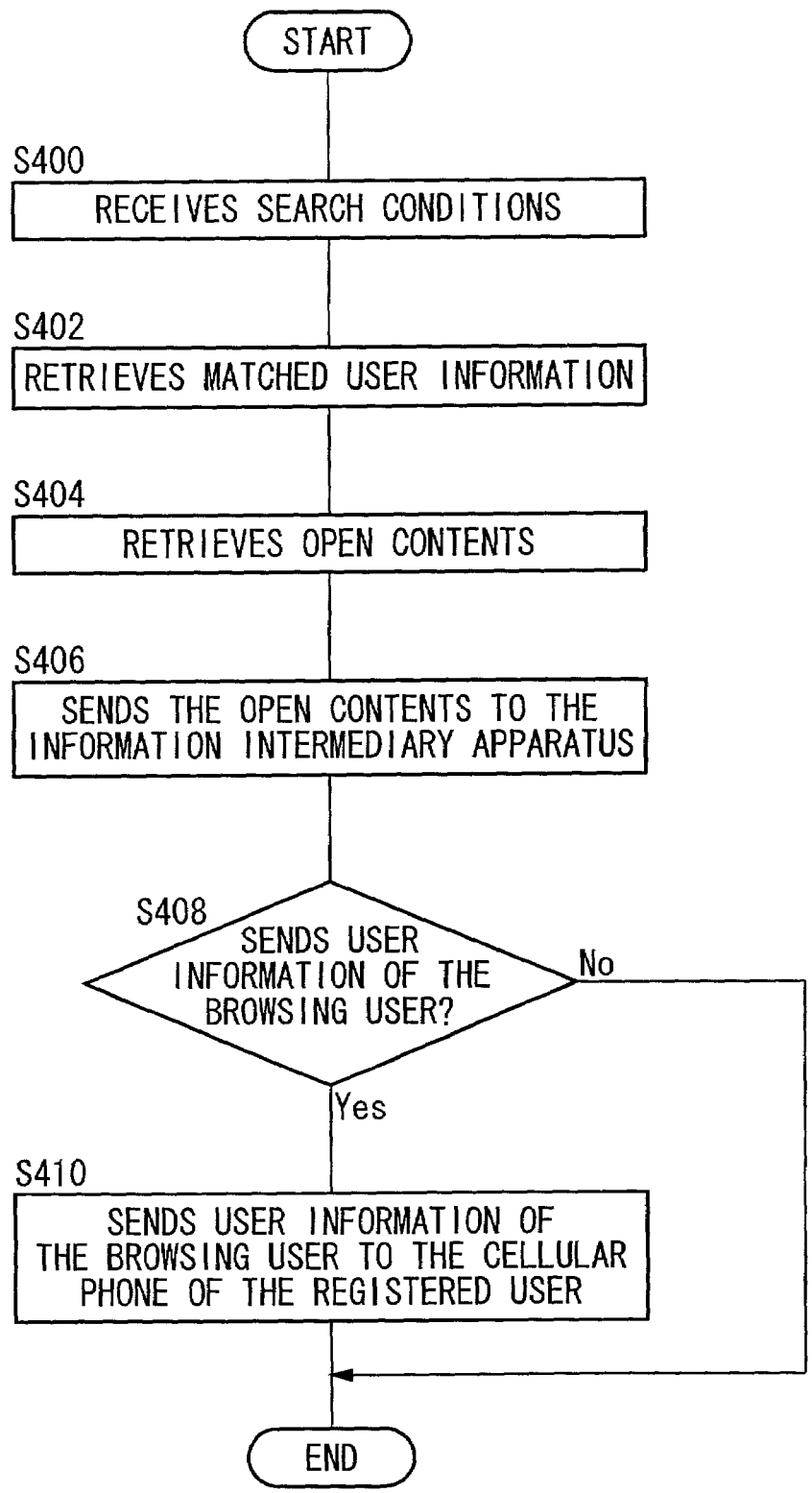
FIG. 18 is a flowchart showing the operations of the information management apparatus when searching user information.

FIG. 18 is a flowchart showing the operations of the information management apparatus 200 when searching user information. If a browsing user inputs search conditions to the information intermediary apparatus 100, the information intermediary apparatus communication section 202 receives the search conditions and sends the received search conditions to the information management apparatus control unit 204, at S400. The information management apparatus control unit 204 then compares the profiles stored in the profile database 208 with the search conditions, and retrieves user information that matches the search conditions, at S402. At this time, the information management apparatus control unit 204 retrieves user information that matches the search conditions based on both the profile data of the open contents and the non-open contents. Thus, since the non-open contents are also considered, user information that is closer matched to the search conditions may be retrieved.

The information management apparatus control unit 204 then retrieves the data designated as open contents from among the retrieved user information, at S404. The information intermediary apparatus communication section 202 sends the retrieved open contents to the information intermediary apparatus 100, at S406.

When the information management apparatus control unit 204 sends the user information of the browsing user to the cellular phone 400 of the registered user, at S408, the information management apparatus control unit 204 sends the user information of the browsing user to the cellular phone communication section 214. The cellular phone communication section 214 sends the user information of the browsing user to the cellular phone 400 of the registered user, at S410. When not sending the user information of the browsing user to the cellular phone 400 of the registered user, at S408, the operations skip S410. The operations of the information management apparatus 200 when searching user information, is then completed.

As the first change, according to the present embodiment, although the information intermediary apparatus 100 associates user information of each user with the image of a group user, one profile may be input for the image of a group user and one profile may be associated with the image of the group user.

As the second change, according to the present embodiment, although the information intermediary apparatus 100 associates a phone number of each user in a group user with the position in the image for images of group users, the combinations of phone numbers of each user may be associated with the image of the group user.

As the third change, according to the present embodiment, although the information intermediary apparatus 100 and the cellular phone 400 communicate through the cellular phone entry 104A, 104B, or 104C, the information intermediary apparatus 100 and the cellular phone 400 may communicate through the Bluetooth. In this case, the association may be made according-to the order of establishment of communication associating each user of a group user with the cellular phone 400. As another embodiment, a user may call the information intermediary apparatus 100 from the cellular phone 400. In this case also, each user of a group user may be associated with a phone number according to the order of establishment of communication.

As the fourth change, although three cellular phone entries 104A, 104B, and 104C are placed on the information intermediary apparatus 100 according to the present embodiment, the number of cellular phone entries is not limited.

As the fifth change, according to the present embodiment, although users browse user information on the information intermediary apparatus 100, the information intermediary apparatus 100 may distribute user information to a plurality of users through a communication network such as the Internet.

(A Second Embodiment)

The second embodiment according to the present invention is now described in the following.

Figure 19:
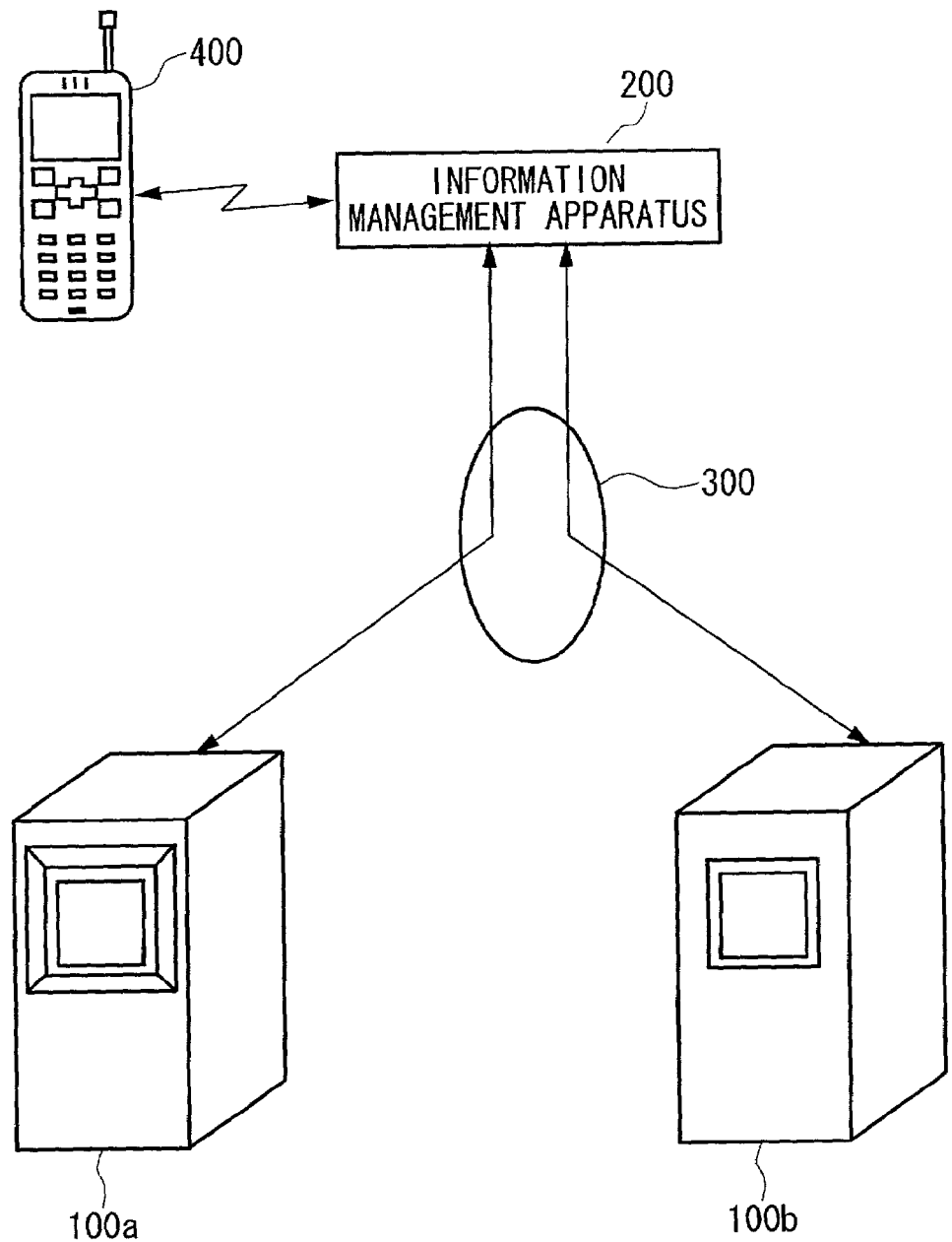
FIG. 19 is a diagram showing the entire information communication system including the information management apparatus according to a second embodiment of the present invention.

FIG. 19 is a diagram showing the entire information communication system including the information management apparatus 200 according to the second embodiment of the present invention. The information communication system according to the present embodiment differs from the information communication system according to the first embodiment in that the system according to the present embodiment includes a cellular phone 400 that may communicate with the information management apparatus 200 through a communication line for cellular phones.

The information management apparatus 200 includes databases for user information and advertisements. The user information is information including image information of users who use the information communication system, voice information, and text information relating to the profiles of users. The user information stored in the information management apparatus 200 may be searched by sending search conditions from the information intermediary apparatus 100 or the cellular phone 400 to the information management apparatus 200. When the search conditions are sent, the information management apparatus 200 searches user information that matches the search conditions as well as retrieving advertisements that satisfy predetermined conditions from the database for advertisements. Moreover, the information management apparatus 200 sends the retrieved advertisements with the user information obtained as a result of the search to the information intermediary apparatus 100 or the cellular phone 400. Thus, according to the present embodiment, advertisements are sent to users.

Figure 20:
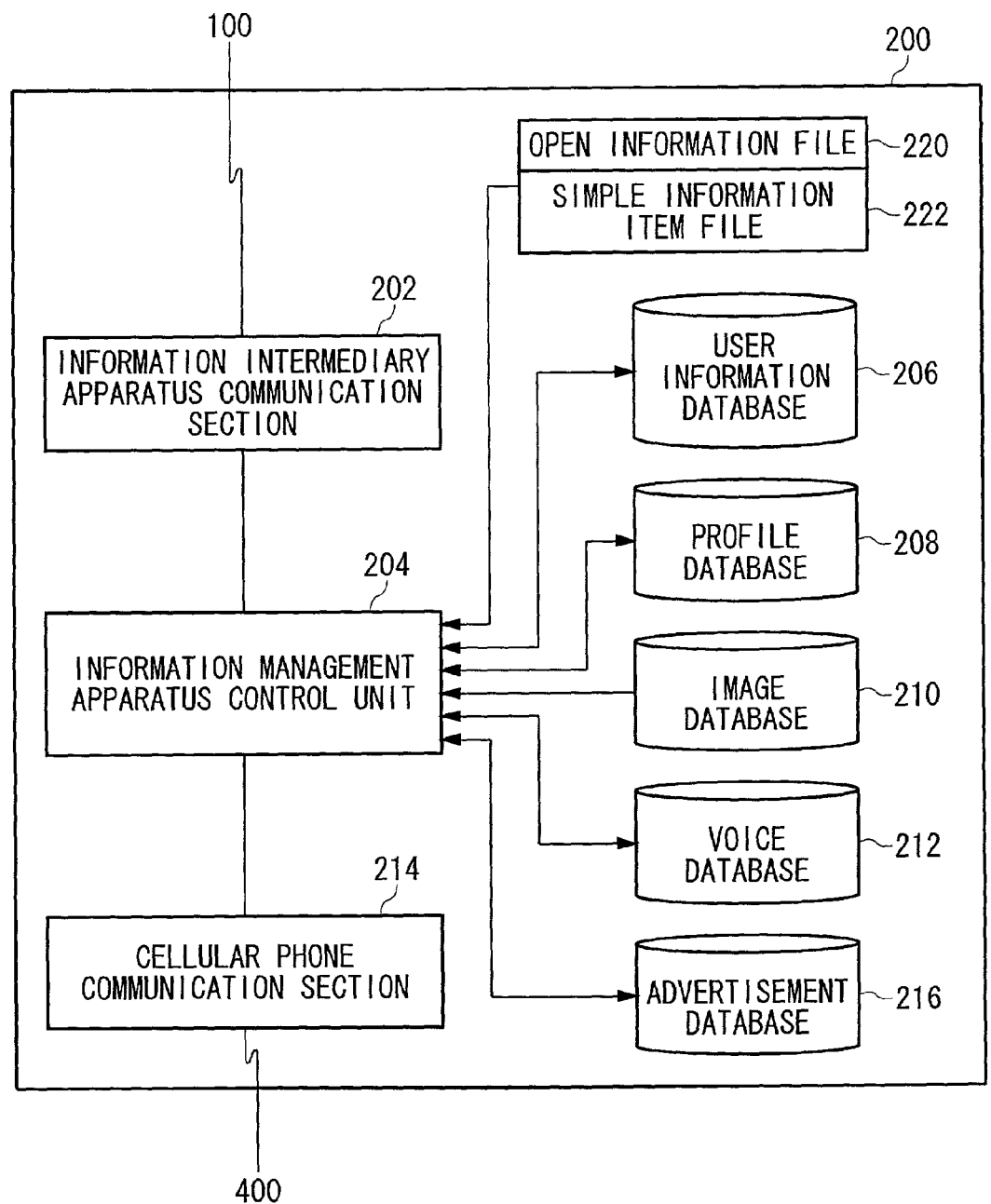
FIG. 20 is a functional block diagram of the information management apparatus according to the second embodiment of the present invention.

FIG. 20 is a functional block diagram of the information management apparatus 200 according to the second embodiment of the present invention. The information management apparatus 200 according to the present embodiment differs from the first embodiment in that the information communication system according to the present embodiment includes an advertisement database 216 for storing advertisements to be distributed to users.

Further, instead of the open contents memory 128 of the information intermediary apparatus 100 according to the first embodiment, the information management apparatus 200 according to the present embodiment includes an open information item file 220 and a simple information item file 222. In the open information item file 220, data that designates items to be disclosed to a third party among user information (referred to as an "open information item" hereinafter, and also referred to as "open information" for information that includes only open information items) is stored. In the simple information item file 222, data that designates items to comprise simple information (referred to as a "simple information item" hereinafter) is stored. The simple information is information comprised of a part of open information and with less data than open information. The writing, reading, and deleting of data to the database and files described above are undertaken by the information management apparatus control unit 204. Since other functional elements and their functions are almost the same as those in the first embodiments, descriptions are omitted here.

Figure 56:
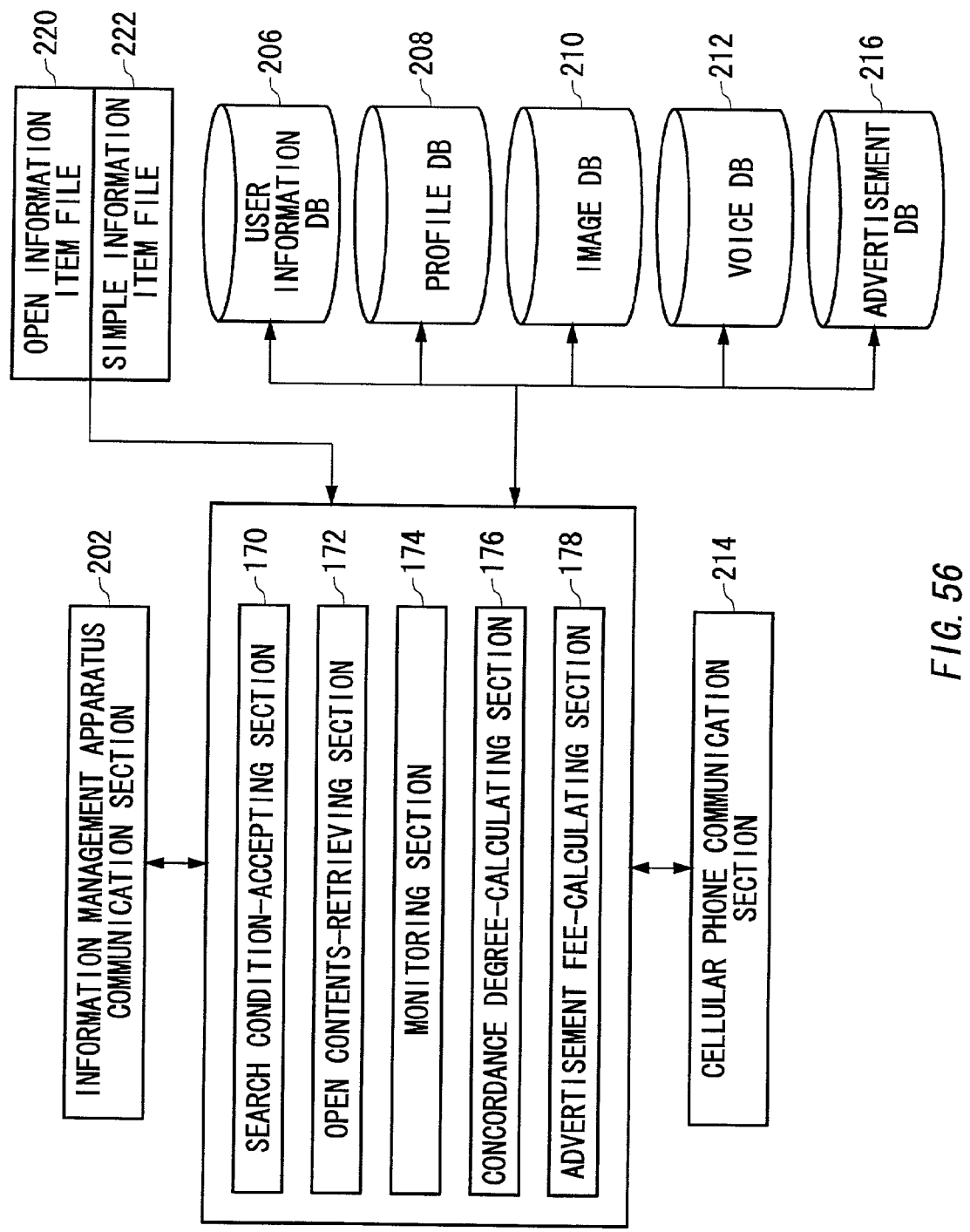
FIG. 56 is a functional block diagram of the information management apparatus control unit 204 according to the second embodiment.

FIG. 56 is a functional block diagram of the information management apparatus control unit 204 according to the present embodiment. The information management apparatus control unit 204 according to the present embodiment differs to the information management apparatus control unit 204 according to the first embodiment in that the information management apparatus control unit 204 of the present embodiment includes a concordance degree-calculating section 176 and an advertisement fee-calculating section 178. The functions of these elements are described in the following by referring both to FIG. 20 and FIG. 56.

FIG. 21 is a table showing the data structure of the advertisement database 216. According to the present embodiment, advertiser information, advertisement contents, distribution conditions, minimum values of concordance degree, the number of distribution, and the sum of advertisement fees are stored in the advertisement database by associating with advertisement ID numbers.

The advertisement ID numbers are identification numbers specific to each advertisement. In FIG. 21, advertisements with advertisement ID numbers 011, 012, and 013 are shown as an example. According to the present embodiment, the advertisement with advertisement ID number 011 is supposed as a distribution advertisement for an automobile seller to promote selling a new-model compact car. Also, the advertisement with advertisement ID number 013 is supposed as an advertisement for a bar located in a city to collect customers who favor jazz music.

The advertiser information is information relating to the address, telephone number and the like to make contact with an advertiser.

The advertisement contents are the substance of advertisements, which includes the title of advertisements, the details of advertisements, and image data. The title of advertisements is text information showing simple contents of the advertisements. The details of advertisements are text information showing the detailed contents of advertisements.

The distribution conditions are conditions, which advertisers, for example, define as conditions to be satisfied by those who are the target of advertisements. The distribution conditions with advertisement ID 011 are set as follows: "sex=female," "age=18–30," "address=Tokyo+Kanagawa," and "interest=driving+outdoors." This means that the targets of the distribution of the advertisement are those who live in Tokyo or Kanagawa aged between 18 to 30 that are female and are interested in driving or outdoors. The distribution conditions are conditions, which advertisers, for example, define as conditions to be satisfied by those who are the target of advertisements. The distribution conditions with advertisement ID 011 are set as follows: "sex=female," "age=18–30," "address=Tokyo+Kanagawa," and "interest=driving+outdoors." This means that the target of the distribution of the advertisement are those who live in Tokyo or Kanagawa aged between 18 to 30 that are female and are interested in driving or outdoors. The distribution conditions with advertisement ID 012 are set as follows: "sex=female,""age=20–25," "address=Tokyo," and "interest=travel." This means that the target of the distribution of the advertisement are those who live in Tokyo aged between 20 to 25 that are female and are interested in travel. Further, the distribution conditions with advertisement ID 013 are set as "favorite food=wine," and "favorite music=jazz." This means that the target audiences of the distribution of the advertisement are those who favor wine and jazz music.

The minimum values of concordance degree are values freely set by the value of 1 or less. According to the present embodiment, if the ratio that user information satisfies distribution conditions (referred to as a "concordance degree" hereinafter) is more than the above described minimum value of concordance degree when the contents of the registered user information and distribution conditions are compared, the advertisement is distributed to the user. According to the present embodiment, advertisers or the operators of the information communication system set the minimum values of concordance degree for each advertisement.

According to the present embodiment, the advertisement with advertisement ID 012 seeks participants of a tour for shopping brand-named products favored by young females, so the range of the target audiences of the advertisement are very clear. Thus, the advertiser sets the minimum value of concordance degree as "1.0" and designates that the advertisement be distributed to only those users who satisfies all of the four conditions set for the distribution conditions. In this case, although the number of users to actually distribute the advertisement is limited, effective advertising may be made.

The advertisements with advertisement ID 011 and 013 are advertisements relating to a compact car and a bar where wines can be enjoyed, respectively. A wide variety of people may be interested in compact cars and wines. Thus, it is difficult to strictly define the conditions for distributing these advertisements. If the minimum value of concordance degree is set "1.0" for these types of cases, the number of users the advertisements are distributed to becomes less and thus the effect of advertisement is diminished. For this reason, the advertisers set the minimum values of concordance degree as "0.5" for these advertisements and try not to strictly apply distribution conditions. In this case, the advertisements are distributed to various people thereby effective advertising may be assured.

The number of distributions is the number of times that an advertisement is in fact distributed. The sum of advertisement fees is the total fees of advertisements to charge advertisers. According to the present embodiment, the sum of advertisement fees is calculated by the product of a basic fee, the minimum value of concordance degree, and the number of distributions. Thus, the sum of advertisement fees reflects the minimum value of concordance degree. In other words, as the case of the advertisement with advertisement ID 012, when making an effective advertisement with less distribution number by setting the minimum value of concordance degree as "1.0," the value calculated by the basic fee multiplied by the number of distributions becomes the sum of advertisement fees. On the other hand, as the case of advertisement with advertisement ID 011, when distributing a lot of advertisements with less effectiveness by setting the minimum value of concordance degree low, the advertisement fee for one distribution of advertisement becomes cheaper according to the concordance degree. As a result, the sum of advertisement fees is cheaper in this case. Therefore, according to the present embodiment, advertisement fees appropriate to the effectiveness of advertisements are set by reflecting the minimum value of concordance degree to the sum of advertisement fees. According to the present embodiment, an example of calculating the sum of advertisement fees by setting the basic fee at 100 yen is shown.

Figure 22:
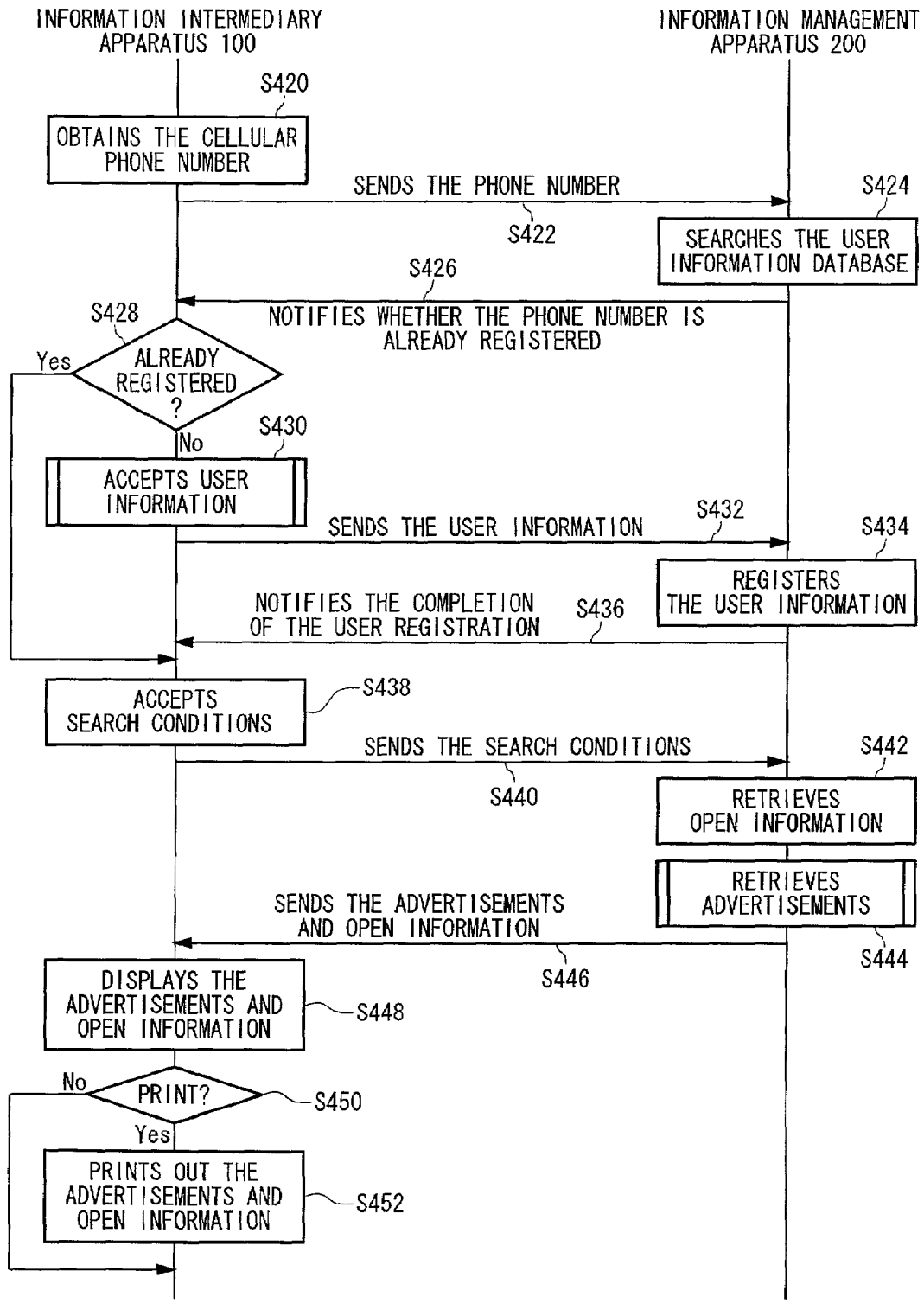
FIG. 22 is a flowchart showing the operations of the information intermediary apparatus and the information management apparatus when searching user information.

The operations of the information communication system according to the present embodiment are described in the following. FIG. 22 is a flowchart showing the operations of the information intermediary apparatus 100 and the information management apparatus 200 when searching user information. According to the present embodiment, firstly at S420~S428, it is judged whether the user who is to search user information is already registered. If the user has not been registered, the process of registering user information at S430~S436 is immediately taken. If the user has already been registered, the search of user information that the user desires to receive and the retrieval of advertisements to distribute to the user are undertaken at S438~S446. Finally, at S448~S452, user information obtained as the result of the search is provided to the user with the advertisements. The details of the above process are described in the following.

First, the user places the cellular phone 400 on the cellular phone entry 104 of the information intermediary apparatus 100. If the cellular phone 400 is placed, the cellular phone communication section 112 of the information intermediary apparatus 100 obtains the phone number from the cellular phone 400 and stores the obtained phone number in the identification information memory 114, at S420. Then, the control unit 116 of the information intermediary apparatus 100 sends the phone number stored in the identification information memory 114 to the information management apparatus 200 through the communication network 300, at S422.

The information management apparatus control unit 204 searches the sent phone number, as a search key, through the user information database 206, at S424. As the result of the search, the information management apparatus control unit 204 notifies the information intermediary apparatus 100 whether the phone number is in the user information database 206, at S426.

The control unit 116 of the information intermediary apparatus 100 judges whether the user having the cellular phone 400 is a registered user, based on the notification from the information intermediary apparatus 100, at S428. In other words, if the monitoring section 174 of the control unit 116 is notified from the information management apparatus 200 that the phone number is not in the user information database 206, the monitoring section 174 judges that the user is not a registered user and accepts the input of user information from the user, at S428 and S430. The control unit 116 sends the accepted user information to the information management apparatus 200, at S432.

The information management apparatus control unit 204 then registers sent user information, at S434. Specifically, the information management apparatus control unit 204 stores, among user information, profiles in the profile database 208, image data in the image database 210, and voice data in the voice database 208, respectively. The information management apparatus control unit 204 stores the file names of data stored in the respective database and the phone numbers obtained at S424 in the user information database 206. Thus, user information is registered. When the registration of user information is completed, the information management apparatus control unit 204 notifies the completion to the information intermediary apparatus 100, at S436.

When the control unit 116 of the information intermediary apparatus 100 is notified the completion of user registration from the information management apparatus 200, or when the user is judged as a registered user at S428, the control unit 116 accepts search conditions for searching user information from the user, at S438. According to the present embodiment, for example, the search conditions can be set using sex, age, address, interest, favorite food, or favorite music. For example, the search conditions may be set as "age=25–30," "sex=male," and "interest=driving." This means that the target audiences of the search are those who are male aged 25 to 30 that are interested in driving. When the control unit 116 accepts the search conditions, the control unit 116 sends the search conditions to the information management apparatus 200, at S440.

The search condition-accepting section 170 of the information management apparatus control unit 204, which receives the search conditions, searches user information that matches the search conditions and retrieves its open information, at S442. Specifically, the information management apparatus control unit 204 searches through the profile database 208 and specifies user information that matches the search conditions. The open contents-retrieving section 172 of the information management apparatus control unit 204 obtains open information by retrieving items designated as open information in the open information item file 219 from the user information.

The control unit 116 of the information intermediary apparatus 100 instructs the LCD monitor 102 to display the sent open information and advertisements, at S448. The control unit 116 also instructs the LCD monitor 102 to display a message to ask whether the displayed information is to be printed out, at S450. As a result, when a browsing user wants to print out the displayed information, the control unit 116 instructs the printer 106 to print out open information and advertisements. The operations of searching user information are then completed.

Figure 23:
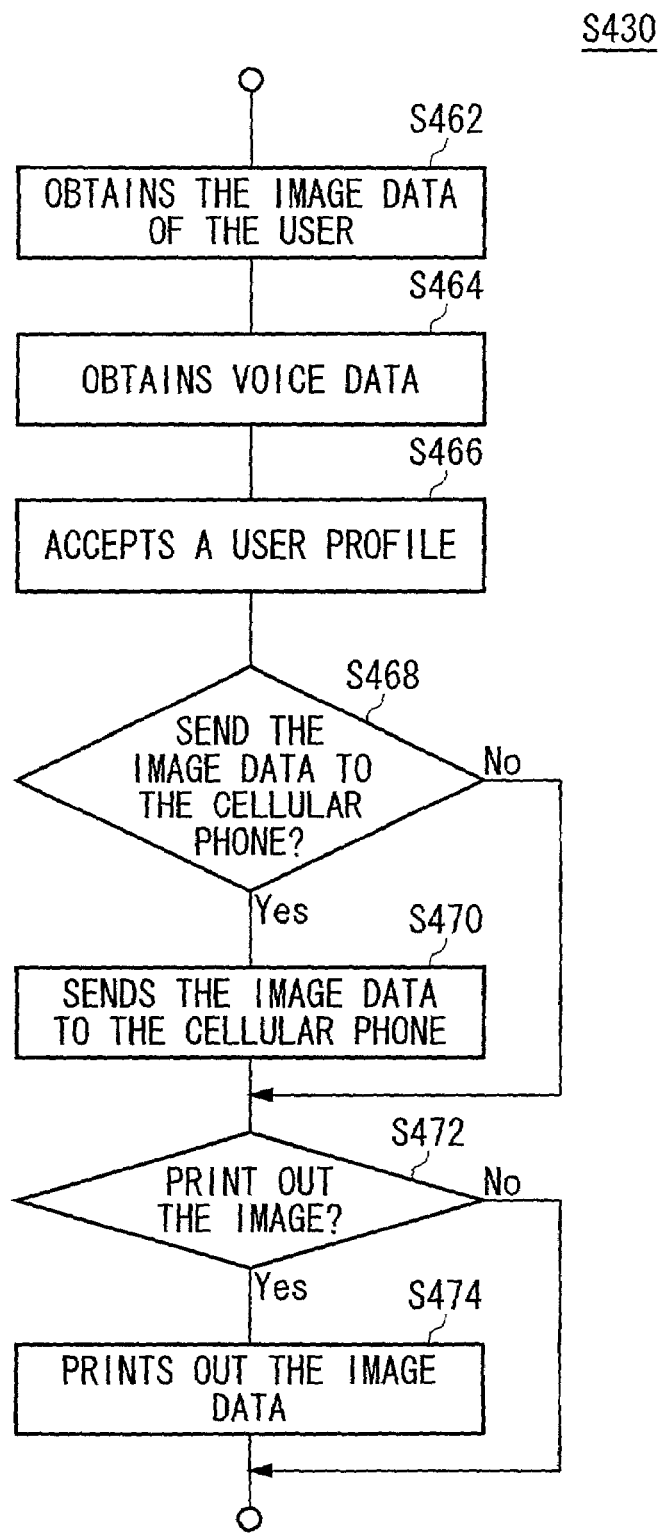
FIG. 23 is a flowchart showing the detailed operations of accepting user information shown at S430 in FIG. 22.

FIG. 23 is a flowchart showing the detailed operations of the information intermediary apparatus 100 for accepting user information shown at S430 in FIG. 22.

When accepting user information, the control unit 116 of the information intermediary apparatus 100 firstly photographs the user by using the image-capturing unit 120 and stores the obtained image data of the user in the image memory 122, at S462. The control unit 116 then obtains voice data of the user by using the microphone 108 and stores the obtained voice data in the voice data memory 124, at S464. The control unit 116 then makes the user input his/her profile by instructing the LCD monitor 102 to display the screen page shown in FIG. 14A of the first embodiment. If the user inputs information into each item displayed on the screen, the control unit 116 stores the input contents in the profile memory 126, at S466.

The process for accepting user information ends with the operations described above. According to the present embodiment, after completing the process for accepting user information, a service to provide the user the obtained user image is continuously undertaken, at S468~S474. The operations for providing users user images are described in the following. However, the operations described below at S468~S474 are not necessary processes for the present embodiment.

After executing the operation of S464, the control unit 116 displays the message on the LCD monitor 102 and asks the user whether to download the photographed user image to the cellular phone 400, at S468. If the user wants to send the user image, the control unit 116 sends the image data stored in the image memory 122 to the cellular phone 400 placed on the cellular phone entry 104 At S470. At this time, the control unit 116 sends the image data after degenerating the image data from the full-color with an RGB, each containing eight bits, to an 8-bit index color as well as demagnifying the size of the image to, for example, 160*120 thumb nails. This is for sending the image data that can be displayed on the cellular phone display 402.

If sending the image data at S470 is completed, or if the user does not want to send the image at S468, the control unit 116 displays a message on the LCD monitor 102 to ask whether to print out the photographed image, at S472. If the user wants to print out the image, the control unit 116 instructs the printer 106 to print out the image data stored in the image memory 122, at S474. According to the present embodiment, the printer 106 prints out image data on seals, for example. After completing the printing of the image, or if the user does not want to print out the image at S472, the control unit 116 completes the series of processes shown in FIG. 23 and goes to the process at S432 in FIG. 22.

Figure 24:
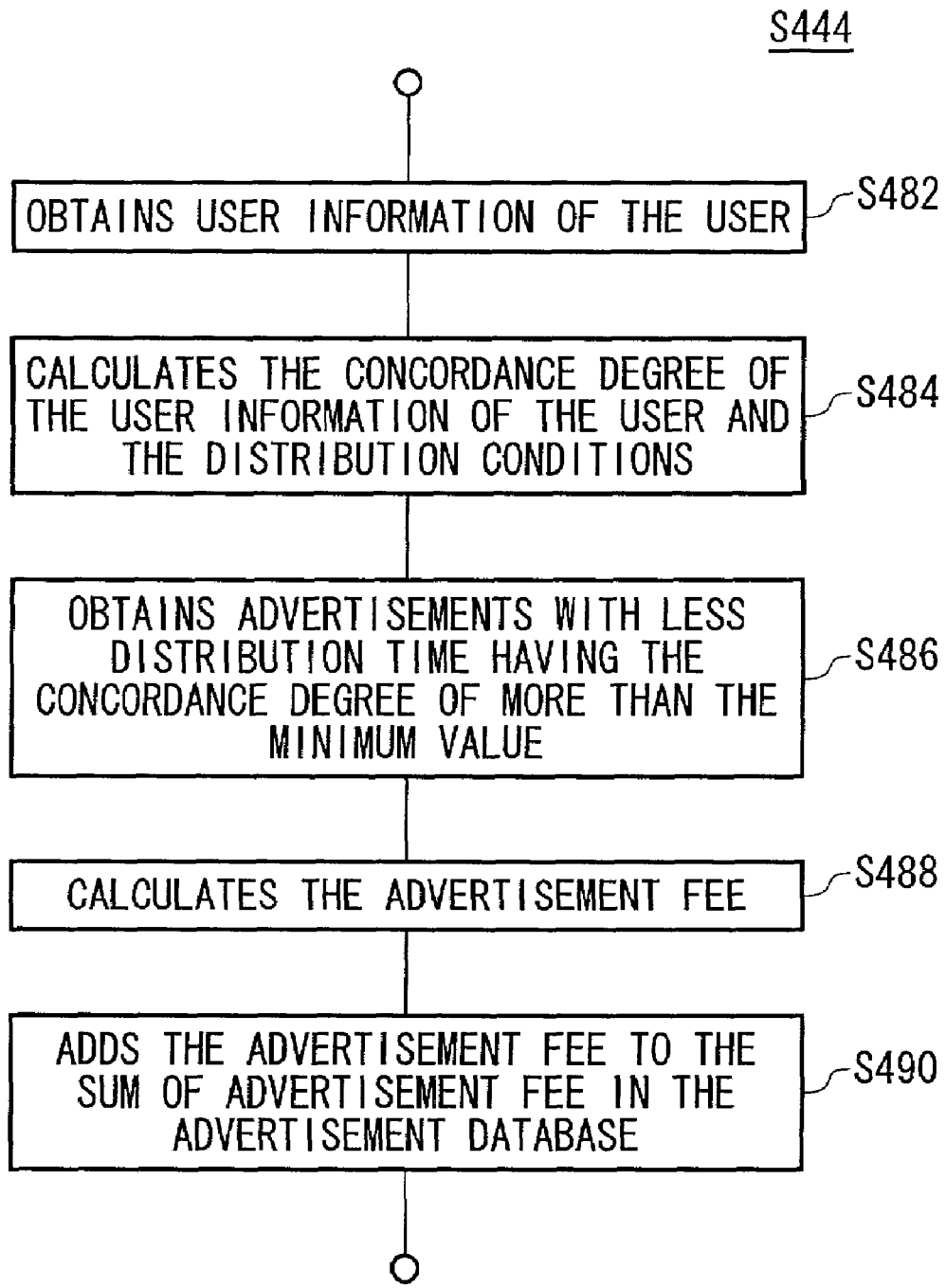
FIG. 24 is a flowchart showing the detailed operations of selecting advertisements shown at S444 in FIG. 22.

FIG. 24 is a flowchart showing the detailed operations of the information management apparatus 200 for selecting (retrieving) advertisements shown at S444 in FIG. 22. Firstly, advertisements to be distributed to the user who requests the searching of user information are retrieved from the advertisement database 216. In other words, the information management apparatus control unit 204 searches the database that stores user information, by making the phone number obtained at S424 a search key, and obtains user information of the user who requests the searching, at S482. The concordance degree-calculating section 176 of the information management apparatus control unit 204 then obtains distribution conditions from the advertisement database 216 and calculates a concordance degree, which is the ratio when the obtained user information satisfies the distribution conditions, at S484. The calculation of the concordance degree may be made to the all of, or a part of, the advertisements stored in the advertisement database 216. The concordance degree-calculating section 176 information management apparatus obtains advertisements whose concordance degree is more than the minimum value of concordance degree defined for each advertisement and whose number of distribution is small, at S486. The advertisement fee-calculating section 178 of the information management apparatus control unit 204 calculates an advertisement fee by multiplying the basic fee for distributing advertisements with the minimum value of concordance degree of the obtained advertisement, at S488. The advertisement fee-calculating section 178 then adds the calculated advertisement fee to the sum of advertisement fees of the advertisement database 216, at S490. The retrieving of advertisements is completed with the above-described processes, and the information management apparatus control unit 204 goes to the next step at S444 in FIG. 22.

By supposing the phone number for use as a search key is 090-2345-6789 and the advertisement to be compared is the advertisement with advertisement ID from 011 to 013, the contents of the process in FIG. 24 are described in more detail.

At S482, supposing the phone number 090-2345-6789 is a search key, the profile database 208, which is almost the same as the one in FIG. 7 according to the first embodiment is searched. As the result of searching, user information registered secondly from the top of the data stored in the profile database 208 is obtained. In this user information, data is recorded as follows: sex=female, age=20 (birthday: Jan. 1, 1980), address=Tokyo, and interest=travel.

Next at S484, the distribution conditions of the advertisement with advertisement ID 011 are obtained. The obtained distribution conditions are compared with the user information described above. In this case, since three conditions of "sex=female," "age=18–30," and "address=Tokyo+Kanagawa" out of four conditions are satisfied, the concordance degree is calculated as 0.75. Then, the distribution conditions of advertisement ID 012 and 013 are sequentially compared with the obtained user information. Since the obtained user information satisfies the distribution conditions of advertisement ID 012 but does not satisfy the distribution conditions of advertisement ID 013, the respective concordance degree is calculated as "1.0" and "0.0".

It may be recognized that the concordance degrees of the advertisements ID 011 and 012 are more than each of the minimum value of the concordance degrees (0.5 and 1.0). According to FIG. 21, the number of distributions of the two advertisements described above is 10 and 6, respectively. Therefore, at S486, the advertisement with advertisement ID 012, which has the smallest number of distribution times among the advertisements described above is selected as the advertisement to be distributed. Then, the contents of the advertisements associated with the advertisement ID is obtained. Moreover, at S488, since the set concordance degree of the advertisement ID 012 is "1.0," the advertisement fee is calculated as the basic fee (according to the present embodiment, the basic fee is 100 yen) itself. Thus, at S490, the number 100 is added to the sum of advertisement fees of the advertisement ID-12 in the advertisement database 216.

Figure 25:
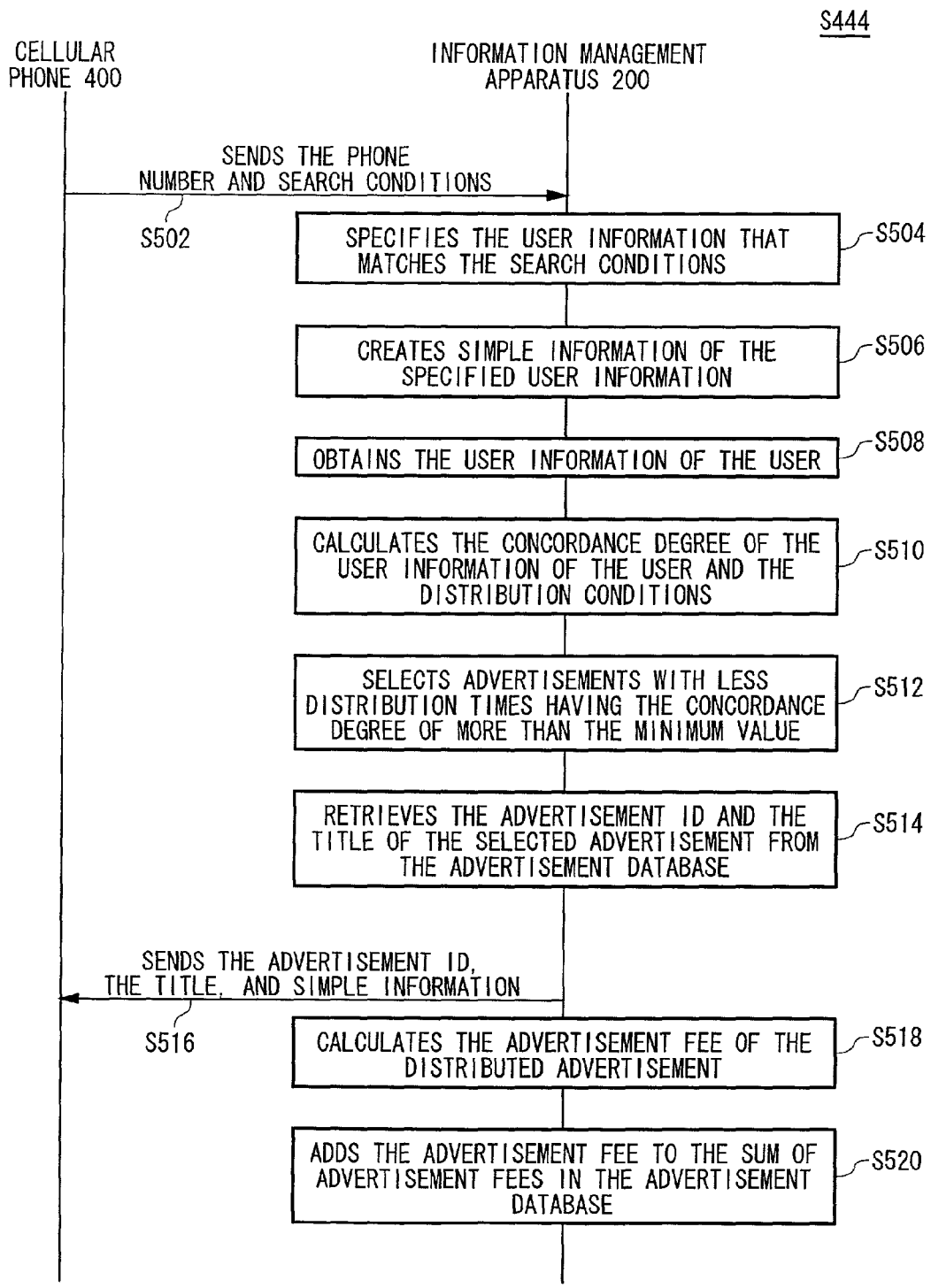
FIG. 25 is a flowchart showing the operations of the cellular phone and the information management apparatus when searching user information using the cellular phone.

FIG. 25 is a flowchart showing the operations of the cellular phone 400 and the information management apparatus 200 when searching user information using the cellular phone 400. When searching user information using the cellular phone 400, the phone number of the cellular phone 400 and the search conditions are sent from the cellular phone 400 to the information management apparatus 200, at S502.

At the information management apparatus 200 that has received the search conditions and the phone number, the information management apparatus control unit 204 specifies user information that matches the search conditions by searching through the profile database 216, at S504. The information management apparatus control unit 204 creates simple user information that matches the search conditions, at S506. That is, the information management apparatus control unit 204 searches through the profile database 216 with the phone number sent at S502 as a search key and obtains the profile data associated with the phone number.

The information management apparatus control unit 204 then calculates the concordance degree of the user information of the obtained browsing user and the distribution conditions of the advertisement stored in the advertisement database 216, at S510. The information management apparatus control unit 204 then selects advertisements with a small number of distribution times from among the advertisements, where the concordance degree is more than the minimum value, at S512. The information management apparatus control unit 204 retrieves only the advertisement ID of the selected advertisement and the title of the advertisement from the advertisement database 216, at S514. The information management apparatus control unit 204 then sends the retrieved advertisement ID and the title together with the simple information obtained at S506 to the cellular phone 400, at S516.

The information management apparatus control unit 204 then calculates the advertisement fee of the distributed advertisement, at S518. The advertisement fee is calculated by multiplying the basic fee with the minimum value of concordance degree set about the distributed advertisement. The basic fee here is a basic fee for distributing only the title of the advertisement. According to the present embodiment, lower fee than the basic fee described at S488 in FIG. 24. Finally, the information management apparatus control unit 204 adds the advertisement fee calculated at S518 to the sum of advertisement fees in the advertisement database 216, at S520. The series of the process is completed with the above operation.

The cellular phone display 402 displays the sent simple information as well as the advertisement ID and the title. If the user becomes interested in the advertisement after seeing the title, the user may gain the detailed contents of the advertisement by using the advertisement ID at the information intermediary apparatus 100.

Figure 26:
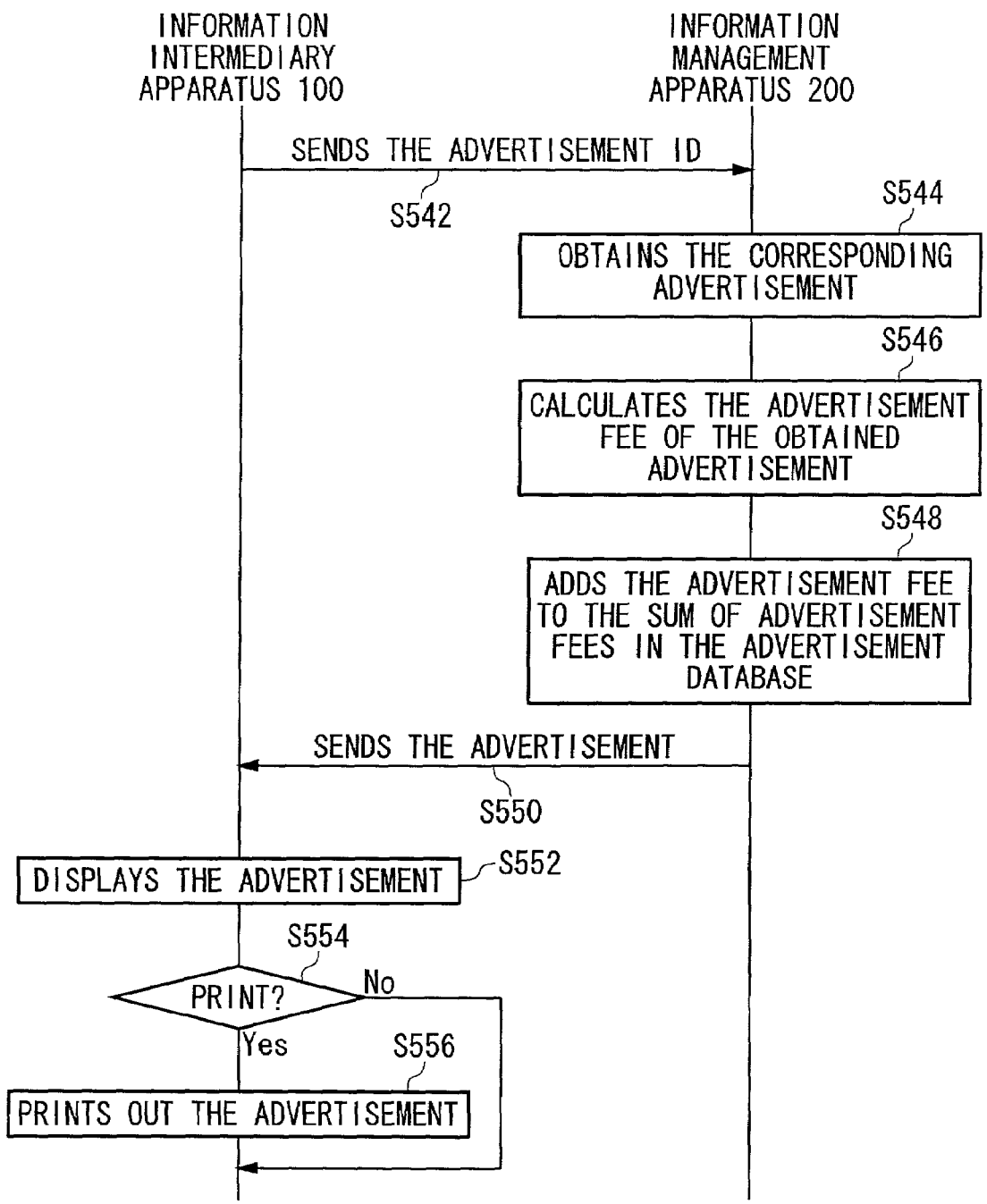
FIG. 26 is a flowchart showing the operations of the information intermediary apparatus and the information management apparatus when a user tries to get a detailed advertisement using an advertisement ID for the information intermediary apparatus.

FIG. 26 is a flowchart showing the operations of the information intermediary apparatus 100 and the information management apparatus 200 when the user tries to get a detailed advertisement using an advertisement ID at the information intermediary apparatus 100.

When the user inputs the advertisement ID using the operations unit 110 of the information intermediary apparatus 100, the information intermediary apparatus 100 sends the advertisement ID to the information management apparatus 200, at S542.

When the information management apparatus control unit 204 receives the advertisement ID, the information management apparatus control unit 204 searches the advertisement database 216 with the ID number as a search key and obtains the advertisement contents of the corresponding advertisement, at S544. The information management apparatus control unit 204 then calculates the advertisement fee of the advertisement by multiplying the basic fee with the minimum value of concordance degree defined for the advertisement, at S546. The basic fee used here may be the same fee as used at S444 in FIG. 24, or may be a different fee.

The information management apparatus control unit 204 then adds the calculated advertisement fee to the sum of advertisement fees in the advertisement database 216, at S548. The information management apparatus control unit 204 then sends the advertisement obtained at S544 to the information intermediary apparatus 100, at S550.

The control unit 116 of the information intermediary apparatus 100 instructs the LCD monitor 102 to display the sent advertisement, at S552. The control unit 116 displays the message on the LCD display 102 and asks whether to print out the displayed advertisement, at S554. If the user desires to print out the advertisement, the printer 106 prints out, at S554 and S556. Thus, the user may take the advertisement home. On the other hand, if the user does not desire to print out the advertisement at S554, the information intermediary apparatus 100 ends the process without printing, at S554.

As described above, according to the present embodiment, the advertisement is distributed to the user when the concordance degree, if compared, of both of the user information of the user and the search conditions of the advertisement is more than the minimum value defined specifically for each advertisement. Effective advertising may be made by setting the minimum value of concordance degree high when the conditions of the targeted audiences for the advertisement are clear. On the other hand, if the conditions of the target audiences for the advertisement cannot be defined clearly, advertisement effects may be assured by setting the minimum value of concordance degree low and distributing the advertisement to many people.

Moreover, according to the present embodiment, the minimum value of concordance degree is reflected to advertisement fees. Therefore, when the minimum value of concordance degree is set low and when advertisements are distributed to many people who do not satisfy the part of the distribution conditions, the advertisement fee is set low thus the burden on advertisers is reduced.

Further, according to the present embodiment, when there are more than two advertisements with the concordance degree higher than the set value, the advertisement with a small distribution number is distributed as a priority. Therefore, according to the present embodiment, the deviation of the number of distributions between advertisements may be avoided.

Furthermore, according to the present embodiment, when the user makes a user information search by using the cellular phone 400, only the title of the advertisement and the advertisement ID are distributed to the cellular phone 400. Therefore, according to the present embodiment, advertisements may be distributed without putting too much burden on the cellular phone 400 having a small memory capacity.

Moreover, according to the present embodiment, the user may search advertisements by using the advertisement ID at the information intermediary apparatus 100. Therefore, when the user becomes interested in the title of the advertisement sent to the cellular phone 400, more detailed information may be simply obtained by using the advertisement ID sent with the title of the advertisement.

The contents of the process taken at S486 in FIG. 24, for example, may be to obtain an advertisement with a small distribution number having the high minimum value of concordance degree among the advertisements with the concordance degree of more than the minimum value. In this case, the advertisement with high concordance degree having a tendency of a small distribution number is distributed as a priority, and thus the distribution number may be increased.

Further, adding of the advertisement fee, according to the advertisement distribution, to the advertisement database 216 may be undertaken only when the advertisement is printed at the information intermediary apparatus 100. In this case, when the advertisement is printed in FIGS. 22 and 26, at S452 and S556, the information intermediary apparatus 100 notifies the printing to the information management apparatus 200. The information management apparatus 200 may then undertake the processes of S442 and S444 as well as S546 and S548 only when having received the above notification.

(A Third Embodiment)

A third embodiment of the information communication system according to the present invention is now described in the following.

The information management apparatus 200 according to the present embodiment communicates with a cellular phone 400. The information management apparatus 200 accepts search conditions for searching user information, from the cellular phone 400. In this case, the information management apparatus 200 sends the part of the user information that matches the search conditions as simple information to the cellular phone 400. The information management apparatus 200 specifies the nearest information intermediary apparatus 100 from the cellular phone 400 and notifies the position to the cellular phone 400. This notification of the position of the nearest information intermediary apparatus 100 is for a user who wants to browse detailed user information on the information intermediary apparatus 100 after having seen the simple information.

Figure 27:
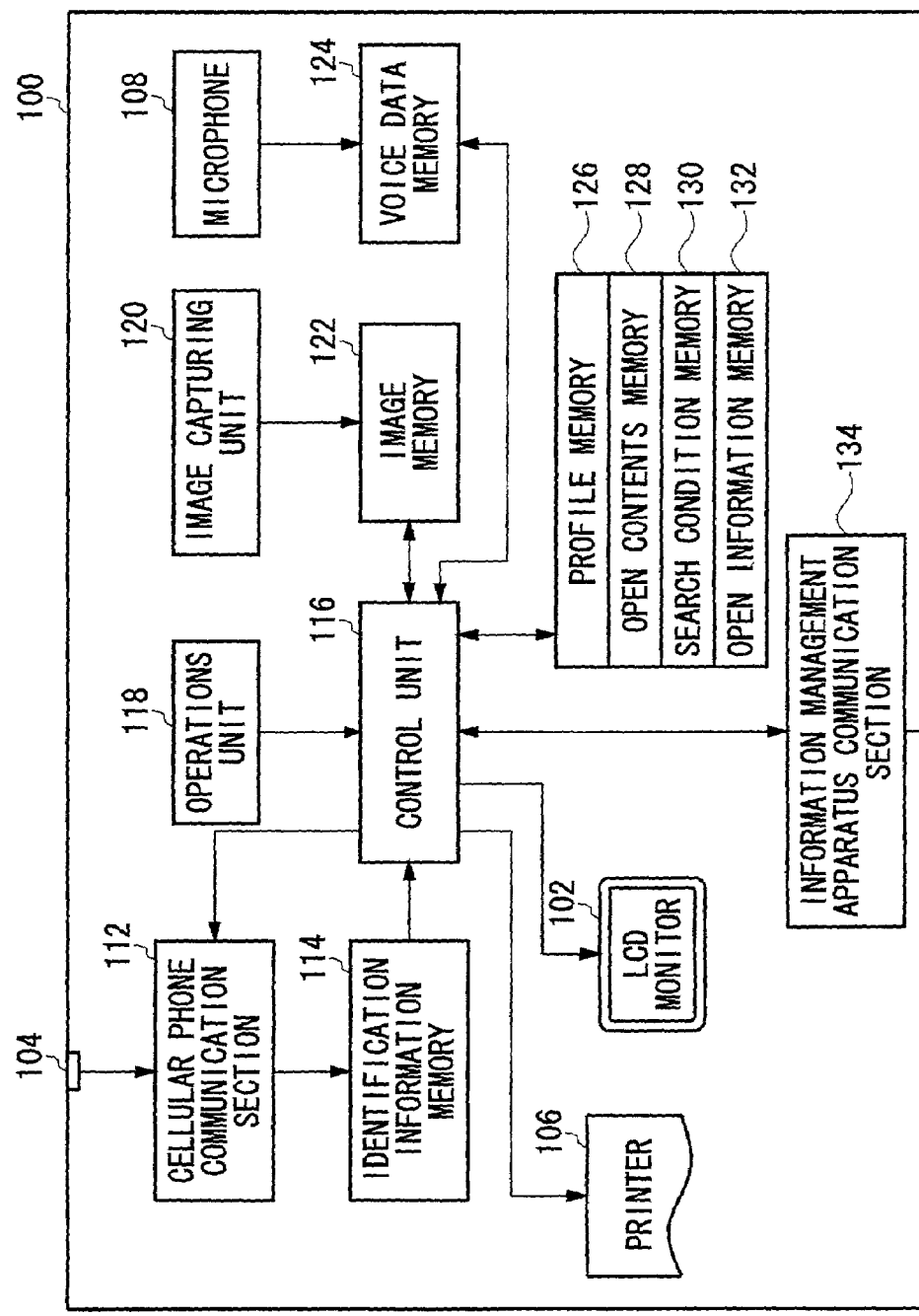
FIG. 27 is a functional block diagram of the information intermediary apparatus according to a third embodiment of the present invention.

FIG. 27 is a functional block diagram of the information intermediary apparatus 100 according to the present embodiment of the present invention. The information intermediary apparatus 100 according to the present embodiment differs from the first and the second embodiments in that the information intermediary apparatus 100 includes an open information memory 132. Since the functions of each structural element are almost the same as the first and second embodiments, descriptions are omitted here.

The control unit 116 communicates with the information management apparatus 200 through the information management apparatus communication section 134. According to the present embodiment, the control unit 116 receives open information out of user information from the information management apparatus 200 by communication through the information management apparatus communication section 134. The received open information is stored in the open information memory 132.

The control unit 116 instructs the LCD monitor to display the open information stored in the open information memory 132, the image data stored in the image memory 122, and the profile stored in the profile memory 126, respectively. The control unit 116 instructs the printer 106 to print out the information described above.

Figure 28:
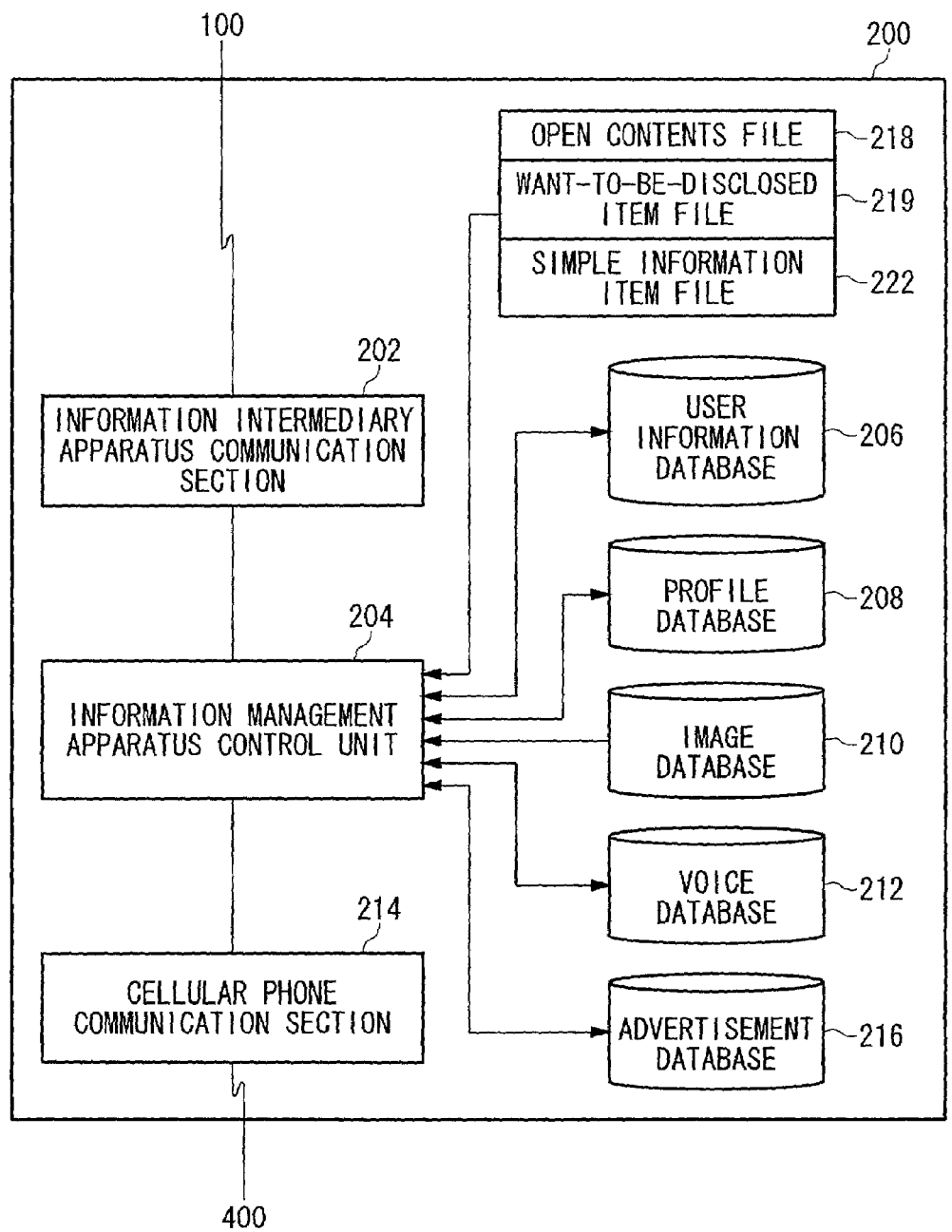
FIG. 28 is a functional block diagram of the information management apparatus according to the third embodiment of the present invention.

FIG. 28 is a functional block diagram of the information management apparatus 200 according to the present embodiment of the present invention. The information management apparatus 200 according to the present embodiment differs to the second embodiment in that the apparatus 200 includes a position database 217, an open contents file 218, and a want-to-be-disclosed item file 219. Since other functional elements have almost the same functions as the first and the second embodiments, descriptions are omitted here.

Figure 57:
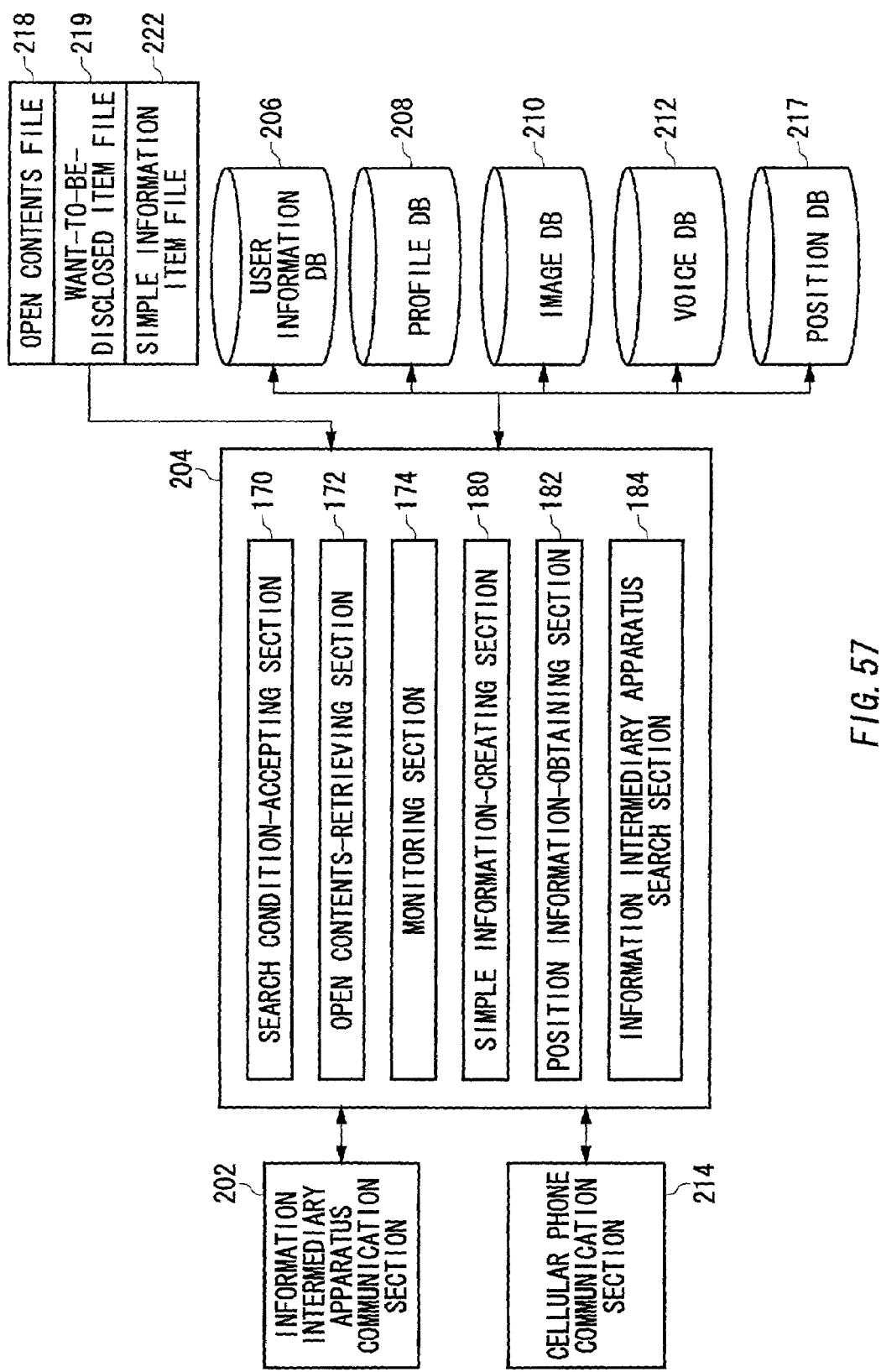
FIG. 57 is a functional block diagram of the information management apparatus control unit 204 according to the third embodiment.

FIG. 57 is a functional block diagram of the information management apparatus control unit 204 according to the present embodiment. The information management apparatus control unit 204 according to the present embodiment differs to the information management apparatus control unit 204 of the first embodiment in that the information management apparatus control unit 204 of the present embodiment includes a simple information-creating section 180, a position information-obtaining section 182, and an information intermediary apparatus search section 184. The functions of these different elements are described in the following through to FIG. 34, by referring both to FIG. 28 and FIG. 57.

The open contents file 218 stores the information of the designated contents to be disclosed, which the information management apparatus control unit 204 has obtained by a communication with the information intermediary apparatus 100. In the open contents file 218, the information of the designated contents to be disclosed is stored by associating with a cellular phone number, which is identification information.

The want-to-be-disclosed item file 219 stores items that the operator of the information communication system desires to disclose to a third party, among the registered user information. The want-to-be-disclosed items are input to the information management apparatus 200 through an inputting means (not shown in the figures) by, for example, the operator of the information communication system.

The position database 217 stores information relating to the position of the information intermediary apparatus 100. The information relating to the position of the information intermediary apparatus 100 is information that a user may use to visit the information intermediary apparatus 100.

FIG. 29 is a table showing the data structure of the profile database 208. The profile database 208 according to the present embodiment differs to the second embodiment in that the profile database 208 has two areas 208A and 208B for raising flags on each item. The area 208A is an area for designating information of the corresponding item as open information (referred to as "open flag area" hereinafter). The open information means information to be disclosed to a third party when a third party requests to browse. In the open flag area 208A, a flag is raised when designating information of the corresponding item as open information.

The area 208B is an area for designating information of the corresponding item as simple information (referred to as "simple flag area" hereinafter). In the simple flag area 208B, a flag is raised when designating information of the corresponding item as simple information.

FIG. 30 is a table showing the data structure of a position database 217. The first item in the position database 217 is identification information for identifying an individual information intermediary apparatus 100. According to the present embodiment, as identification information of the information intermediary apparatus 100, an identification number given to each information intermediary apparatus 100 is used. The second item in the position database 217 is the address where the information intermediary apparatus 100 specified by the identification number of the first item is placed. The third item is the means of transportation nearest to the information intermediary apparatus 100. Here, the names of train lines and stations or the names of bus lines and stops are stored, for example. The fourth item is the names or nicknames of the landmarks near the information intermediary apparatus 100. For example, the name of the famous building near the information intermediary apparatus 100 is stored. The fifth item is the map around the position of the information intermediary apparatus 100.

Figure 31:
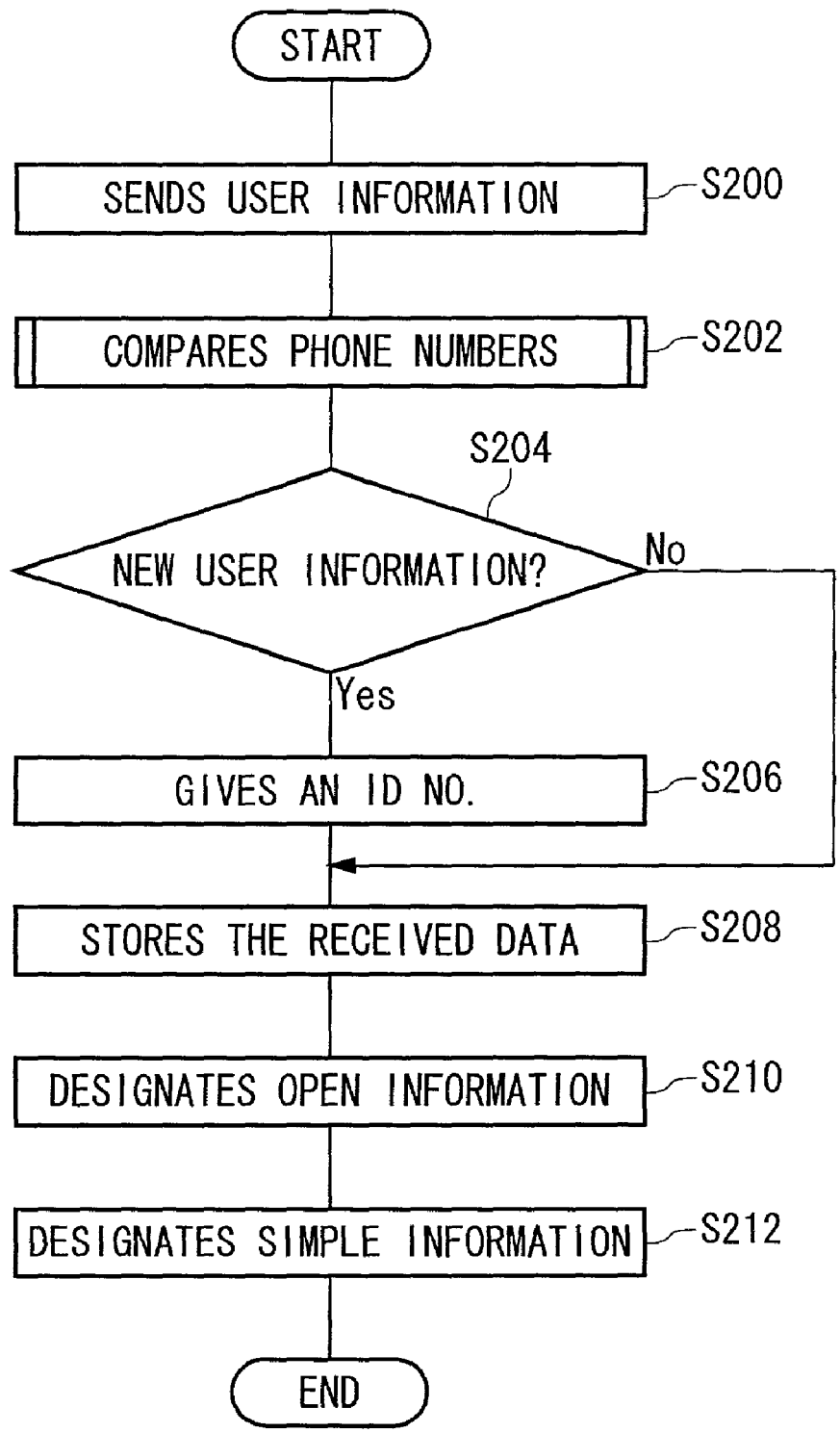
FIG. 31 is a flowchart showing the operations of the information management apparatus when registering user information.

FIG. 31 is a flowchart showing the operations of the information management apparatus 200 when registering user information. The operations of the information management apparatus 200 at the user registration according to the present embodiment differs to the first embodiment in that the operations of designating open information and simple information are added to the flowchart shown in FIG. 15.

The open contents-retrieving section 172 of the information management apparatus control unit 204 designates open information for disclosing information among the stored user information through the communication network 300, at S210. Specifically, want-to-be-disclosed items are read from the want-to-be-disclosed item file 219. Then, the read want-to-be-disclosed items and the received information of the designated contents to be disclosed are compared, and repeated items existing in both data are retrieved. Finally, the open contents-retrieving section gains access to the profile database 208 and raises flags on the open flag area 208A of the items that match the repeated items among information associated with the received phone number. The reason to raise flags for only the repeated items is that it is not appropriate to designate information that a registered user does not permit to disclose as open information and disclose.

The simple information-creating section 180 of the information management apparatus control unit 204 then designates the part of user information as simple information, at S212. More specifically, simple information items are firstly read from the simple information item file 222. The read simple information items and the received information of the designated contents to be disclosed are then compared and repeated items existing in both data are retrieved. Finally, the simple information-creating section 180 gains access to the profile database 208 and raises flags on the simple information flag area 208B of the items that match the repeated items among information associated with the received phone number. As described before, the simple information items are composed of a part of the want-to-be-disclosed items. Therefore, the items that are designated as simple information are also composed of a part of the items designated as open information. In other words, simple information is information that has retrieved a part of open information. After designating simple information, the information management apparatus control unit 204 ends the operations of the user registration.

Next is the description of the operations when searching and browsing registered user information according to the present embodiment. According to the present embodiment, users may search and browse user information registered to the information management apparatus 200 from either the cellular phone 400 or the information intermediary apparatus 100.

When the user searches and browses user information using the cellular phone 400, the browsing user has to establish communication by making a phone call from the cellular phone 400 to the information management apparatus 200. After being establishing communication, the browsing user sends search conditions about the user information, which he/she wants to browse, to the information management apparatus 200. As the search conditions, any items in the profile database 208 may be used. For example, the browsing user may designate "male" for the item "sex" and "dancing" for the item "interest." As the search conditions, the ID number of user information may also be designated.

Figure 32:
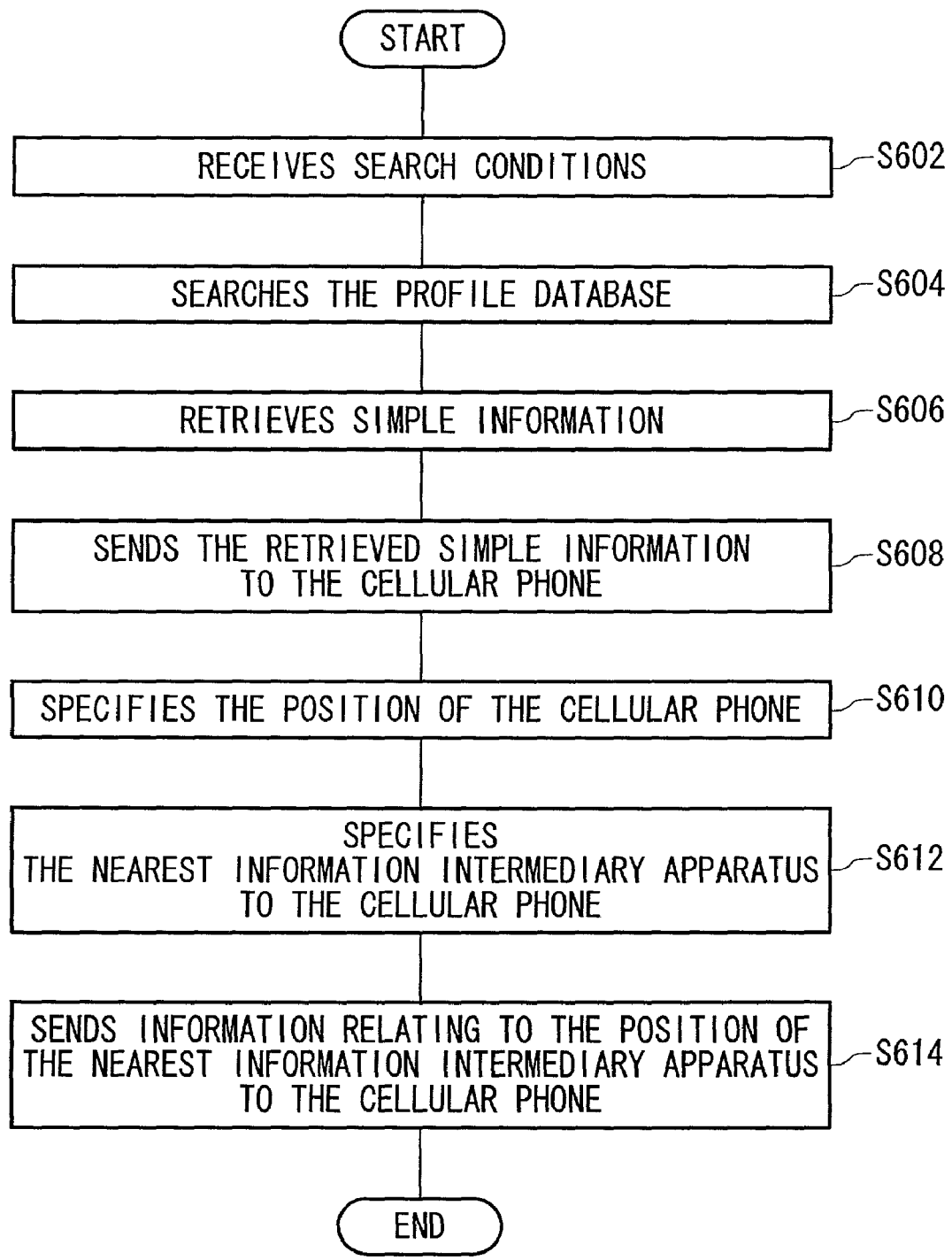
FIG. 32 is a flowchart showing the operations of the information management apparatus when searching and browsing search conditions using the cellular phone.

FIG. 32 is a flowchart showing the operations of the information management apparatus 200 when searching and browsing search conditions using the cellular phone 400. The search condition-accepting section 170 of the information management apparatus control unit 204 firstly receives search conditions through the cellular phone communication section 214, at S602.

The search condition-accepting section 170 searches the profile database 208 and specifies user information that matches the search conditions, at S604. For example, if "address"="Tokyo" is designated as a search condition, user information that writes the item "address" as "Tokyo" is searched. Even if the "address"="Tokyo" is designated as a search condition, user information of users who live in "Chiba" or "Kanagawa", which are the neighbors of Tokyo, may be included in the search result, as well as user information whose item "address" is "Tokyo." In the same way, when "age"="20" is designated as a search condition, user information of the registered users aged from 19 to 21 may be included in the search result. In this case, an effect, which is hard to specify personal information from search results, may be gained. The search may be made only for information with raised flags on the open information flag area 208A of the profile database 208. In this case, it may be avoided that information that a registered user does not permit to disclose be known to a third party by the combinations of the search conditions.

The simple information-creating section 180 of the information management apparatus control unit 204 retrieves simple information from the specified user information, at S606. More specifically, the simple information-creating section 180 retrieves an ID number of the specified user information. The simple information-creating section 180 then refers to the simple information flag area 208B of the specified user information and only retrieves information of items having a flag. Finally, the retrieving of simple information ends with associating the retrieved information with the ID number, which is previously retrieved.

The simple information-creating section 180 sends the retrieved simple information with the ID number to the cellular phone 400, at S608. In this case, only one piece of simple information or all of the pieces of simple information obtained by the search may be sent. Here, since only part of the simple information is sent instead of all of the user information, too much burden on the cellular phone 400 may be avoided. Besides, sending only simple information may decrease the consumption of the memory resource of the cellular phone 400. If image data is included in simple information, it is preferable to send the image data as thumb nail images.

The position information-obtaining section 182 of the information management apparatus control unit 204 specifies the position of the communicating cellular phone 400, at S610. This positioning is undertaken by obtaining information from the telecommunications company, which operates the communication system of the cellular phone 400, for example. The information intermediary apparatus search section 184 of the information management apparatus control unit 204 specifies the information intermediary apparatus 100, which is nearest to the cellular phone 400, at S612. This specification may be done by specifying the address, which is nearest to the position of the cellular phone 400 specified at S610.

Finally, the information intermediary apparatus search section 184 sends information relating to the position of the information intermediary apparatus 100 nearest to the cellular phone 400, at S614. This operation is made by retrieving the address and other items of the information intermediary apparatus 100 specified at S610 from the position database 217 and sending the retrieved data to the cellular phone 400. If there is at least one item to send, it is enough. After sending information relating to the position of the information intermediary apparatus 100, the information management apparatus 200 ends the process.

The browsing user who has received simple information may browse the contents on the cellular phone display 402 or listen to a voice message from the speaker of the cellular phone 400. Since simple information is received by a portable communication system, the browsing user may browse the received simple information anytime and anywhere. If the browsing user thinks that there is information that attracts him/her in the received simple information and wants to know the user information in more detail, the user may obtain the detailed user information at the information intermediary apparatus 100 and browse or print out the detailed information. In order to gain immediate access to the information intermediary apparatus 100, the user may use the "information relating to the position of the nearest information intermediary apparatus 100" sent from the information management apparatus 200 to the cellular phone 400.

Figure 33:
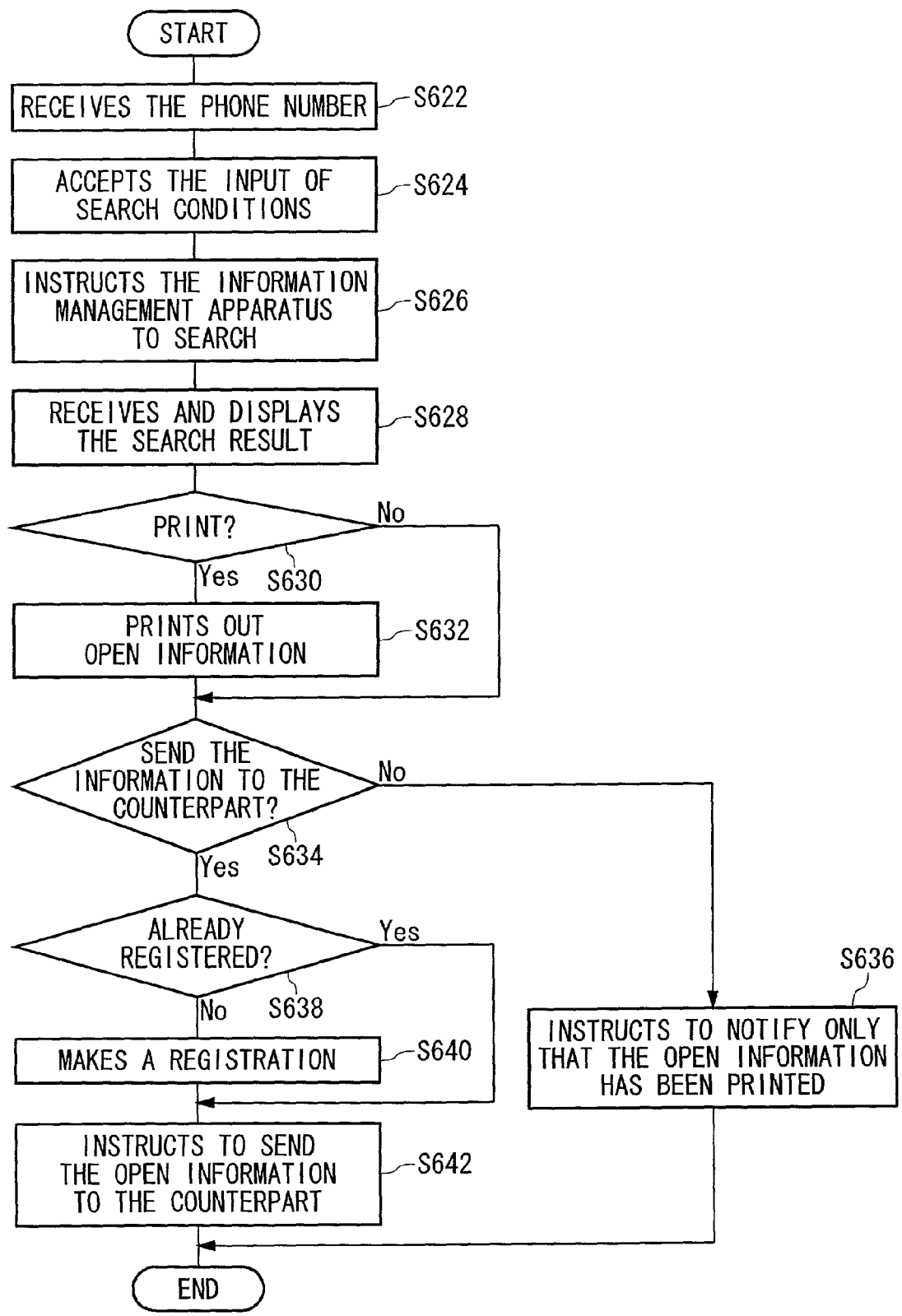
FIG. 33 is a flowchart showing the operations of the information intermediary apparatus when searching and browsing user information.

The next description is about the operations of the information intermediary apparatus 100 when the browsing user obtains more detailed user information after receiving simple information. First, the operations of the information intermediary apparatus 100 are described. FIG. 33 is a flowchart showing the operations of the information intermediary apparatus 100 when searching and browsing user information.

In order to make a search of user information at the information intermediary apparatus 100, a user has to place his/her own cellular phone 400 on the cellular phone entry 104. When the cellular phone 400 is placed on the cellular phone entry 104, the information intermediary apparatus 100 obtains the phone number of the cellular phone 400, at S622. More particularly, the cellular phone number is stored in the identification information memory 114 through the cellular phone communication section 112 of the information intermediary apparatus 100.

The control unit 116 of the information intermediary apparatus 100 accepts the input of search conditions through the operations unit 110, at S624. The user may use all items stored in the profile database 208 as search conditions at the information intermediary apparatus 100. Here, as an example, the ID number included in simple information is input as a search condition. The input search condition is stored in the search condition memory 130.

The control unit 116 then sends the instruction to search user information to the information management apparatus 200, at S626. The search conditions stored in the search condition memory 130 are added to the instruction as a parameter. When a search result is replied from the information management apparatus 200, the control unit 116 stores the search result in the open information memory 132 as well as displaying the contents stored in the open information memory 132 on the LCD monitor 102, at S628.

The instruction section 164 of the control unit 116 displays on the LCD monitor 102 a message for asking whether to print out the displayed information, at S630. If the user selects to print, the instruction section 164 instructs the printer 106 to print out the search result stored in the open information memory 132, at S630 and S632. On the other hand, if the user selects not to print, the operation of S630 is not taken, at S630.

The instruction section 164 displays on the LCD monitor 102 a message to ask the browsing user whether to send his/her own information to the user of the simple information (referred to as "counterpart" hereinafter), at S634. If the browsing user selects not to send, the instruction section 164 sends an instruction to "notify the counterpart only that the open information has been printed" to the information management apparatus 200, at S634 and S636. After sending the instruction, the information intermediary apparatus 100 ends the process.

At S634, if the browsing user selects to send his/her own information to the counterpart, the control unit 116 asks the information management apparatus 200 whether the browsing user is a registered user, using the phone number obtained at S622, S634 and S638.

Figure 36:
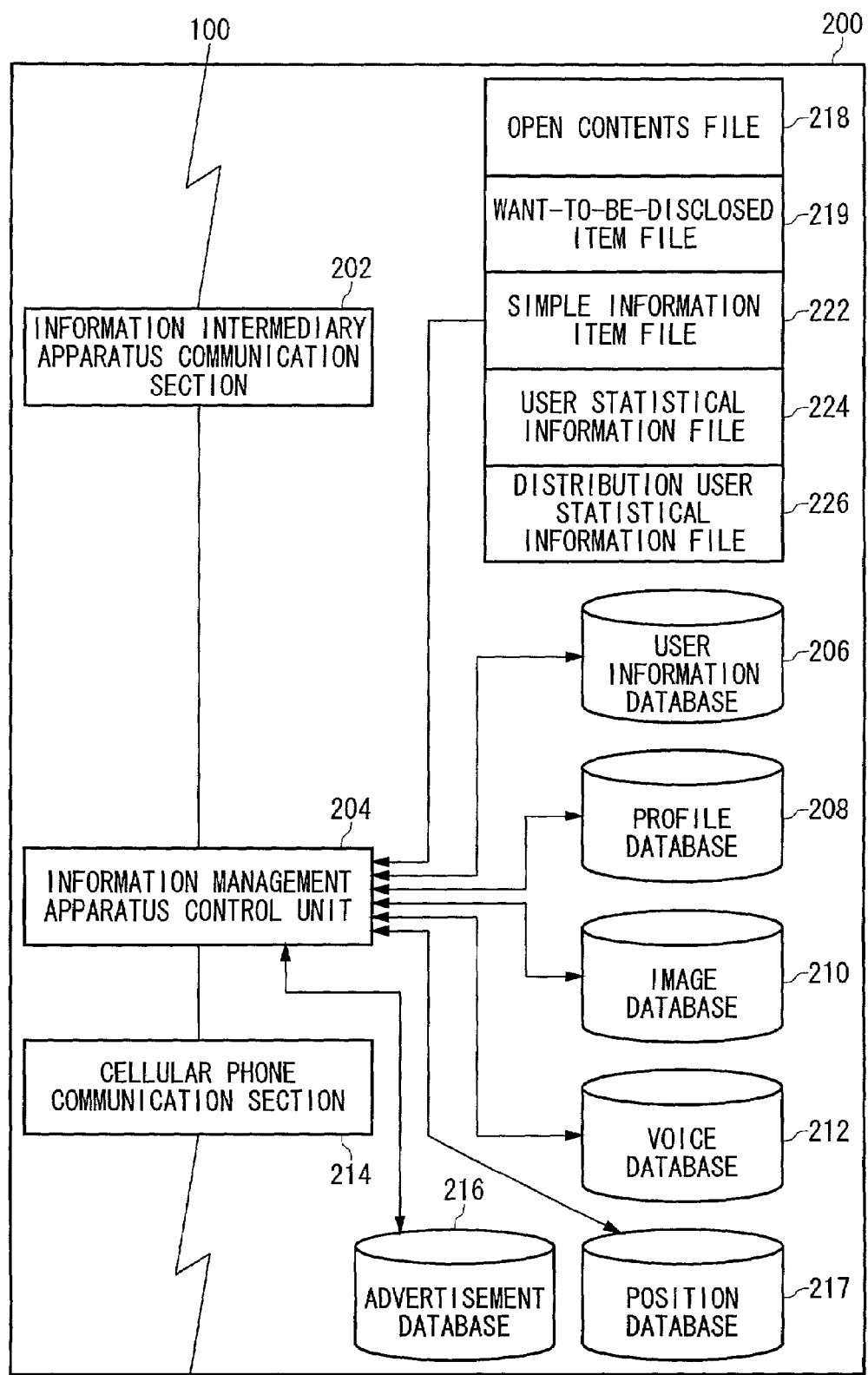
FIG. 36 is a functional block diagram of the information management apparatus according to a fourth embodiment of the present invention.

As a result of the inquiry, if the browsing user is not a registered user, the registration of the user information is made, at S638 and S640. More particularly, the same processes as from S564 to S576 in FIG. 36 are taken. If, as a result of the inquiry at S638, the browsing user is a registered user, the process of S640 is not taken. The control unit 116 then instructs the information management apparatus 200 to send open information of the browsing user to the counterpart, at S642. After the instruction, the information intermediary apparatus 100 ends the process.

Figure 34:
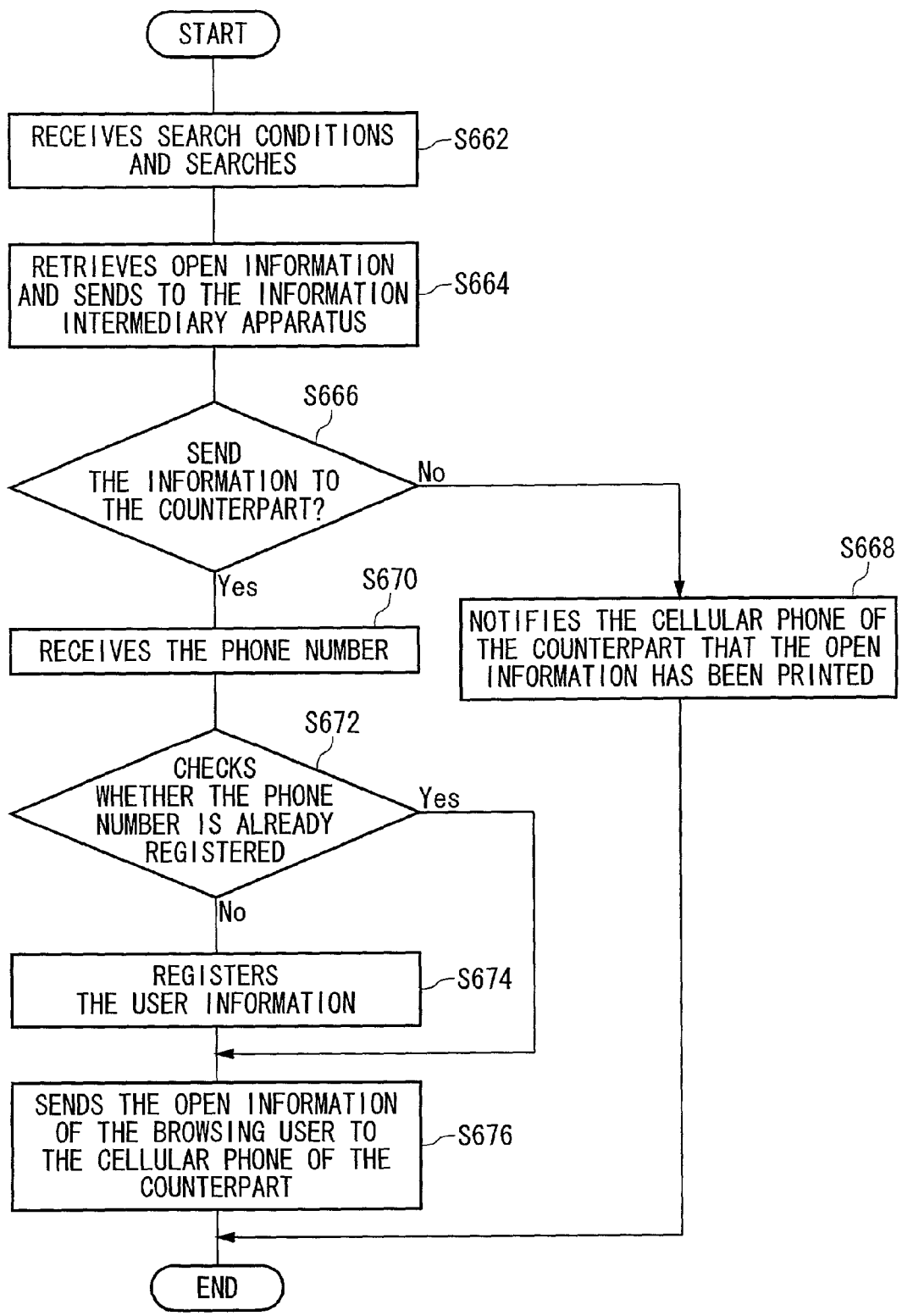
FIG. 34 is a flowchart showing the operations of the information management apparatus when a user searches and browses user information.

FIG. 34 is a flowchart showing the operations of the information management apparatus 200 when the browsing user searches and browses user information. The operations of the information management apparatus 200 when searching user information are described in the following using FIG. 34.

First, the search condition-accepting section 170 of the information management apparatus control unit 204 receives the search conditions sent from the information intermediary apparatus 100 at S626 in FIG. 33. The search condition-accepting section 170 then makes a search of user information based on the search conditions, at S662. According to the present embodiment, the search condition sent at S626 is the ID number of user information. The information management apparatus control unit 204 searches the user information database 206 with the ID number as a search key and specifies the phone number of the counterpart. The search condition-accepting section 170 further searches the profile database 208 with the specified phone number as a search key and specifies information associated with the phone number. The open contents-retrieving section 172 of the information management apparatus control unit 204 retrieves open information from the specified information and sends the open information to the information intermediary apparatus 100, at S664.

The information management apparatus control unit 204 judges whether to send information of the browsing user to the counterpart, at S666. More particularly, if the information management apparatus control unit 204 receives an instruction to "notify the counterpart only that the open information has been printed" from the information intermediary apparatus 100 (referring to S636 in FIG. 33), the information management apparatus control unit 204 judges not to send user information to the counterpart, at S666. In this case, the information management apparatus control unit 204 sends only notification that "the open information has been browsed and printed" to the cellular phone 400 of the counterpart and the process ends, at S668. Thus, the counterpart may immediately know that his/her user information has been browsed and printed by the others. Moreover, the counterpart may know the frequency of his/her user information being browsed by the number of the above notification.

On the other hand, at S666, if the information management apparatus control unit 204 receives an instruction to "send open information of the browsing user to the counterpart" from the information intermediary apparatus 100 (referred to at S642 in FIG. 33), the information management apparatus control unit 204 obtains the phone number of the browsing user, at S666 and S670. The phone number obtained here is the phone number sent from the information intermediary apparatus 100 at S638 in FIG. 33.

After obtaining the phone number, the information management apparatus control unit 204 checks whether the user information of the browsing user is already registered, at S672. More particularly, the information management apparatus control unit 204 searches the user information database 206 with the obtained phone number as a search key.

As a result of the search, if a phone number that matches the search key, the browsing user is judged not to be a registered user, at S672. In this case, the information management apparatus control unit 204 undertakes the process of making a user registration, at S674. In other words, the information management apparatus control unit 204 replies to the information intermediary apparatus 100 that the browsing user is not a registered user. After replying, the information management apparatus control unit 204 takes the same process as the processes described in FIG. 32 and makes a user registration.

As a result of the search at S672, if the phone number that matches the search key, the browsing user is judged as a registered user, at S672. In this case, the process of S674 is not taken. The open contents-retrieving section 172 of the information management apparatus control unit 204 retrieves open information from the user information of the browsing user. The retrieved open information is sent to the cellular phone 400 of the counterpart, at S676. After sending the open information, the information management apparatus 200 ends the process.

By the processes described above, the counterpart may know both the fact that his/her open information has been browsed and open information of the browsing user. If the received open information is plural, the counterpart may search and browse only the necessary open information by using a search function of the cellular phone 400. Moreover, the browsing user may input return information, other than the registered open information, using the operations unit 110. The input return information then may be sent to the cellular phone 400 of the browsed registered user through the information management apparatus 200.

At the steps from S634 to S642 in FIG. 33, when the browsing user sends his/her own information to the counterpart after having browsed the open information of the others at the information intermediary apparatus 100, the browsing user may select information to send. In this case, the information intermediary apparatus 100 makes the browsing user select items he/she wants to send to the counterpart from among the user information, before undertaking step S642 in FIG. 33. The information intermediary apparatus 100 then instructs the information management apparatus 200 to send only items selected by the browsing user to the counterpart.

As an example, the browsing user may select a phone number of his/her own cellular phone 400 as information to send to the counterpart. Thus, the browsing user may immediately notify the counterpart his/her own phone number. If the phone number of the browsing user is not designated as open information, only the counterpart selected by the browsing user may be notified with the phone number. On the other hand, the counterpart may be able to immediately have contact with the browsing user by using the notified phone number.

At the steps from S634 to S642 in FIG. 33, when the browsing user sends his/her own information to the counterpart after having browsed the open information of the others at the information intermediary apparatus 100, the browsing user may input his/her new message to the information intermediary apparatus 100 and send the new message. In this case, the information intermediary apparatus 100 accepts input of a message to send to the counterpart from the browsing user before undertaking step S642 in FIG. 33. The information intermediary apparatus 100 then instructs the information management apparatus 200 to send the message input at S642 to the counterpart.

At step S664 in FIG. 34, the open information may include information showing whether information of each item is designated as simple information. In this case, information to display on the LCD monitor 102 of the information intermediary apparatus 100 may be limited to information designated as simple information, and the entire open information may be output only by the printer 106.

(A Fourth Embodiment)

Next, a fourth embodiment of the present invention is described in the following. According to the present embodiment, an advertising function is added to the information communication system of the third embodiment. The information management apparatus 200 according to the present embodiment takes statistics on the registered user such as age or sex and sends the results (referred to as "user statistical information" hereinafter) to an advertiser. The information management apparatus 200 receives advertisement contents and advertisement information including conditions of the target audiences to send the advertisement from the advertiser. The information management apparatus 200 distributes the received advertisement to the cellular phone 400 of the registered user who corresponds to the target audiences of the advertisement. The information management apparatus 200 takes statistics of addresses and sends the result (referred to as "distribution user statistical information" hereinafter) to the advertiser.

FIGS. 35A and 35B are tables showing exemplary data structures of advertisement information sent from the advertiser. The advertisement information includes identification information of advertiser, advertisement contents, and target audiences of the advertisement. The identification information of an advertiser is information that specifies an advertiser, such as the name of the advertiser, the e-mail address, and the address. According to the present embodiment, the phone number of the advertiser is used as the identification information of an advertiser. The advertisement contents are specific contents of distributing advertisements. The advertisement contents are composed of text data, image data, or voice data. The target audiences of the advertisement are conditions to which the advertisement is distributed. For example, in the advertisement information 1 of FIG. 35A, the target audiences of the advertisement are those who are from 20 to 40 years of age, male, live in Tokyo or Kanagawa, and interested in driving. In the advertisement information 2 of FIG. 35B, the target audiences of the advertisement are those who are from 20 to 30 years of age of both sexes.

FIG. 36 is a functional block diagram of the information management apparatus 200 according to a fourth embodiment of the present invention. The information management apparatus 200 according to the present embodiment differs to the information management apparatus 200 according to the third embodiment in that the apparatus 200 of the present embodiment includes a user statistical information file 224, a distribution users statistical information file 226, and an advertisement database 216.

Figure 58:
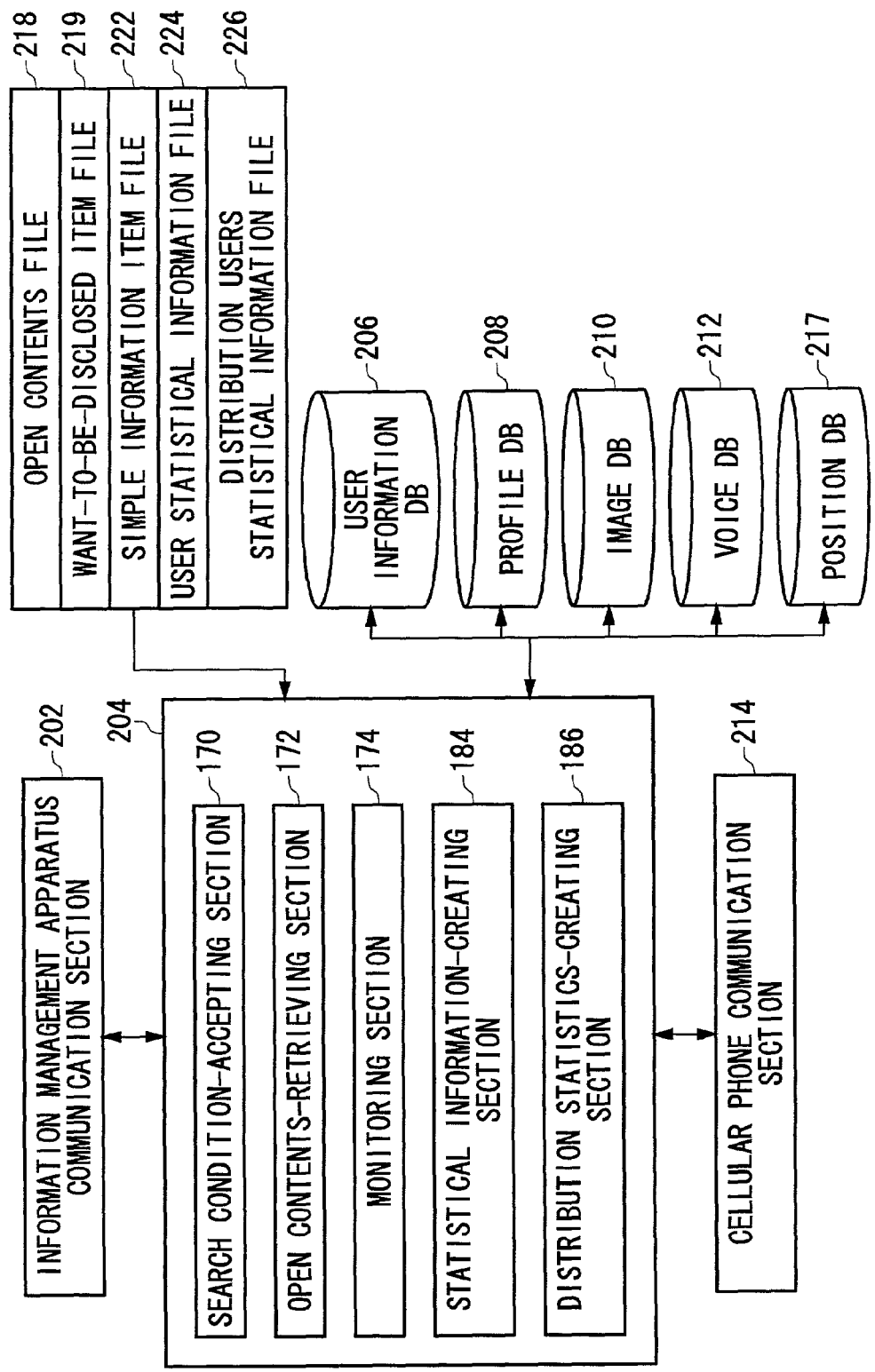
FIG. 58 is a functional block diagram of the information management apparatus control unit 204 according to the fourth embodiment.

FIG. 58 is a functional block diagram of the information management apparatus control unit 204 according to the present embodiment. The information management apparatus control unit 204 according to the present embodiment differs to the information management apparatus control unit 204 according to the first embodiment in FIG. 55 in that the information management apparatus control unit 204 includes a statistical information-creating section 184 and a distribution statistics-creating section 186. Functions of these functional elements described both in FIG. 36 and FIG. 56 are described in the following.

FIG. 37 is a table showing an exemplary data structure of user statistical information stored in the user statistical information file 224. The user statistical information file 224 stores the result of statistics by sex for each item of user information. In the example shown in FIG. 37, the user statistical information takes statistics on "age," "address," and "interest" among the items stored in the profile database 208 and stores each of them in different files. The file "age" records the number of the registered user by age and sex. The file "address" records the number of the registered user by address and sex. And the file "interest" records the number of the registered users by contents, such as karaoke and driving, and sex.

FIG. 38 is a table showing the data structure of the advertisement database 216. The advertisement database stores identification information of an advertiser sent from advertisers as advertisement information, advertisement contents, and the target audiences to distribute the advertisement by associating with numbers given to each piece of advertisement information.

FIGS. 39A and 39B are tables showing exemplary data structures of the distribution user statistical information stored in the distribution users statistical information file 226. In FIG. 39, two pieces of the distribution user statistical information corresponding to the two pieces of advertisement information shown in FIG. 35 are shown. The distribution user statistical information has a reference number for the distributed advertisement. The distribution user statistical information also has statistical information relating to the registered users to whom the advertisement is distributed. In the example shown in FIG. 39, the distribution user statistical information 1 of FIG. 39A is information relating to the advertisement with reference number 1525. It shows that there are twenty people who live in Tokyo among the registered users who are distributed with the advertisement.

The description of collecting user statistical information, distributing advertisements, and collecting distribution user statistical information according to the present embodiment follows.

Figure 40:
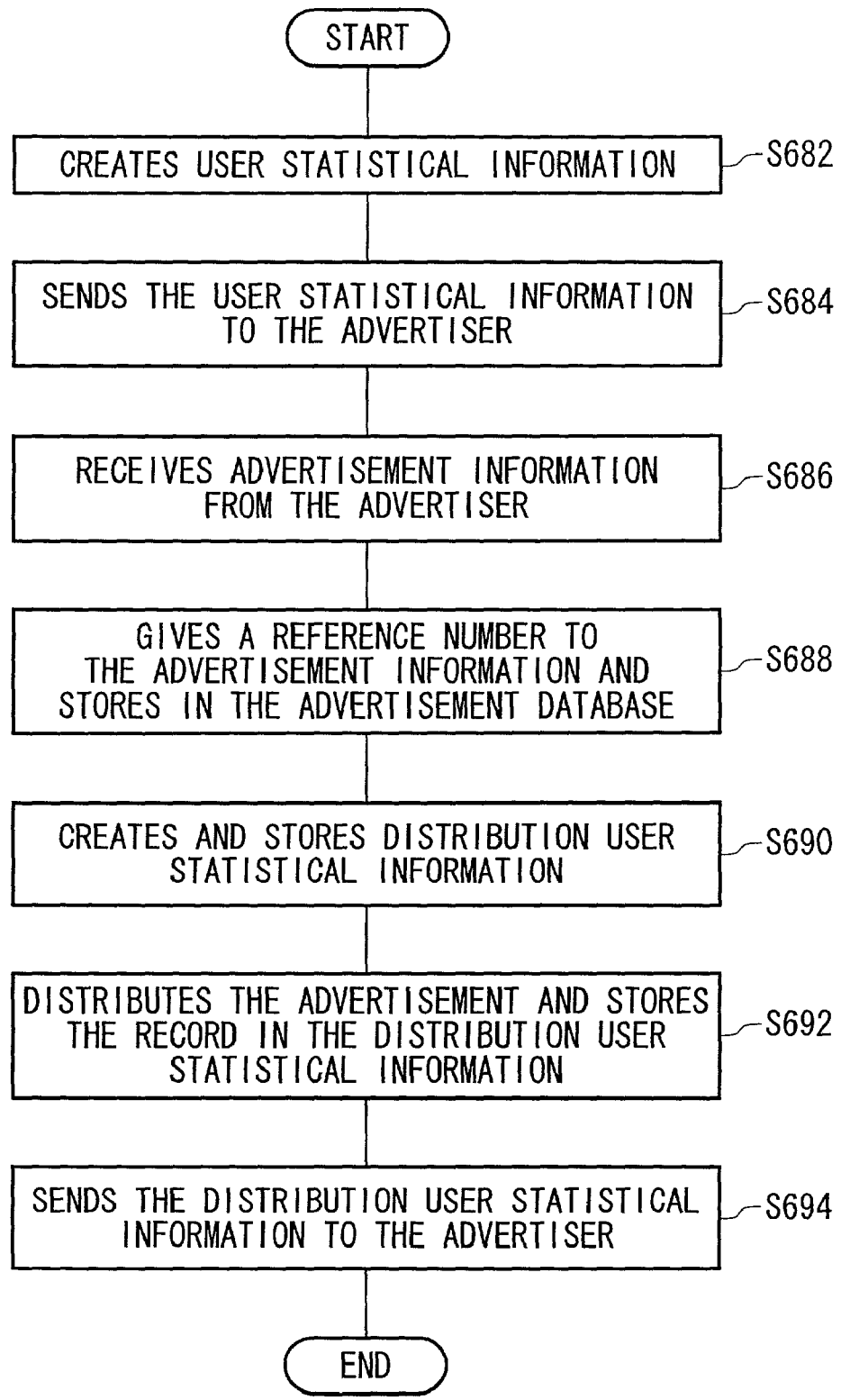
FIG. 40 is a flowchart showing the operations of the information management apparatus according to the fourth embodiment of the present invention.

FIG. 40 is a flowchart showing the operations of the information management apparatus 200 according to the present embodiment. According to the present embodiment, the statistical information-creating section 184 of the information management apparatus control unit 204 firstly creates user statistical information, at S682.

After having created the user statistical information, the statistical information-creating section 184 sends the contents of the user statistical information to a predetermined advertiser, at S684. The sending user statistical information is the contents of all the files stored as user statistical information. However, only the contents of specific files may be sent in consideration of the characteristic traits of the addressees for each addressee. For example, if the sending advertiser is a real estate company, only the files "address" and "age" may be sent. According to the present embodiment, by sending the advertisers user statistical information registered in this way, it gives advertisers data for estimating the effect of advertisements in case the advertisers apply for the advertisements.

The information management apparatus control unit 204 then receives advertisement information from the advertiser, at S686. The information management apparatus 204 gives the received advertisement information a reference number and stores the reference number and the advertisement information in the advertisement database 216, at S688. The distribution statistics-creating section 186 of the information management apparatus control unit 204 creates distribution user statistical information based on the items of the advertisement information to be distributed and stores the created distribution user statistical information in the distribution users statistical information file 226, at S690.

The information management apparatus control unit 204 distributes the advertisement, at S692. More particularly, the information management apparatus control unit 204 retrieves user information that matches the target audiences to distribute the advertisement information and send the advertisement to only the retrieved user information. The distribution statistics-creating section 186 adds 1 to the corresponding item of the distribution user statistical information after sending the advertisement.

When the distribution of the advertisement is finished, the distribution statistics-creating section 186 sends each of the distribution users statistical information stored in the distribution users statistical information file 226 to the corresponding advertiser, at S696. When sending of the distribution user statistical information is finished, the information management apparatus 200 ends the operation.

Although the open information of the browsing user is sent to the cellular phone 400 of the counterpart at step S676 in FIG. 35, the ID number of the user information of the browsing user may be sent instead. Thus, the counterpart may search and browse the browsed open information of the browsing user based on the received ID number.

For the data structure of the profile database 208 of the information management apparatus 200, the item "address" may be divided into areas for storing the names of prefectures, the names of cities, and house numbers, and may set a simple information flag area for each of the areas. Thus, an address may designate as open information or simple information by the units of the names of prefectures, the names of cities, and house numbers.

Moreover, in order to register user information, when sending user information from the information intermediary apparatus 100 to the information management apparatus 200, the information intermediary apparatus 100 may further send information for identifying the information intermediary apparatus 100 and store the identification information in a database of the information management apparatus 200 by associating with the user information. By storing the identification information of the information intermediary apparatus 100, which has made a user registration, the information intermediary apparatus 100 that has made the user registration may become possible to be immediately specified. Further, if the identification information of the information intermediary apparatus 100 is referred together with the address of the information intermediary apparatus 100 stored in the position database 217, it may become possible to immediately specify the position of the information intermediary apparatus 100. It is convenient to include the position of the information intermediary apparatus 100 specified in this way in simple information or open information as the place where the user registration has been made and to disclose the position to the browsing user. This is because the place where a user registration is made gives meaningful information relating to the user in that the place may be considered as the place where the user frequently visits.

Furthermore, according to the fourth embodiment, advertisements may be sent to the information intermediary apparatus 100 instead of the cellular phone 400. More particularly, every time the information management apparatus 200 receives the phone number of the browsing user from the information intermediary apparatus 100, the information management apparatus 200 searches the advertisement, where the browsing user is supposed to be the target of the distribution, from the advertisement database 216 and sends the search advertisement to the information intermediary apparatus 100. The information intermediary apparatus 100 may display on the LCD monitor 102 the advertisement also when displaying user information. The information intermediary apparatus 100 may also print out the advertisement on the margins of the seal when the printer 106 prints the seal.

Moreover, the information intermediary apparatus 100 and the cellular phone 400 may communicate by the Bluetooth instead of communication through the cellular phone entries 104A, 104B, and 104C.

(A Fifth Embodiment)

A fifth embodiment of the present invention is now described in the following.

Figure 41:
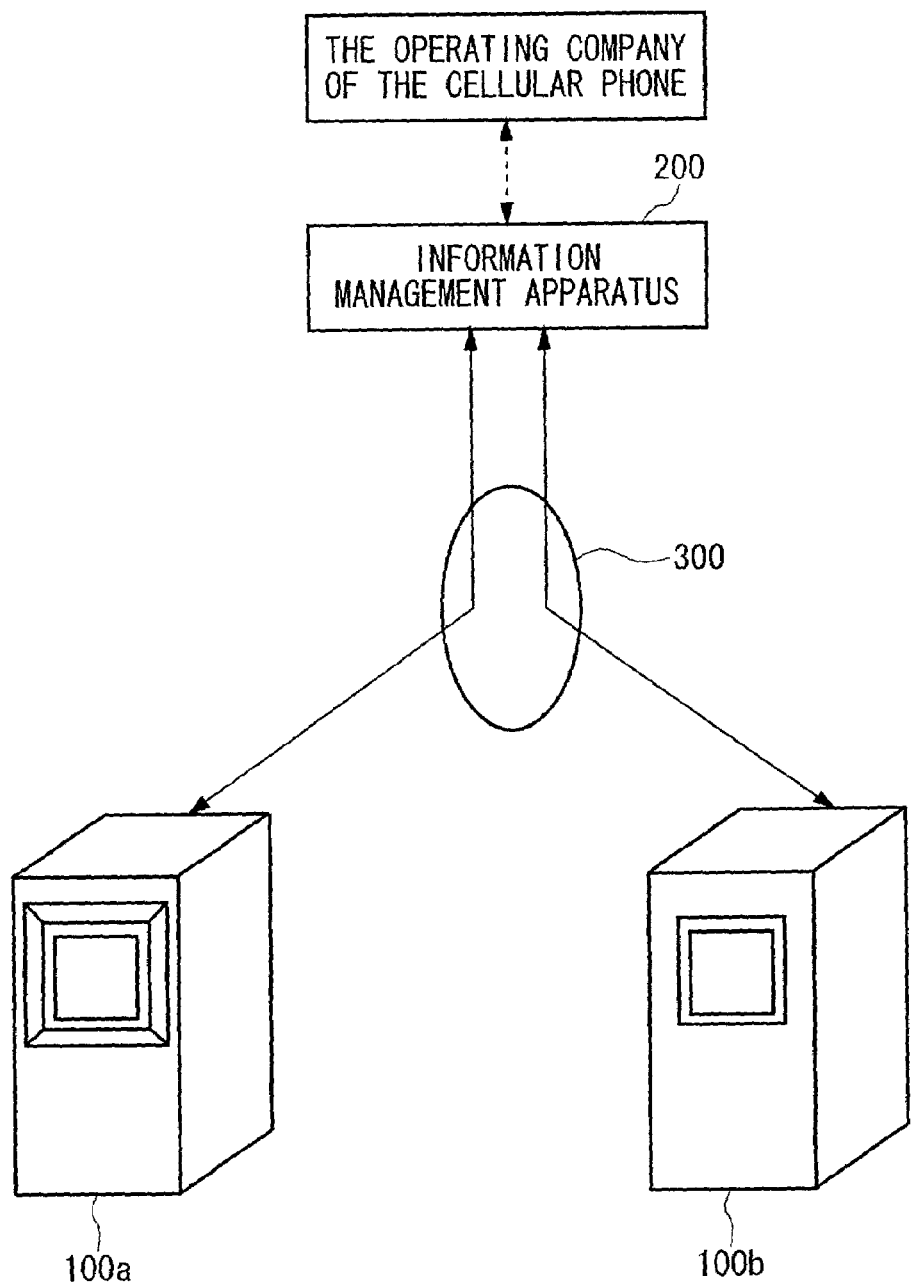
FIG. 41 is a diagram showing the entire information communication system according to a fifth embodiment of the present invention.

FIG. 41 is a diagram showing the entire information communication system according to the fifth embodiment of the present invention. The information communication system according to the present embodiment differs to the other embodiments in that the information management apparatus 200 communicates with the operating company of the cellular phone 400 through a communication network.

According to the present embodiment, a browsing user is charged for the service provided by the information communication system. The present information communication system pays a predetermined consideration to the registered user who has provided his/her user information when the user information is used for providing services, such as browsing or printing, to browsing users.

According to the present embodiment, when more than two browsing users simultaneously receive the same service, the service rate that each browsing user should pay is calculated. The calculated service rate is charged to each of the browsing user. In the same way, according to the present embodiment, when the user information that is used for providing a service includes a plurality of information of registered users, considerations to be divided for paying to each of the registered users are calculated. The calculated considerations are then paid to each of the registered users.

Figure 42:
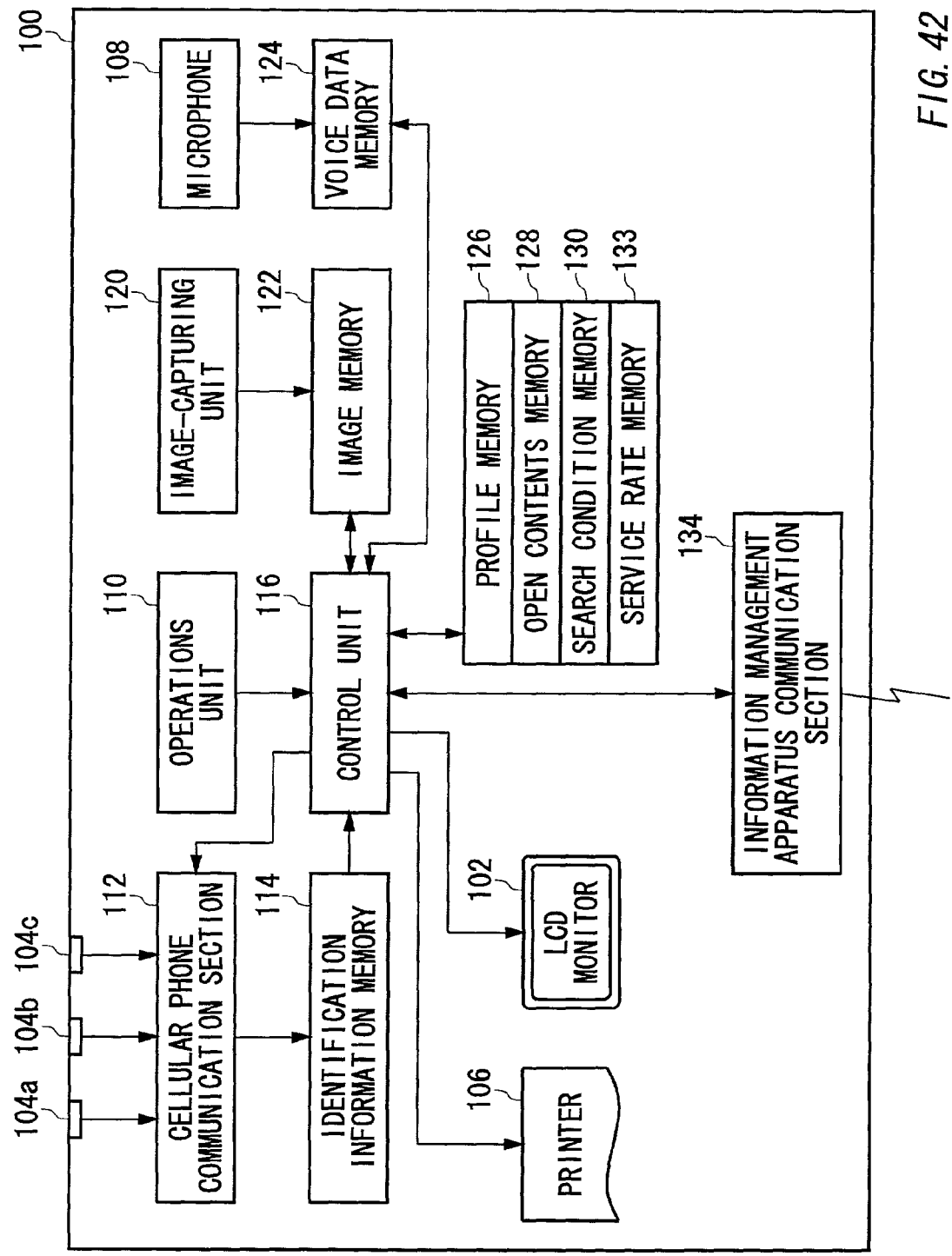
FIG. 42 is a functional block diagram of the information intermediary apparatus according to the fifth embodiment of the present invention.

FIG. 42 is a functional block diagram of the information intermediary apparatus 100 according to the present embodiment. The information intermediary apparatus 100 according to the present embodiment differs to the information intermediary apparatus 100 according to the first embodiment in that the apparatus 100 of the present embodiment includes a service rate memory 133. The service rate memory 133 stores the rates for various services provided by the present information communication system.

Figure 59:
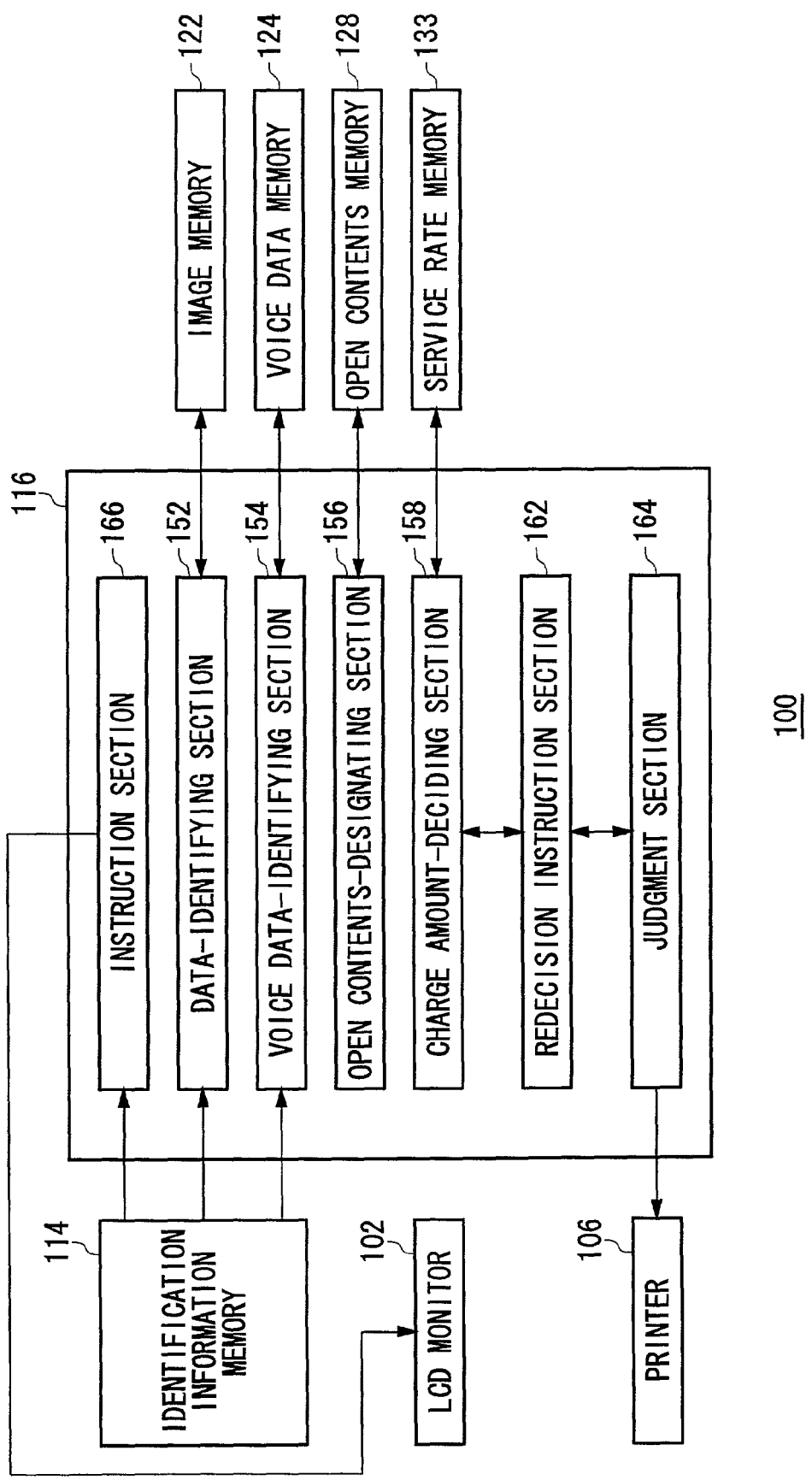
FIG. 59 is a functional block diagram of the control unit 116 according to the fifth embodiment.

FIG. 59 is a functional block diagram of the control unit 116 according to the present embodiment. The control unit 116 according to the present embodiment differs to the control unit 116 of the first embodiment in that the control unit of the present embodiment includes a charge amount-deciding section 158, a redicision instruction section 162, and a judgment section 164. The functions of these elements are described after FIG. 45 by referring both to FIG. 42 and FIG. 59. The function of the redecision instruction section 162 is described in the sixth embodiment.

Figure 43:
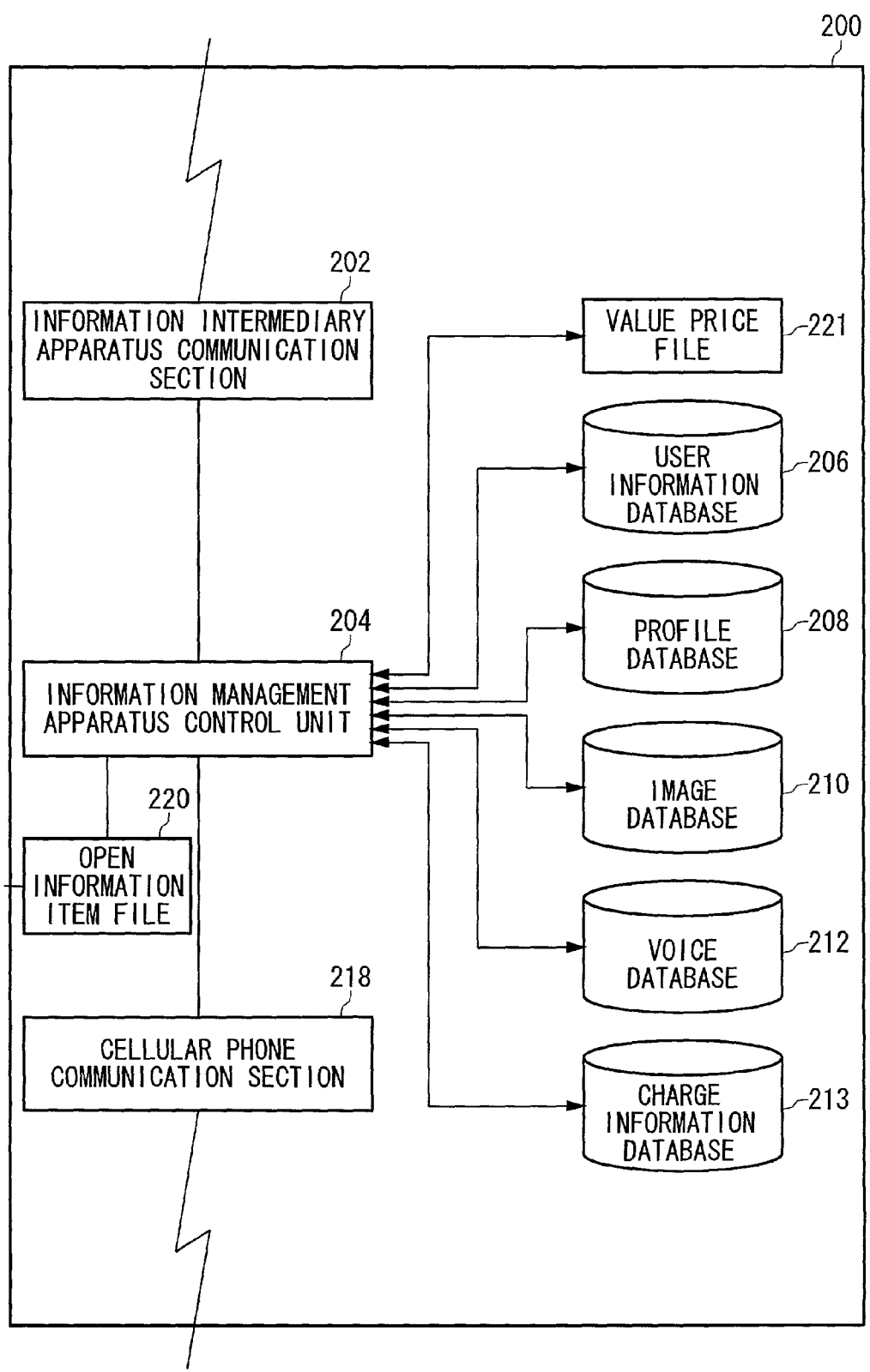
FIG. 43 is a functional block diagram of the information management apparatus according to the fifth embodiment of the present invention.

FIG. 43 is a functional block diagram of the information management apparatus 200 according to the present embodiment. The information management apparatus 200 according to the present embodiment differs to the information management apparatus 200 according to the first embodiment in that the apparatus 200 of the present embodiment includes: a charge information database 213, which stores charge fees for charging browsing users who have used the services of the present information communication system; and a consideration file 221, which stores considerations to be paid to the registered user of the user information when the user information is used for a service, such as browsing the user information at the information intermediary apparatus 100.

Figure 60:
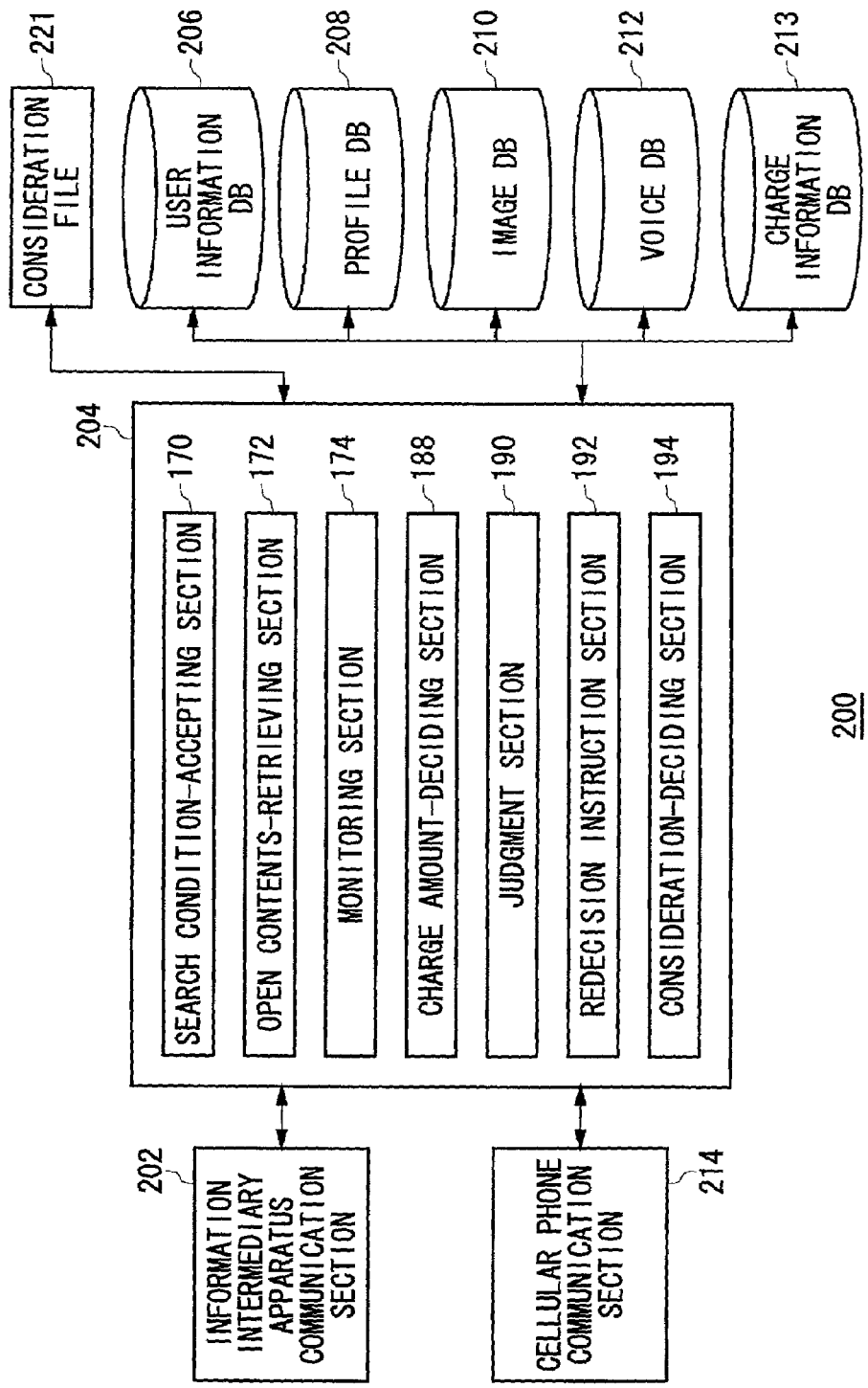
FIG. 60 is a functional block diagram of the information management apparatus control unit 204 according to the fifth embodiment.

FIG. 60 is a functional block diagram of the information management apparatus control unit 204 according to the present embodiment. The information management apparatus control unit 204 according to the present embodiment differs to the information management apparatus control unit 204 of the first embodiment in that the information management apparatus control unit 204 of the present embodiment includes a charge amount-deciding section 188, a judgment section 190, a redecision instruction section 192, and a consideration-deciding section 194. The functions of these elements are described after FIG. 45 by referring both to FIG. 43 and FIG. 60. The function of the redecision instruction section 192 is described in the sixth embodiment.

FIG. 44 is a table showing the data structure of a charge information database 213. The charge information database 213 stores, by associating with one another: the phone numbers of browsing users; the maximum chargeable amounts, which are the maximum amounts that can be charged to the browsing users; the sums of the charges charged to the browsing users to date; the sums of considerations, which are the total amount of considerations to be paid to the registered users of the user information when the user information is used for services such as browsing the user information at the information intermediary apparatus 100; and chargeable amounts, which are the amounts that can be charged to the browsing users for the present time.

The operations of the information communication system according to the present embodiment are now described in the following. The description below is made using an example when three browsing users simultaneously receive a service according to the present embodiment.

Figure 45:
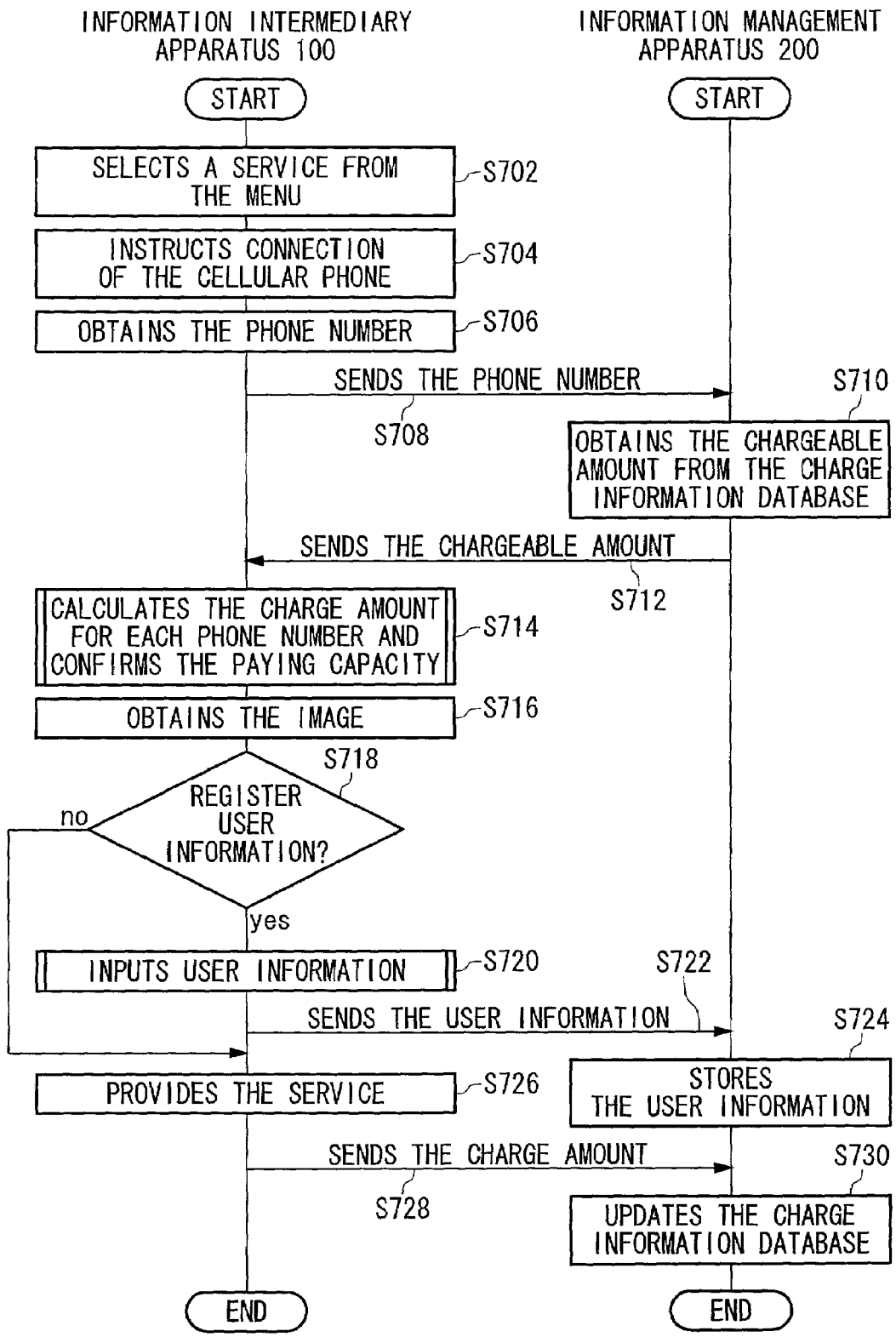
FIG. 45 is a flowchart showing the operations of the information intermediary apparatus and the information management apparatus when a user receives a service for making wallpaper of a cellular phone or printing an image on a seal and registers user information of himself/herself.

FIG. 45 is a flowchart showing the operations of the information intermediary apparatus 100 and the information management apparatus 200 when a browsing user receives a service for making wallpaper of the cellular phone 400 or printing an image on a seal 410 and registers user information of himself/herself. FIG. 46 illustrates exemplary display screens displayed on the LCD monitor 102 of the information intermediary apparatus 100. In FIG. 45, the communication of information made through the communication network 300 between the information intermediary apparatus 100 and the information management apparatus 200 is shown by sideling arrows.

According to the present embodiment, the instruction section 166 of the control unit 116 of the information intermediary apparatus 100 firstly instructs the LCD monitor 102 to display a menu page as shown in FIG. 46A. The menu page makes the browsing user select a service, at S702. On the menu page, if the browsing user selects "make wallpaper for the cellularphone," "make a seal," or "make both wallpaper and a seal," the control unit 116 instructs the LCD monitor 102 to display a message that the browsing user connect the cellular phone 400 to the cellular phone entry 104 at S704. When the browsing user connects the cellular phone 400 to the cellular phone entry 104, the cellular phone communication section 112 obtains its phone number from the cellular phone 400 and stores the obtained phone number in the identification information memory 114, at S706. In the case of the present embodiment, since three browsing users respectively connect the cellular phones 400 to the cellular phone entries 104A, 104B, and 104C, three phone numbers are obtained. The obtained phone numbers are used as identification information for identifying the browsing users according to the present embodiment. The control unit 116 sends the obtained phone numbers to the information management apparatus 200, at S708.

The charge amount-deciding section 188 of the information management apparatus control unit 204 searches the charge information database 213 with the received phone numbers as search keys and obtains the chargeable amounts associated with each of the phone numbers, at S710. The charge amount-deciding section 158 then sends the obtained chargeable amounts as paying capacity information of the browsing users to the information intermediary apparatus 100, at S712.

If, as the result of searching the charge information database 213, the corresponding phone number is not found, the charge amount-deciding section 188 refers the phone number to the operating company of the cellular phone 400 through a telecommunications company communication section 228 and confirms whether the phone number is presently valid. If the phone number is confirmed to be presently valid, the charge amount-deciding section 188 registers the phone number to the charge information database 213 and sends the predetermined maximum chargeable amount as the chargeable amount to the information intermediary apparatus 100. If the phone number is confirmed to be invalid, the charge amount-deciding section 188 sends, for example, the negative value of the chargeable amount to the information intermediary apparatus 100. Thus, the information management apparatus control unit 204 may be able to notify the information intermediary apparatus 100 that the browsing user does not have the ability to pay the charge.

The charge amount-deciding section 158 of the control unit 116 of the information intermediary apparatus 100 then calculates the charge amount for each phone number, that is, the charge amount of each browsing user, as well as confirming the paying capacity of each browsing user, at S714. After finishing the confirmation of the paying capacity, the control unit 116 obtains the image of the browsing user, at S716. At this time, the message shown in FIG. 46B is displayed on the LCD monitor 102. This message displays position information of left, middle, or right, as well as the phone number of each cellular phone 400, which is obtained at S706. The message instructs the owner of each cellular phone the position to stand when photographing an image. After displaying the above screen page, the control unit 116 obtains the image of the browsing user by operating the image-capturing unit 120. In the case of the present embodiment, three browsing users are taken in one image.

The instruction section of the control unit 116 instructs the LCD monitor 102 to display a message to ask the browsing users whether to register user information, at S718. Only when the browsing users select the registration of user information, the inputting process of user information is taken, at S720. The control unit 116 sends the input user information to the information management apparatus 200, at S722. The information management apparatus control unit 204 stores the sent user information in the corresponding database, at S724.

The information intermediary apparatus 100 provides the service selected at S702, at S726. For example, if the service to make wallpaper of the cellular phone is selected, the cellular phone communication section 112 sends the image data stored in the image memory 122 to the cellular phone 400 connected to the cellular phone entry 104. If the service to make a seal is selected, the printer 106 prints out the image data stored in the image memory 122 on a seal.

The charge amount-deciding section 158 of the control unit 116 sends the charge amount calculated at S714 as well as the phone number obtained at S706 to the information management apparatus 200, at S728. Then, the information intermediary apparatus 100 ends the process.

The charge amount-deciding section 188 of the information management apparatus 200 updates the contents of the charge information database 213 by using the sent charge amounts, at S730. More particularly, the sent charge amounts are added to the sum of charges corresponding to the sent phone number. The updated sum of charges is deducted from the maximum chargeable amount. Then, the sum of considerations is added to the deducted value. Finally, the calculated value replaces the value in the chargeable amount for the present time. After having updated the charge information database 213, the information management apparatus 200 ends the process.

Figure 47:
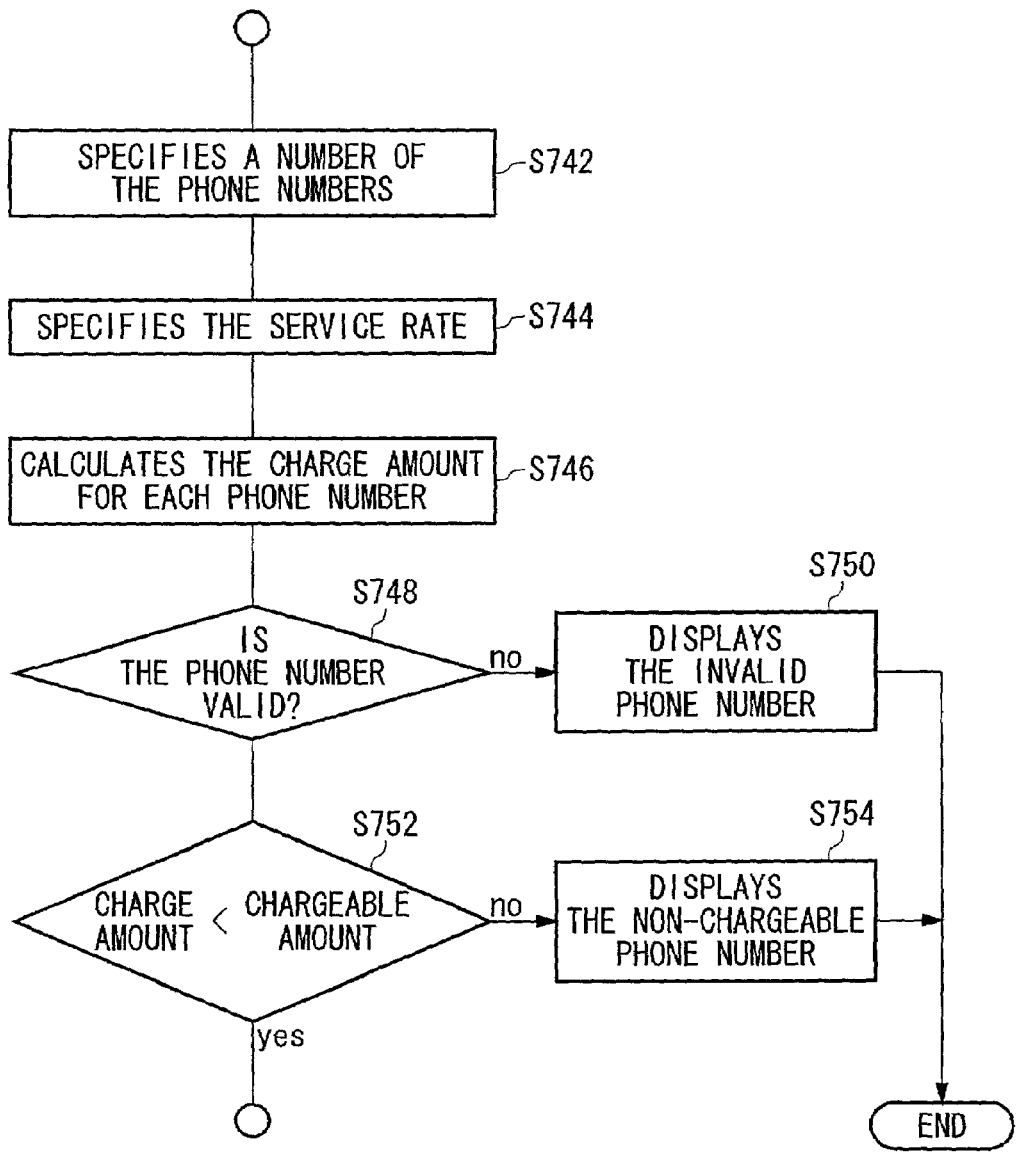
FIG. 47 is a flowchart showing the detailed operations of confirming the ability to pay at S714 in FIG. 45.

FIG. 47 is a flowchart showing the detailed operations of confirming the ability to pay by calculating the charge amount for each phone number, which is taken at S714 in FIG. 45. In this process, the charge amount-deciding section 158 of the control unit 116 firstly specifies the quantity of the phone numbers stored in the identification information memory 114, at S742. The charge amount-deciding section 158 then obtains the rate of the service selected by the browsing user, from the service rate memory 133, at S744. The charge amount-deciding section 158 calculates a charge amount for each phone number by dividing the obtained rate by the quantity of the phone numbers, at S746.

The judgment section 164 confirms whether each of the phone numbers is valid for the present time, at S748. According to the present embodiment, if the chargeable amount is a negative value, the phone number is judged to be invalid. If there is an invalid phone number, the instruction section 166 of the control unit 116 instructs the LCD monitor 102 to display a message to notify that the phone number is invalid, at S750, and the operation ends.

On the other hand, if all of the phone numbers are confirmed to be valid at S748, the judgment section 164 of the control unit 116 confirms with each phone number whether the charge amount calculated at S746 is smaller than the chargeable amount, at S752. If there is a phone number whose charge amount is larger than the chargeable amount, the instruction section 166 of the control unit 116 instructs the LCD monitor 102 to display a message to notify that the phone number does not have the ability to pay, at S754, and the process ends. At S752, if all of the phone numbers are confirmed to have a smaller charge amount than the chargeable amount, the process goes on to step S716 in FIG. 45.

Figure 48:
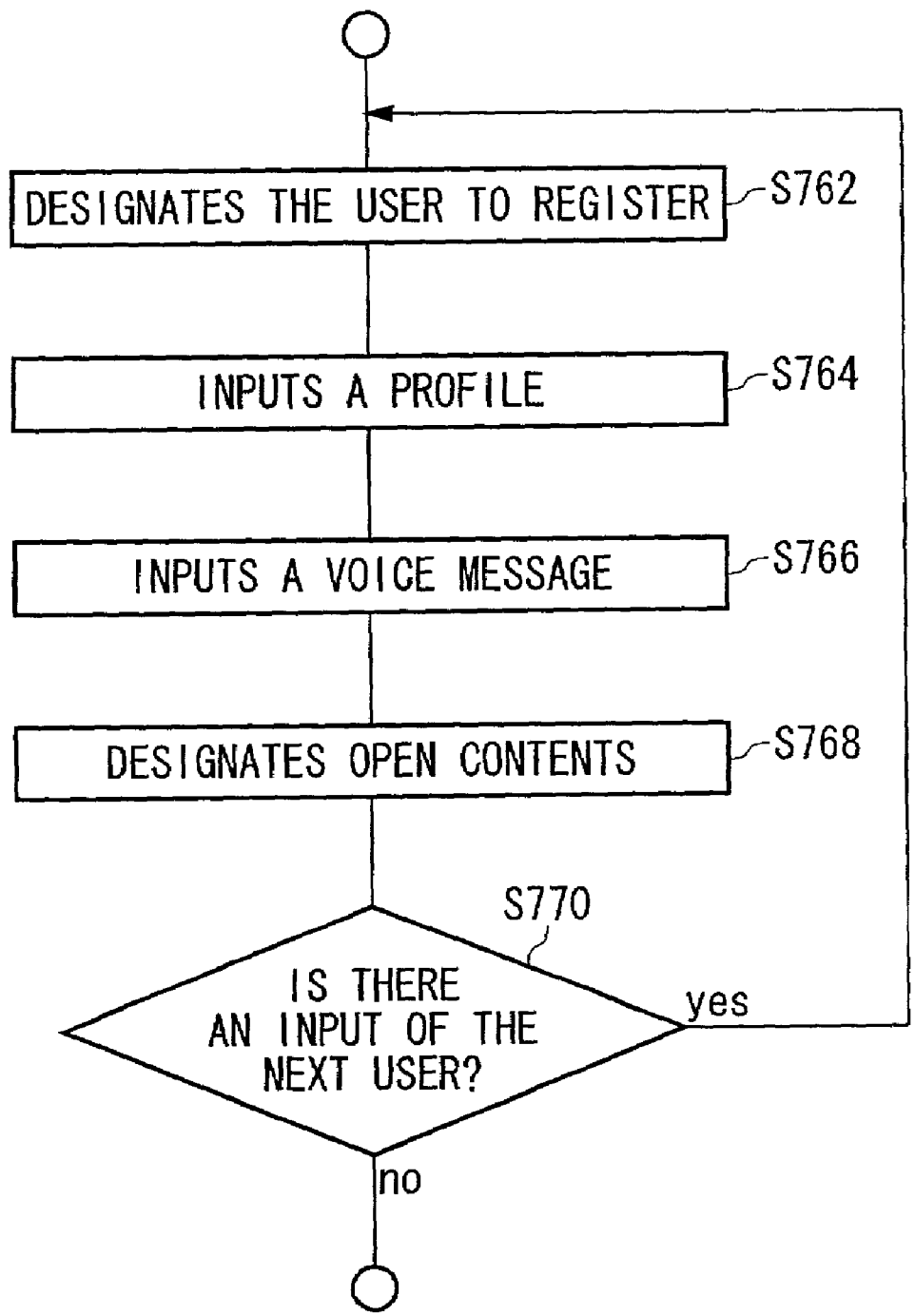
FIG. 48 is a flowchart showing the detailed operations of entering user information at S720 in FIG. 45.

FIG. 48 is a flowchart showing the detailed operations of entering user information at S720 in FIG. 45. In this process, the instruction section 166 of the control unit 116 firstly designates the browsing user to input user information by instructing the LCD monitor 102 to display the cellular phone number of the browsing user, at S762. The instruction section 166 then instructs the LCD monitor 102 to display the same screen page for inputting a profile shown in FIG. 14A according to the first embodiment and accepts the input from the browsing user. The control unit 116 creates a profile based on the input contents and stores the created profile in the profile memory 126 by associating with the phone number, at S764. The control unit 116 then accepts the input of a voice message from the browsing user. The input voice message is stored in the voice data memory 124 by associating with the phone number, at S766. The instruction section 166 instructs the LCD monitor 102 to display the same screen page as the screen page shown in FIG. 14B according to the first embodiment. Then, the instruction section 166 makes the browsing user select items of the user information that may be disclosed to a third party, by instructing the browsing user to check the check boxes of each of the displayed items. The open contents-designating section 156 of the control unit 116 creates information of the designated contents to be disclosed comprised of the names of the items selected by the check boxes and stores the created information of the designated contents to be disclosed in the open contents memory 128, at S768. The processes from S762 to S168 are repeated until user information of all the browsing users are input, at S770.

Figure 49:
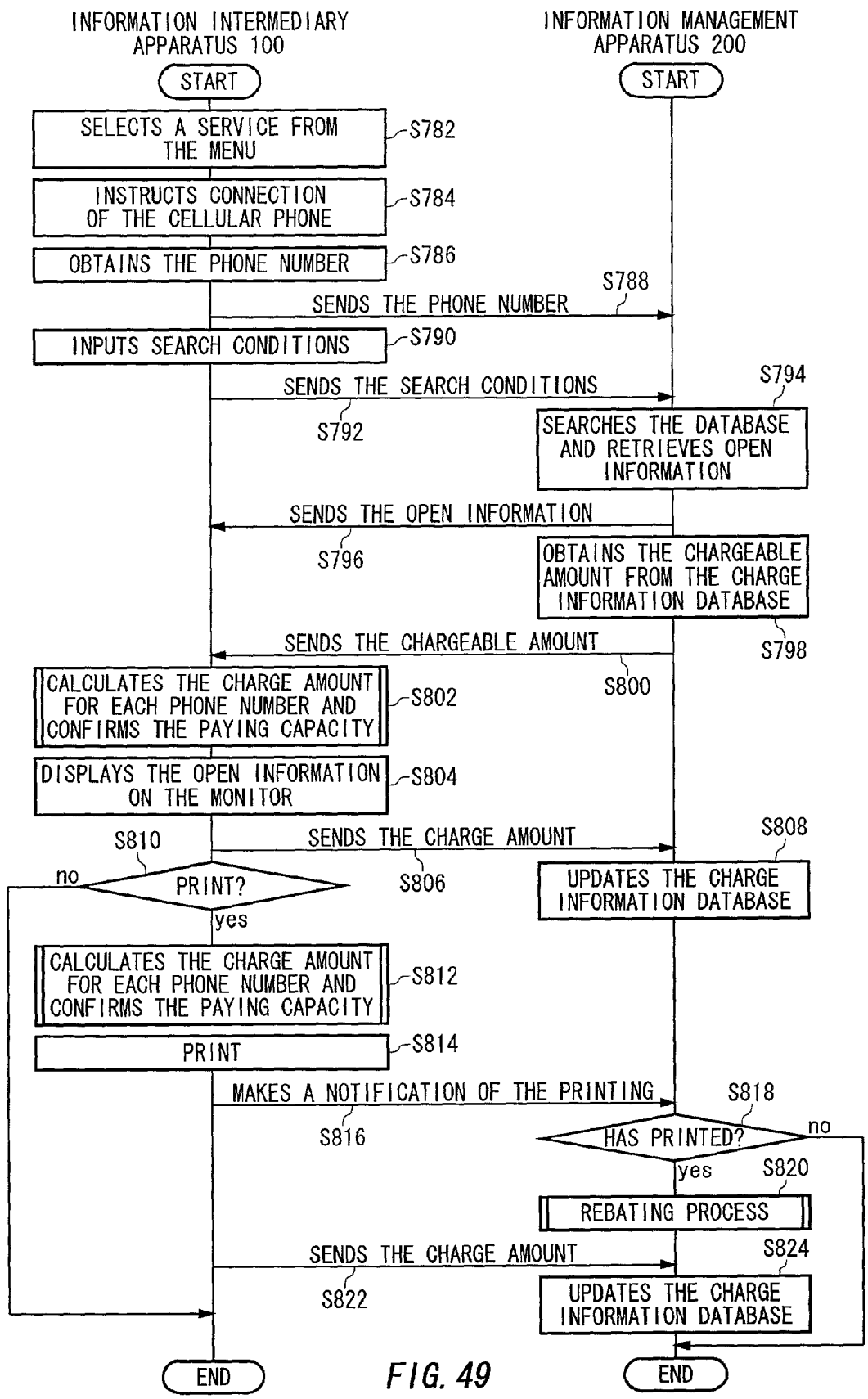
FIG. 49 is a flowchart showing the information intermediary apparatus and the information management apparatus when searching, browsing, and printing user information.

FIG. 49 is a flowchart showing the information intermediary apparatus 100 and the information management apparatus 200 when providing services of searching, browsing, and printing user information. First, the instruction section 166 of the control unit 116 of the information intermediary apparatus 100 displays a menu page shown in FIG. 46A on the LCD monitor 102 and makes the browsing user select a service, at S782. Here, the browsing user selects the service of "search user information." When a service is selected, the control unit 116 displays a message that the browsing user connects the cellular phone 400 to the cellular phone entry 104 on the LCD monitor 102, at S784. If the browsing user connects the cellular phone 400 to the cellular phone entry 104, the cellular phone communication section 112 obtains the phone number from the cellular phone 400 and stores the obtained phone number in the identification information memory 114, at S786. The control unit 116 sends the obtained phone number to the information management apparatus 200 through the information management apparatus communication section 134, at S788. The control unit 116 then displays a message that the browsing user inputs search conditions on the LCD monitor 102 and accepts the input of search conditions from the browsing user, at S790. The input search conditions are sent to the information management apparatus 200, at S792.

The open contents-retrieving section 172 of the information management apparatus control unit 204 searches the profile database 208 with the sent search conditions as search keys, for example, and creates open information by retrieving information with flags, which shows that the information may be disclosed, and the ID number of the user information, at S794. The open contents-retrieving section 172 sends the open information to the information intermediary apparatus 100, at S796. As the result of the search, if a plurality of user information is obtained, the open contents-retrieving section 172 creates open information corresponding to all of the obtained user information and sends the open information to the information intermediary apparatus 100.

The charge amount-deciding section 188 of the information management apparatus control unit 204 then obtains chargeable amounts associated with the sent phone numbers, at S798. At S798, practically the same process as S710 in FIG. 45 is undertaken. The charge amount-deciding section 188 sends the obtained chargeable amounts to the information intermediary apparatus 100, at S800.

The charge amount-deciding section 158 of the information intermediary apparatus 100 calculates the charge amount for each phone number and confirms the paying capacity of each browsing user, at S802. At S802, basically the same process as the process in FIG. 47 is undertaken. However, at S802, in the process corresponding to S744 in FIG. 47, the charge amount-deciding section 158 calculates the value obtained by multiplying the specified service rate by the quantity of the open information sent at S794.

At S802, if it is confirmed that each browsing user has enough paying capacity, the instruction section 166 of the control unit 116 displays the open information sent at S796 on the LCD monitor 102, at S804. The charge amount-deciding section 158 of the control unit 116 then sends the charge amount calculated at S802 together with the phone number obtained at S786 to the information management apparatus 200, at S806. The charge amount-deciding section 188 of the information management apparatus 200 updates the value that corresponds to the sent phone number among the sum of charges and chargeable amounts stored in the charge information database 213, by using the sent charge amount, at S808.

On the other hand, the instruction section 166 of the control unit 116 of the information intermediary apparatus 100 displays a message to ask the browsing user whether to print the open information, on the LCD monitor 102, at S810. If the browsing user wants to print out the open information, the control unit 116 confirms the paying capacity of the browsing user, at S812. At S812, basically the same process as the process described in FIG. 47 is undertaken. However, at S744, the charge amount-deciding section 158 of the control unit 116 obtains the fee for printing the open information from the service rate memory 133 and specifies the service rate by multiplying the obtained fee by the quantity of the prints. At S752, the value that deducted the charge amount sent at S806 from the chargeable amount obtained at S800 is used as the chargeable amount. At S812, if the paying capacity of each browsing user is confirmed, the instruction section 166 of the control unit 116 instructs the printer 106 to print out the open information, at S814.

The control unit 116 sends the ID number of the printed open information and the quantity of the prints as well as the notification to inform that the open information has been printed, to the information management apparatus 200, at S816. This process is for notifying the information management apparatus 200 to pay the registered user of the open information a consideration for the use of the open information to provide the service. The consideration-deciding section 194 of the information management apparatus control unit 204, which has received printing notification of the open information, takes a rebating process, at S818 and S820. That is, the consideration-deciding section 194 of the information management apparatus 200 calculates the amount to pay the registered user and stores the calculated amount in the charge information database 213.

On the other hand, the charge amount-deciding section 158 of the control unit 116 of the information intermediary apparatus 110 sends the charge amount calculated at S812 with the phone number obtained at S786 after having sent printing notification of the open information, at S822. Then, the information intermediary apparatus 100 ends the process.

On the other hand, the charge amount-deciding section 188 of the information management apparatus control unit 204 updates the charge information database 213 by using the sent charge amount, at S824. After the updating, the information management apparatus 200 ends the process.

Although not shown in the drawings, according to the present embodiment, the charge amount-deciding section 188 and the consideration-deciding section 194 of the information management apparatus control unit 204 periodically calculates the balance amount of the sum of charges in the charge information database 213 and the sum of considerations, for each phone number. The calculated balance is sent to the operating company of the cellular phone 400 from the telecommunications company communication section 228, together with the corresponding phone number. The operating company of the cellular phone 400 charges the corresponding amount to the balance described above from the owner of the cellular phone 400 of the sent phone number. The operating company of the cellular phone 400 then pays the collected amount to the operator of the information communication system according to the present embodiment.

Figure 50:
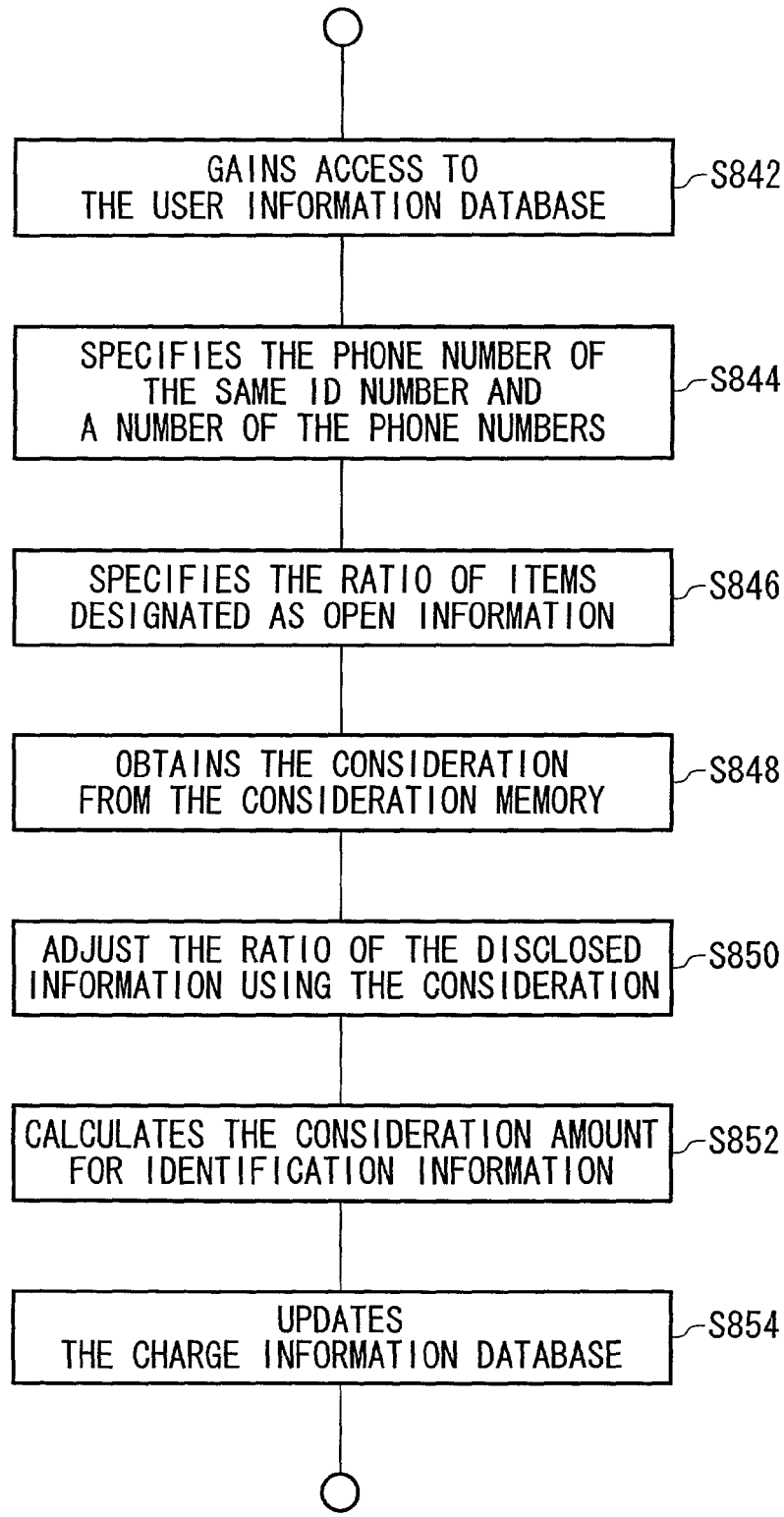
FIG. 50 is a flowchart showing the detailed operations of a rebating process at S820 in FIG. 49.

FIG. 50 is a flowchart showing the detailed operations of the rebating process at S820 in FIG. 49. In the rebating process, the consideration-deciding section 194 of the information management apparatus control unit 204 firstly gains access to the user information database 206, at S842. The consideration-deciding section 194 then searches the same ID number as the sent ID number and specifies the phone number associated with the ID number and the quantity, at S844. The consideration-deciding section 194 specifies the ratio of the items, which has a flag for permitting the disclosure, in the user information associated with the ID number, at S846. The consideration-deciding section 194 then obtains the consideration to pay the registered user when the user information is used for providing a service, from the consideration file 221, at S848. The consideration-deciding section 194 then adjusts the consideration to the value that accords with the ratio of the disclosed information by multiplying the obtained consideration by the ratio of the open information obtained at S846, at S850. The consideration-deciding section 194 then calculates a consideration amount for each phone number by dividing the consideration amount obtained at S850 by the quantity of the specified phone numbers, at S852. Finally, the consideration-deciding section 194 updates the charge information database 213 by adding the consideration amount obtained at S852 to the sum of charges stored in the charge information database 213 which corresponds to the phone number specified at S844. The operations of the rebating process according to the present embodiment are then completed.

(A Sixth Embodiment)

A sixth embodiment of the present invention is now described in the following. According to the present embodiment, only the contents of the process for confirming the paying capacity shown in FIG. 47 differ to the fifth embodiment. In the process for confirming the paying capacity of the browsing user according to the fifth embodiment, even if there is only one phone number whose chargeable amount is smaller than the charge amount, the process immediately ends. On the other hand, according to the present embodiment, the recalculation of the charge amount is made by considering only the rest of the phone numbers without the phone number whose chargeable amount is smaller than the charge amount. Then, the paying capacity of the phone numbers is then reconfirmed. Thus, when a plurality of users try to take the services according to the present embodiment, the services may be provided if at least one user has enough paying capacity.

Figure 51:
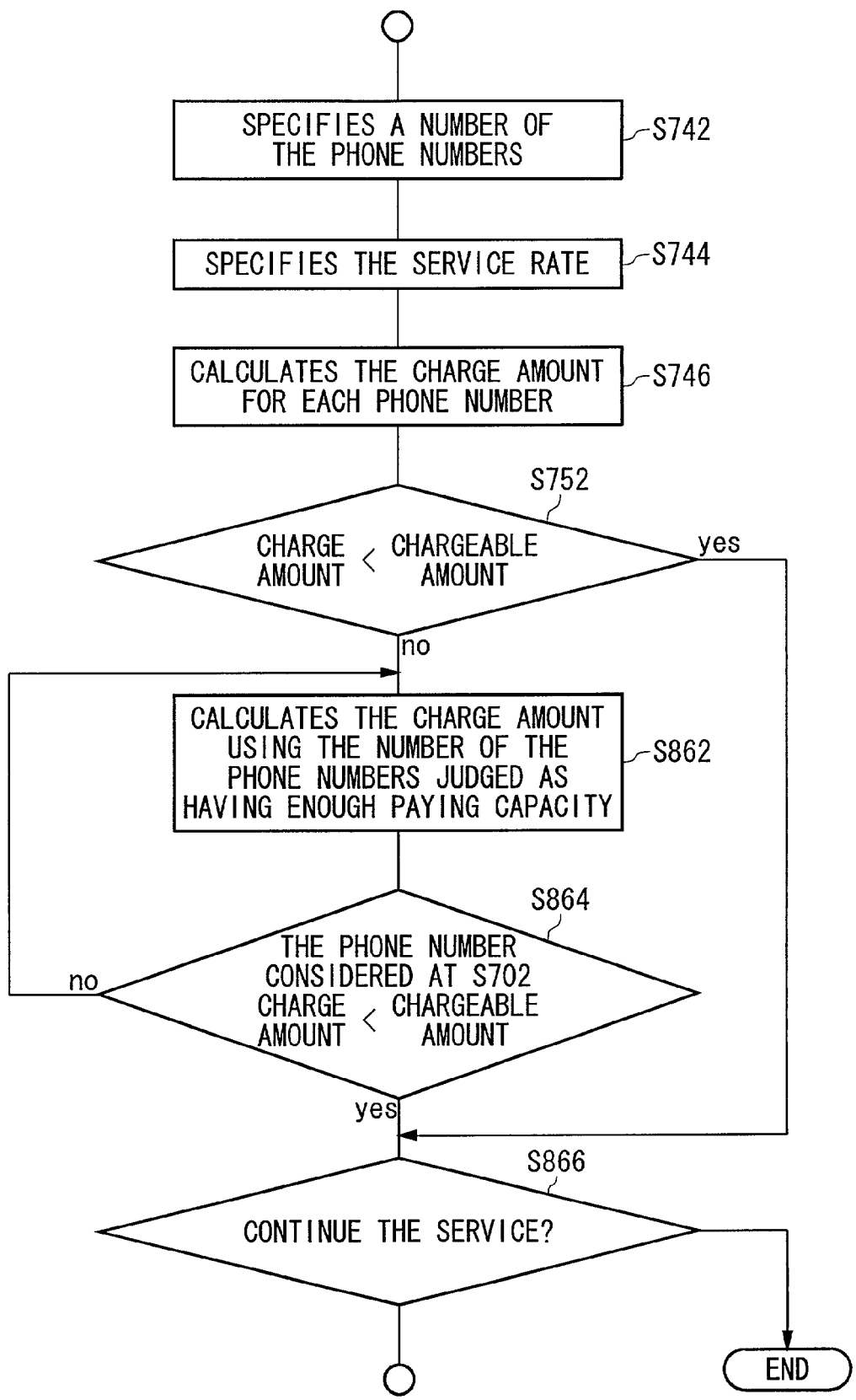
FIG. 51 is a flowchart showing the detailed operations of confirming the ability to pay according to a sixth embodiment of the present invention.

FIG. 51 is a flowchart showing the detailed operations of confirming the ability to pay according to the present embodiment. In this drawing, the steps with the same numbers as the numbers in FIG. 47 take practically the same processes as described in FIG. 47.

According to the present embodiment, after the charge amount for each phone number is calculated at S746, whether the charge amount is smaller than the chargeable amount is judged for each phone number, at S752. If all of the phone numbers do not satisfy the above condition, the redecision instruction section 162 of the control unit 116 or the redecision instruction section 192 of the information management apparatus control unit 204 instructs the charge amount-deciding section 158 of the control unit 116 or the charge amount-deciding section 188 of the information management apparatus control unit 204 to recalculate the charge amount based on the quantity of the phone numbers, which are judged as satisfying the condition and having enough paying capacity, at S862. The judgment section 164 of the control unit 116 or the judgment section 190 of the information management apparatus 204 judges whether the charge amount is smaller than the chargeable amount only for the phone numbers considered at S862, at S864. At S864, if there is a phone number that does not satisfy the condition, the step goes back to S862 and the redecision instruction section 162 of the control unit 116 or the redecision instruction section 192 of the information management apparatus control unit 204 instructs the charge amount-deciding section 158 of the control unit 116 or the charge amount-deciding section 188 of the information management apparatus control unit 204 to recalculate the charge amount based on the quantity of the phone numbers that are judged as having enough paying capacity at S864. At S864, if all phone numbers satisfy the condition, the instruction section 166 of the control unit 116 displays the phone numbers considered at S862 and the calculated charge amount on the LCD monitor 102 and asks the browsing users whether to continue the service, at S866. If the browsing users deny continuing the service, the process ends. If the browsing users desire to continue, the process goes to S716 in FIG. 45.

(A Seventh Embodiment)

A seventh embodiment of the present invention is now described in the following. According to the present embodiment, only the contents of the process for confirming the paying capacity shown in FIG. 47 differ to the fifth embodiment. In the process for confirming the paying capacity of the browsing user according to the fifth embodiment, the charge amount is calculated to be equal for each phone number. On the other hand, according to the present embodiment, the user inputs a burden share ratio for sharing the burden of the service rate. The charge amount for each phone number is then calculated by using the input burden share ratio.

Figure 52:
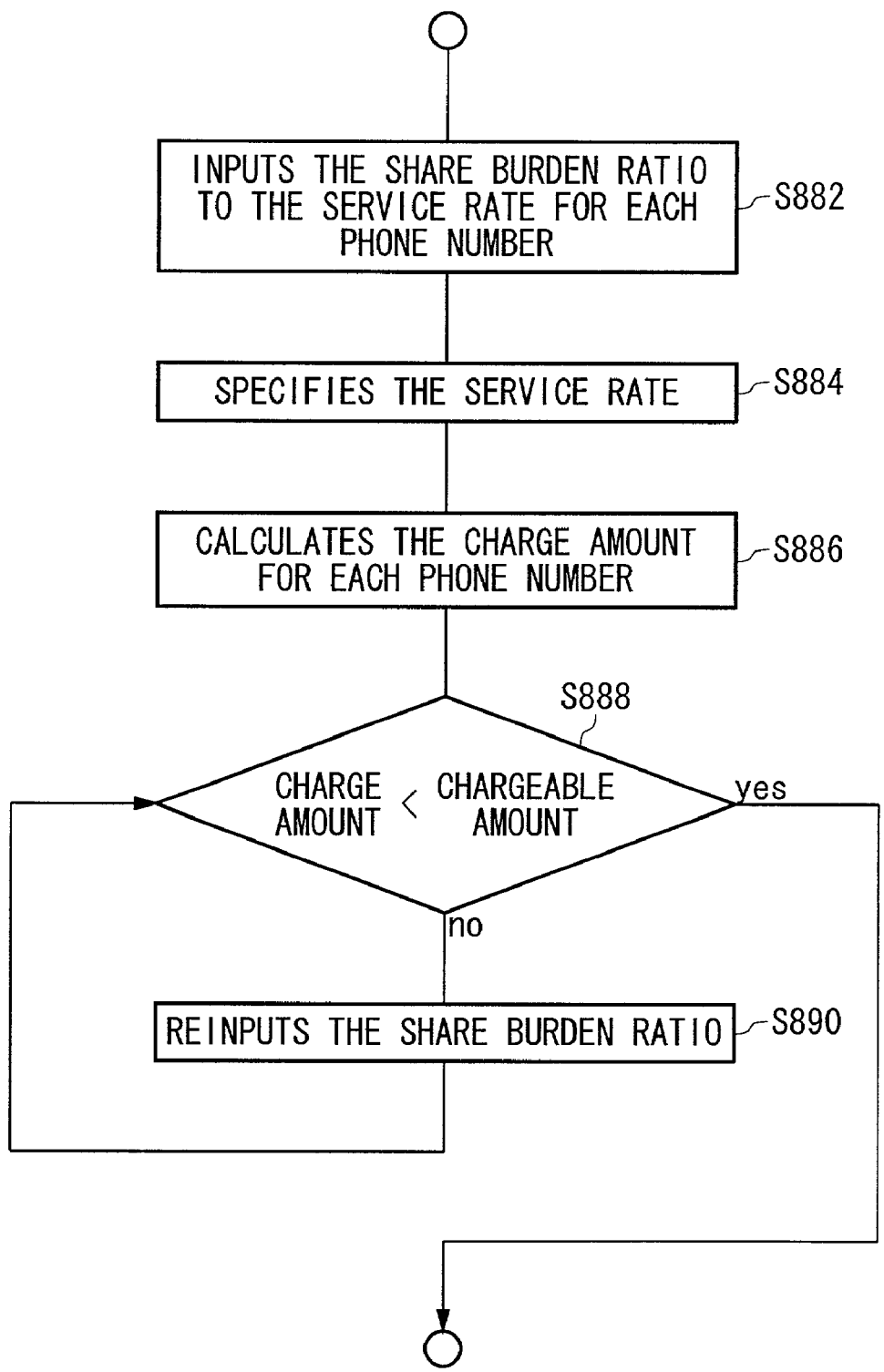
FIG. 52 is a flowchart showing the detailed operations of confirming the ability to pay according to a seventh embodiment of the present invention.

FIG. 52 is a flowchart showing the detailed operations of confirming the ability to pay according to the present embodiment. In the process shown in FIG. 52, firstly the burden share ratio for the service rate is input for each phone number, at S882. The charge amount-deciding section 158 of the control unit 116 obtains the service rate, which the browsing users have selected from the service rate memory 133, at S884. The charge amount-deciding section 158 then calculates the charge amount to decide the burden that each phone number shares, by multiplying the rate obtained at S884 by the share burden ratio input at S882, at S886. The judgment section 164 of the control unit 116 confirms whether the charge amount is smaller than the chargeable amount for each of all the phone numbers, at S888. If there is a phone number that does not satisfy the above condition, the control unit 116 reaccepts the input of the share burden ratio, at S890, and goes back to step S886. The steps from S886 to S890 are repeated until the calculated charge amount becomes smaller than the chargeable amount. If the charge amounts of all phone numbers become smaller than the chargeable amounts, the process goes to S716 in FIG. 47.

(An Eighth Embodiment)

Figure 53:
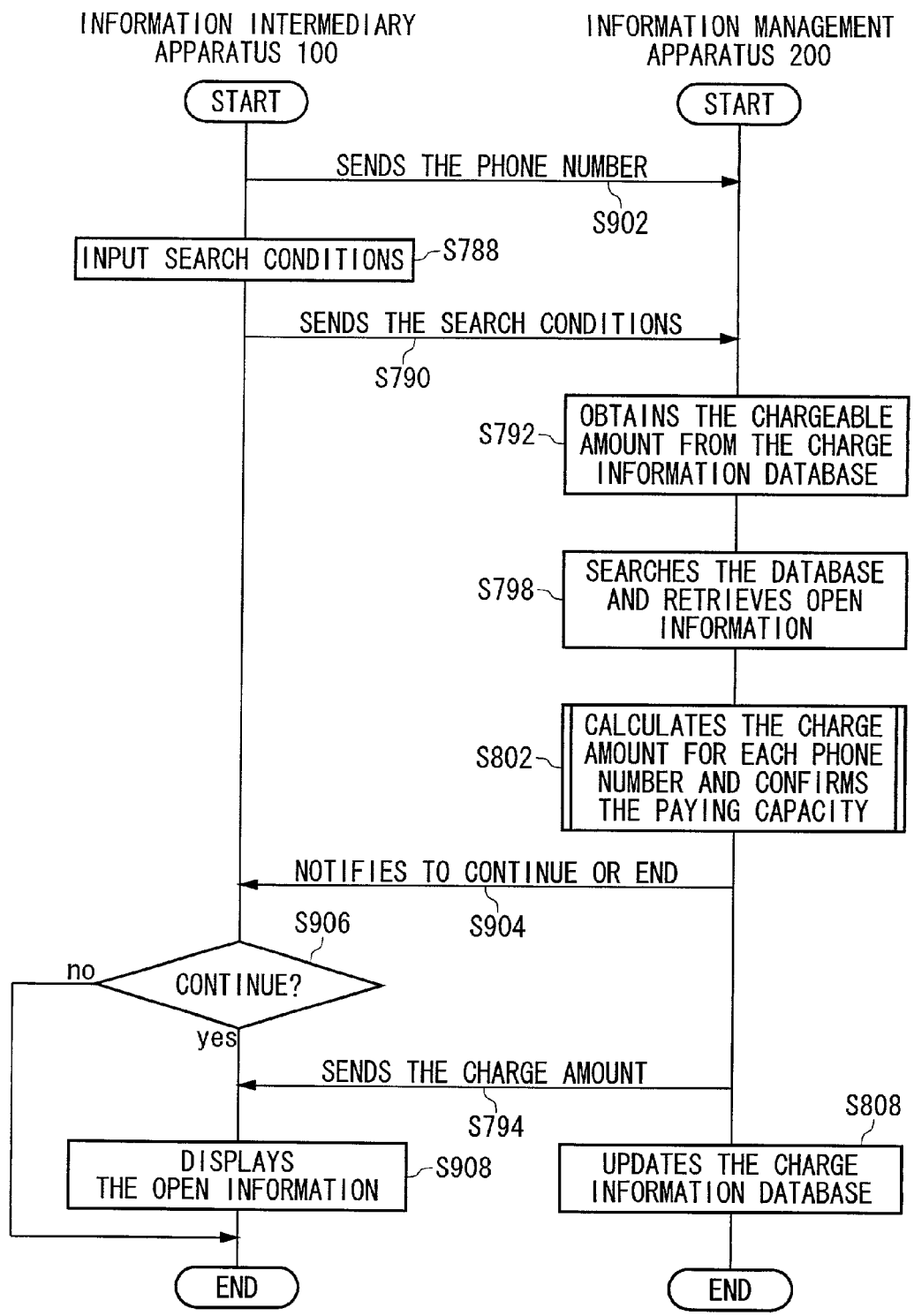
FIG. 53 is a flowchart showing the operations of cellular phone and the information management apparatus when searching and browsing user information according to an eighth embodiment of the present invention.

Finally, an eighth embodiment of the present invention is described in the following. According to the present embodiment, searching and browsing of user information are undertaken using the cellular phone 400 instead of the information intermediary apparatus 100. FIG. 53 is a flowchart showing the operations of the cellular phone 400 and the information management apparatus 200 when searching and browsing user information according to the present embodiment. In FIG. 53, the steps having the same numbers as the numbers used in FIG. 49 take practically the same processes as the processes described in FIG. 49.

According to the present embodiment, firstly the cellular phone 400 establishes communication with the cellular phone communication section 218 of the information management apparatus 200 and sends its own phone number to the information management apparatus 200, at S902. The cellular phone 400 accepts the input of search conditions from the user, at S788, and sends the search conditions to the information management apparatus 200, at S790.

The information management apparatus control unit 204 searches the corresponding database using the sent search conditions and creates open information of the user information obtained as the result of the search, at S792. The charge amount-deciding section 188 of the information management apparatus control unit 204 obtains the chargeable amount that corresponds to the phone number sent at S902, from the charge information database 213, at S798. The judgment section 190 of the information management apparatus control unit 204 then confirms the paying capacity of the browsing user, at S802. If confirmed as having enough paying capacity, the information management apparatus control unit 204 sends notification to continue the process to the cellular phone 400, while sending notification to end the process if confirmed as not having enough paying capacity, at S904. If the cellular phone 400 receives notification to end the process, the process immediately ends, at S906.

If judged as having enough paying capacity at S802, the information management apparatus control unit 204 sends the open information obtained at S792 to the cellular phone

400, at S794. The information management apparatus control unit 204 then updates the charge information database 213, at S808 and ends the process. On the other hand, the cellular phone 400 displays the open information on the display 402, at S908, and ends the process.

Although the present invention has been described by way of exemplary embodiments, it should be understood that those skilled in the art might make many changes and substitutions without departing from the spirit and the scope of the present invention, which is defined only by the appended claims.

As is obvious from the descriptions above, according to the present invention, the intermediation of the information exchange among users and the information that matches users' wishes may be provided. Moreover, according to the present invention, effective distributions of advertisements according to the advertisement contents may be made. Further, according to the present invention, users may receive services from the information intermediary apparatus 100 without having cash. In this case, since the information intermediary apparatus 100 does not store cash, the problems associated with crime may be prevented.

What is claimed is:

1. An information intermediary apparatus for communicating through a communication network with an information management apparatus having user information stored therein, the information intermediary apparatus comprising:
    a first communication section for establishing communication through the communication network with the information management apparatus;
    a second communication section for communicating with a portable communication apparatus having identification information for identifying a user;
    an identification information-obtaining section, connected with said second communication section, for obtaining said identification information from said portable communication apparatus through said second communication section;
    a user information input unit, connected with said first communication section, for inputting user information for the user of the portable communication apparatus; and
    a data-identifying section, connected with said identification information-obtaining section and said user information input unit, for associating said identification information with the user information,
    wherein the information intermediary apparatus communicates through the communication network with the information management apparatus which communicates with another information intermediary apparatus through the communication network, said another information intermediary apparatus stores the user information.

2. The information intermediary apparatus as claimed in claim 1, wherein:
    said user information input unit includes at least one of:
    an operations unit for inputting a profile of the user;
    a microphone for inputting voice data of the user; and
    an image-capturing unit for inputting an image of the user, and said data-identifying section associates said profile with said identification information for the user.

3. The information intermediary apparatus as claimed in claim 2, wherein:
    said first communication section sends at least one of said image, said voice data, and said profile to the information management apparatus as the user information, with a recognizable association with said identification information for the user.

4. The information intermediary apparatus as claimed in claim 2, further comprising:
    an open contents-designating section for designating among said identification information, said image, said voice data, and said profile contents that are to be disclosed.

5. The information intermediary apparatus as claimed in claim 2, wherein:
    said second communication section sends said image of the user to said portable communication apparatus of the user, said image being used as wallpaper for said portable communication apparatus.

6. The information intermediary apparatus as claimed in claim 2, further comprising:
    a voice data-identifying section for associating said voice data of the user with said identification information.

7. The information intermediary apparatus as claimed in claim 6, wherein:
    said image-capturing unit inputs an image of a group user including a plurality of users, said operations unit inputs a profile of the group user, and said data-identifying section associates said image of the group user with said profile of the group user.

8. The information intermediary apparatus as claimed in claim 7, wherein:
    said voice data-identifying section associates said voice data with said profile of the group user.

9. The information intermediary apparatus as claimed in claim 7, wherein:
    said second communication section communicates with a plurality of said portable communication apparatus of the group user, said identification information-obtaining section obtains said identification information from each user of the group user, and said data-identifying section associates said image with said identification information of each user.

10. The information intermediary apparatus as claimed in claim 9, further comprising:
    an instruction section for instructing each user of the group user to lineup in an order corresponding to an order of said identification information of each user of the group user.

11. The information intermediary apparatus as claimed in claim 10, further comprising:
    a portable communication apparatus receiving section for receiving and connecting with at least one of said portable communication apparatus, wherein:
    said second communication section communicates with said at least one portable communication apparatus through said portable communication apparatus receiving section, and said instruction section instructs the user to lineup in an order corresponding to a position of said at least one portable communication apparatus.

12. The information intermediary apparatus as claimed in claim 9, wherein:
    said data-identifying section associates a profile of each user of the group user with said identification information corresponding to said each user.

13. The information intermediary apparatus as claimed in claim 2, wherein:
    said operations unit accepts a designation of user information of registered users to obtain from the information management apparatus, and further comprising:

a user information-obtaining section for obtaining said designated user information for a registered user from the information management apparatus; and a printer for printing said profile and said image, included in said designated user information obtained by said user information-obtaining section.

14. The information intermediary apparatus as claimed in claim 13, further comprising:

a transmission section for notifying, through said information management apparatus, said portable communication apparatus of the registered user that said designated user information of the registered user has been printed, when said printer has printed said profile and said image.

15. The information intermediary apparatus as claimed in claim 14, wherein:

said operations unit accepts from a browsing user input of return information, which is to be sent to said portable communication apparatus of the registered user, and said transmission section sends to the information management apparatus information showing that said return information is to be sent from the browsing user to said portable communication apparatus of the registered user.

16. The information intermediary apparatus as claimed in claim 13, further comprising:

a paying capacity information-obtaining section for obtaining information relating to a paying capacity of a browsing user from the information management apparatus, using said identification information of said browsing user; and a judgment section that judges whether or not to provide a service to the browsing user, based on said information relating to said paying capacity, wherein said printer prints said image when said judgment section judges to provide said service.

17. The information intermediary apparatus as claimed in claim 16, further comprising:

a rate-storing section for storing a rate of said service;

a charge amount-deciding section for deciding an amount to charge for said service based on a number of browsing users and said rate stored in said rate-storing section, wherein said first communication section sends to the information management apparatus said charge amount, decided by said charge amount-deciding section with corresponding identification information, as charge information.

18. The information intermediary apparatus as claimed in claim 17, further comprising:

a redecision instruction section for instructing said charge amount-deciding section to recalculate said charge amount, based on a number of browsing users said judgment section has judged to provide said service, when there is at least one browsing user said judgment section has judged not to provide said service.

19. The information intermediary apparatus as claimed in claim 17, wherein:

said charge amount-deciding section obtains a share burden ratio for said rate of said service for each of said browsing users and decides said amount to charge for said service for each of said browsing users, based on said share burden ratio and said rate stored in said rate-storing section.

20. The information intermediary apparatus as claimed in claim 17, further comprising:

a user information output section for outputting said user information obtained by said user information-obtaining section when said judgment section judges to provides said service.

21. The information intermediary apparatus as claimed in claim 1, wherein:

said identification information includes a phone number of said portable communication apparatus.

22. A method for intermediating information with an information management apparatus, which stores user information, through a communication network, the method comprising:

(a) establishing communication with the information management apparatus through the communication network;

(b) communicating with a portable communication apparatus, which stores identification information for identifying a user;

(c) obtaining said identification information from said portable communication apparatus by said communicating with the portable communication apparatus;

(d) inputting user information; and (e) associating said identification information with the user information, wherein an intermediary apparatus communicates through the communication network with the information management apparatus which communicates with another information intermediary apparatus through the communication network, said another information intermediary apparatus stores the user information.

23. The method for intermediating information as claimed in claim 22, further comprising:

obtaining information relating to a paying capacity of a browsing user from the information management apparatus, using said identification information; and judging whether or not to provide the browsing user a service, based on said information relating to said paying capacity of the browsing user, and printing user information only when said judging whether or not to provide the service judges to provide said service.

24. The method for intermediating information as claimed in claim 23, further comprising:

storing a rate of said service;

deciding an amount to charge for said service to each browsing user, based on a number of said browsing user and said rate of said service.

25. The method for intermediating information as claimed in claim 24, further comprising:

recalculating said charge amount, based on the number of said browsing user to whom said judging whether or not to provide the service has judged to provide said service, when there is at least one browsing user to whom said judging whether or not to provide the service has judged not to provide said service.

26. The method for intermediating information as claimed in claim 24, wherein:

said deciding an amount to charge includes:

obtaining a share burden ratio for said rate of said service with respect to each of said browsing user and deciding said amount to charge for said service to each of said browsing user, based on said share burden ratio and said stored rate.

* * * * *